United States Patent
Zhao et al.

(10) Patent No.: US 12,522,584 B2
(45) Date of Patent: Jan. 13, 2026

(54) 3,4-DIHYDROISOQUINOLINE COMPOUND AND USE THEREOF

(71) Applicant: CSPC Zhongqi Pharmaceutical Technology (Shijiazhuang) Co., Ltd., Shijiazhuang (CN)

(72) Inventors: Chuanwu Zhao, Shijiazhuang (CN); Yan Zhang, Shijiazhuang (CN); Jinlu Yang, Shijiazhuang (CN); Li Zhang, Shijiazhuang (CN); Xuejiao Zhang, Shijiazhuang (CN); Shuxiang Cui, Shijiazhuang (CN); Qian Guo, Shijiazhuang (CN)

(73) Assignee: CSPC Zhongqi Pharmaceutical Technology (Shijiazhuang) Co., Ltd, Shijiazhuang (CN)

( * ) Notice: Subject to any disclaimer, the term of this patent is extended or adjusted under 35 U.S.C. 154(b) by 546 days.

(21) Appl. No.: 17/926,384

(22) PCT Filed: Jun. 1, 2021

(86) PCT No.: PCT/CN2021/097746
§ 371 (c)(1),
(2) Date: Nov. 18, 2022

(87) PCT Pub. No.: WO2021/244542
PCT Pub. Date: Dec. 9, 2021

(65) Prior Publication Data
US 2023/0183206 A1    Jun. 15, 2023

(30) Foreign Application Priority Data
Jun. 2, 2020 (CN) .......................... 202010487966.8

(51) Int. Cl.
| C07D 401/12 | (2006.01) |
| A61P 35/00 | (2006.01) |
| C07D 401/14 | (2006.01) |

(52) U.S. Cl.
CPC ............ *C07D 401/12* (2013.01); *A61P 35/00* (2018.01); *C07D 401/14* (2013.01)

(58) Field of Classification Search
CPC ...... C07D 401/12; C07D 401/14; A61P 35/00
See application file for complete search history.

(56) References Cited

U.S. PATENT DOCUMENTS

| 8,993,555 B2 * | 3/2015 | Duncan et al. |
| 10,494,376 B2 * | 12/2019 | Bergman et al. |
| 2015/0344434 A1 | 12/2015 | Duncan et al. |
| 2019/0083482 A1 * | 3/2019 | Duncan et al. |

FOREIGN PATENT DOCUMENTS

| CN | 105452226 A | 3/2016 |
| CN | 110650950 A | 1/2020 |
| CN | 113045543 A | 6/2021 |
| RU | 2608611 C2 | 1/2017 |
| WO | 2011/057145 A2 | 5/2011 |
| WO | 2015/200680 A2 | 12/2015 |
| WO | 2017/153520 A1 | 9/2017 |
| WO | 2019/102494 A1 | 5/2019 |
| WO | 2019/173804 A1 | 9/2019 |
| WO | 2020/094712 A1 | 5/2020 |

OTHER PUBLICATIONS

Acute Myeloid Leukemia Causes, Risk Factors, and Prevention; Provided by the ACS at cancer.org [Retrieved on May 16, 2025] (Retrieved from the internet: <URL: https://www.cancer.org/cancer/types/acute-myeloid-leukemia/causes-risks-prevention/prevention.html>) (Year: 2025).*
Definition II.9.a of prevent, Oxford English Dictionary Online; Provided by the online dictionary at oed.com [retrieved on Mar. 5, 2025]. Retrieved form the internet: <URL: https://www.oed.convdictionary/prevent_v?tl=true>) (Year: 2025).*
Chemotherapy drugs; Provided by the Canadian Cancer Society, refer to cancer.ca. [Retrieved on May 19, 2025]. (Retrieved from the internet: URL: <https://cancer.ca/en/treatments/treatment-types/chemotherapy/chemotherapy-drugs>). (Year: 2024).*
Why haven't we cured cancer yet ?; Provided by the Worldwide Cancer Research at worldwidecancerresarch.org [Retrieved on May 19, 2025] (Retrieved from the internet: <URL: https://www.worldwidecancerresearch.org/information-and-impact/cancer-myths-and-questions/why-havent-we-cured-cancer-yet/>). (Year: 2025).*
Every cancer is unique; Provided by The Conversation at theconversation.com [Retrieved on May 19, 2025] (Retrieved from the internet: <URL: https://theconversation.com/every-cancer-is-unique-why-different-cancers-require-different-treatments-and-how-evolution-drives-drug-resistance-199249>). (Year: 2023).*

(Continued)

*Primary Examiner* — Kortney L. Klinkel
*Assistant Examiner* — Jackson J Hernandez
(74) *Attorney, Agent, or Firm* — McCarter & English, LLP; Wei Song

(57) ABSTRACT

Provided in the present invention are a compound as represented by formula (I), or a pharmaceutically acceptable salt, a tautomer, a geometrical isomer, an optical isomer, a solvate or an isotopic derivative thereof, and the use thereof. The compound of the present invention has a significant inhibitory activity on PRMT5, has a significant inhibitory effect on tumor cells and in vivo tumor models, also has a good administration performance, and has clinical application potential for preventing and/or treating diseases which are at least partially mediated by PRMT5.

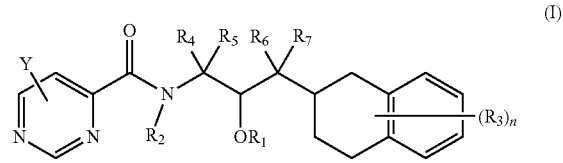

20 Claims, No Drawings

(56) References Cited

OTHER PUBLICATIONS

Duncan et al.; Structure and Property Guided Design in the Identification of PRMT5 Tool Compound EPZ015666; ACS Med. Chem. Lett. 2016, 7, 162-166. (Year: 2016).*

International Search Report and Written Opinion for Application No. PCT/CN2021/097746, dated Sep. 7, 2021, 14 pages.

* cited by examiner

3,4-DIHYDROISOQUINOLINE COMPOUND AND USE THEREOF

CROSS REFERENCE TO RELATED APPLICATIONS

This application is a U.S. National Stage Application filed under 35 U.S.C. § 371, based on International Patent Application No. PCT/US2021/097746, filed on Jun. 1, 2021, which claims the priority to and the benefit of Chinese Patent Application No. 202010487966.8, filed on Jun. 2, 2020, entitled "3,4-DIHYDROISOQUINOLINE COMPOUND AND USE THEREOF", the entire contents of which are incorporated herein by reference.

TECHNICAL FIELD

The present disclosure belongs to the field of medical technology and relates to a 3,4-dihydroisoquinoline compound, a pharmaceutical composition comprising the same, and use of them in the field of medicine.

BACKGROUND

Protein arginine methyltransferases (PRMTs) are a class of S-adenosyl methionine (SAM or AdoMet)-dependent methyltransferases, which are enzymes capable of catalyzing methylation reaction of protein arginine. Specifically, they are responsible for transferring a methyl group from the AdoMet to a guanidino nitrogen atom at the terminal of arginine residue in histone or additional protein. PRMTs play important roles in the methylation of proteins, for example, participation in alternative splicing, post-transcriptional regulation, RNA processing, cell proliferation, cell differentiation, apoptosis, tumor formation, etc. According to different ways to catalyze the methylation of arginine, the members of PRMT family may be divided into three types: PRMT1-4, PRMT6, and PRMT8 belong to type I for the catalytic types of monomethylation and asymmetric dimethylation; PRMT5 and PRMT9 belong to type II for the catalytic type of symmetric dimethylation; and PRMT7 belongs to type III, capable of catalyzing the monomethylation.

PRMT5 has been isolated for the first time by Pollack et al. from a protein complex bound to Jak2 (Janus tyrosine kinase 2) in the yeast two-hybrid assay, so it is also known as JBP1 Oak-binding protein 1). PRMT5 can not only regulate the process of gene transcription and protein modification, but also play roles in regulating cell proliferation, differentiation, and apoptosis during the growth of tumor cells. It is a tumor therapeutic target of great potential. To date, the researches and developments of PRMT5 inhibitors are all in their early stages, of which GSK3326595 released by GSK has advanced most rapidly, which is in Phase I/II clinical trial. JNJ-64619178 released for the first time by Janssen, PF-06939999 released by Pfizer, and PRT-543 released by Prelude Therapeutics are all in Phase I clinical trial. At present, the structural formulae of PF-06939999 and PRT-543 have not yet been published. The structural formulae of GSK3326595 and JNJ-64619178 are as follows:

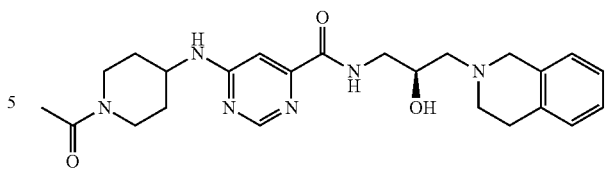

GSK3326595

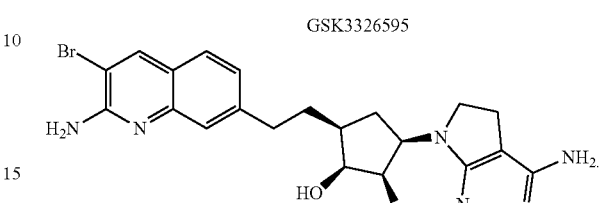

JNJ-64619178

Given that no PRMT5 inhibitor has currently been approved for marketing, it would be of significant value of clinical application to design and synthesize a novel PRMT5 inhibitor having both good efficacy and good performance of administration.

SUMMARY

Technical Problem

An objective of the present disclosure is to provide a structurally novel 3,4-dihydroisoquinoline compound with good inhibitory activities against PRMT5 and tumor cells, or a pharmaceutically acceptable salt, tautomer, geometric isomer, optical isomer, solvate or isotopic derivative thereof.

Another objective of the present disclosure is to provide a structurally novel 3,4-dihydroisoquinoline compound with good inhibitory activities against PRMT5 and tumor cells and better in vivo antitumor activity, or a pharmaceutically acceptable salt, tautomer, geometric isomer, optical isomer, solvate or isotopic derivative thereof.

Another objective of the present disclosure is to provide a structurally novel 3,4-dihydroisoquinoline compound with good inhibitory activities against PRMT5 and tumor cells, better in vivo antitumor activity, and better performance of oral administration, or a pharmaceutically acceptable salt, tautomer, geometric isomer, optical isomer, solvate or isotopic derivative thereof.

Solution to Problem

In the first aspect, the present disclosure provides a compound represented by formula (I) or a pharmaceutically acceptable salt, tautomer, geometric isomer, optical isomer, solvate or isotopic derivative thereof,

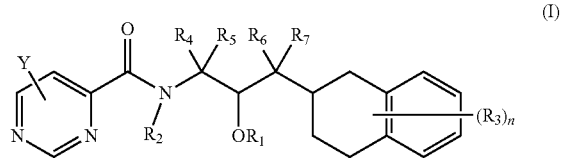

(I)

wherein Y is

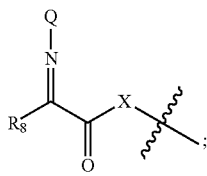

X is selected from the group consisting of

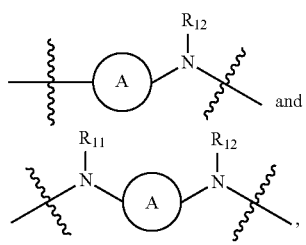

wherein the N atom linked to $R_{12}$ is linked to the pyrimidine ring;

ring A is selected from the group consisting of the following optionally substituted groups: $C_{3-10}$ cycloalkyl, 3— to 10-membered heterocycloalkyl, 4— to 12-membered bridged cyclyl, 4— to 12-membered bridged heterocyclyl, monospirocyclyl, monospiroheterocyclyl, fused cyclyl, and fused heterocyclyl, wherein the monospirocyclyl and monospiroheterocyclyl are selected from the group consisting of 3-membered/5-membered, 4-membered/4-membered, 4-membered/5-membered, 4-membered/6-membered, 5-membered/5-membered, and 5-membered/6-membered rings, where the number of ring atoms in each ring includes the number of spiro atom; and wherein the fused cyclyl and fused heterocyclyl are selected from the group consisting of 5-membered/5-membered, 5-membered/6-membered, and 6-membered/6-membered rings, where the number of ring atoms in each ring includes the number of shared atoms;

$R_1$, $R_2$, $R_3$, $R_4$, $R_5$, $R_6$, $R_7$, $R_1$, and $R_{12}$, at each occurrence, are each independently selected from the group consisting of the following optionally substituted groups: hydrogen, halogen, hydroxyl, amino, carboxyl, nitro, cyano, oxo, azido, $C_{2-6}$ alkenyl, $C_{2-6}$ alkynyl, $C_{1-6}$ alkyl, $C_{1-6}$ alkoxy, a $C_{1-6}$ alkyl ester group, $C_{1-6}$ alkylamino, $C_{1-6}$ alkylamido, $C_{3-10}$ cycloalkyl, 3— to 10-membered heterocycloalkyl, $C_{3-10}$ cycloalkylamino, 3— to 10-membered heterocycloalkylamino, $C_{3-10}$ cycloalkylamido, 3— to 10-membered heterocycloalkylamido, $C_{6-10}$ aryl, and 5— to 10-membered heteroaryl, wherein the oxo denotes that two hydrogen atoms at the same substitution position are substituted with the same oxygen atom to form a double bond; when either of $R_4$ and $R_5$ is oxo, the other is absent; when either of $R_6$ and $R_7$ is oxo, the other is absent; n is 0, 1, 2, 3, 4, 5 or 6;

$R_8$ is selected from the group consisting of the following optionally substituted groups: hydrogen, halogen, cyano, —$OR_{13}$, —$N(R_{13})R_{14}$, —NH—$C(O)R_{13}$, —NH—$OR_{13}$, —$OC(O)R_{13}$, —$C_{1-6}$ alkylene-$N(R_{13})R_{14}$, $C_{1-6}$ alkyl, $C_{3-10}$ cycloalkyl, $C_{2-6}$ alkenyl, $C_{2-6}$ alkynyl, 3— to 10-membered heterocycloalkyl, $C_{6-14}$ aryl, and 5— to 10-membered heteroaryl, wherein $R_{13}$ and $R_{14}$ are each independently selected from the group consisting of hydrogen, $C_{1-6}$ alkyl, $C_{3-10}$ cycloalkyl, 3— to 10-membered heterocycloalkyl, $C_{6-14}$ aryl, and 5— to 10-membered heteroaryl;

Q is selected from the group consisting of the following optionally substituted groups: hydrogen, halogen, cyano, —$OR_9$, —$N(R_9)R_{10}$, —$C(O)R_9$, —$C(O)OR_9$, —$C(O)N(R_9)R_{10}$, —$OC(O)R_9$, —$OC(O)N(R_9)R_{10}$, $C_{1-6}$ alkyl, $C_{3-10}$ cycloalkyl, $C_{2-6}$ alkenyl, $C_{2-6}$ alkynyl, 3— to 10-membered heterocycloalkyl, $C_{6-14}$ aryl, 5— to 10-membered heteroaryl, 4— to 12-membered bridged cyclyl, 4— to 12-membered bridged heterocyclyl, monospirocyclyl, monospiroheterocyclyl, fused cyclyl and fused heterocyclyl, wherein $R_9$ and $R_{10}$ are each independently selected from the group consisting of the following optionally substituted groups: hydrogen, $C_{1-6}$ alkyl, $C_{3-10}$ cycloalkyl, $C_{2-6}$ alkenyl, $C_{2-6}$ alkynyl, 3— to 10-membered heterocycloalkyl, $C_{6-14}$ aryl, and 5— to 10-membered heteroaryl; when a group is substituted, a hydrogen atom at a substitutable position of the group is substituted with one or more substituents and the substituents are each independently selected from the group consisting of halogen, hydroxyl, cyano, nitro, amino, azido, oxo, carboxyl, $C_{2-6}$ alkenyl, $C_{2-6}$ alkynyl, $C_{1-6}$ alkyl, $C_{1-6}$ alkoxy, $C_{3-10}$ cycloalkyl, $C_{3-10}$ cycloalkylsulfonyl, 3— to 10-membered heterocycloalkyl, $C_{6-14}$ aryl, and 5— to 10-membered heteroaryl, wherein the $C_{2-6}$ alkenyl, $C_{2-6}$ alkynyl, $C_{1-6}$ alkyl, $C_{1-6}$ alkoxy, $C_{3-10}$ cycloalkyl, $C_{3-10}$ cycloalkylsulfonyl, 3— to 10-membered heterocycloalkyl, $C_{6-14}$ aryl or 5— to 10-membered heteroaryl is optionally substituted with one or more substituents and the substituents are each independently selected from the group consisting of halogen, hydroxyl, amino, cyano, $C_{1-6}$ alkyl, and $C_{1-6}$ alkoxy, and oxo denotes that two hydrogen atoms at the same substitution position are substituted with the same oxygen atom to form a double bond; and when the heterocycloalkyl, bridged heterocyclyl, monospiroheterocyclyl, fused heterocyclyl and/or heteroaryl are present, the number of ring heteroatom in the groups is each independently 1 to 4, preferably 1 to 3, and the ring heteroatom is each independently selected from the group consisting of N, O, and S.

Specifically, the present disclosure provides the following compounds or the pharmaceutically acceptable salts, tautomers, geometric isomers, optical isomers, solvates, or isotopic derivatives thereof:

(S)-6-((1-(2-cyclopropyl-2-(hydroxyimino)acetyl)piperidin-4-yl)amino)-N-(3-(3,4-dihydroisoquinolin-2(1H)-yl)-2-hydroxypropyl)pyrimidine-4-carboxamide (PR-1);

(S)-6-((1-(2-cyclopropyl-2-(methoxyimino)acetyl)piperidin-4-yl)amino)-N-(3-(3,4-dihydroisoquinolin-2(1H)-yl)-2-hydroxypropyl)pyrimidine-4-carboxamide (PR-2);

(S)-N-(3-(3,4-dihydroisoquinolin-2(1H)-yl)-2-hydroxypropyl)-6-((1-(2-(hydroxyimino)propanoyl)piperidin-4-yl)amino)pyrimidine-4-carboxamide (PR-3);

(S)-N-(3-(3,4-dihydroisoquinolin-2(1H)-yl)-2-hydroxypropyl)-6-((1-(2-(methoxyimino)propanoyl)piperidin-4-yl)amino)pyrimidine-4-carboxamide (PR-4);

(S)-N-(3-(3,4-dihydroisoquinolin-2(1H)-yl)-2-hydroxypropyl)-6-((1-(2-(methoxyimino)-4-methylpentanoyl)piperidin-4-yl)amino)pyrimidine-4-carboxamide (PR-5);

(S)-6-((6-(2-cyclopropyl-2-(hydroxyimino)acetamido)spiro[3.3]heptan-2-yl)amino)-N-(3-(3,4-dihydroisoquinolin-2(1H)-yl)-2-hydroxypropyl)pyrimidine-4-carboxamide (PR-6);

(S)-6-((6-(2-cyclopropyl-2-(methoxyimino)acetamido)spiro[3.3]heptan-2-yl)amino)-N-(3-(3,4-dihydroisoquinolin-2(1H)-yl)-2-hydroxypropyl)pyrimidine-4-carboxamide (PR-7);

(S)-N-(3-(3,4-dihydroisoquinolin-2(1H)-yl)-2-hydroxypropyl)-6-((6-(2-(hydroxyimino)propanamido)spiro[3.3]heptan-2-yl)amino)pyrimidine-4-carboxamide (PR-8);

(S)-N-(3-(3,4-dihydroisoquinolin-2(1H)-yl)-2-hydroxypropyl)-6-((6-(2-(methoxyimino)propanamido)spiro[3.3]heptan-2-yl)amino)pyrimidine-4-carboxamide (PR-9);

(S)-N-(3-(3,4-dihydroisoquinolin-2(1H)-yl)-2-hydroxypropyl)-6-((2-(2-(methoxyimino)propanoyl)-2-azaspiro[3.3]heptan-6-yl)amino)pyrimidine-4-carboxamide (PR-10);

(S)-6-((2-(2-cyclopropyl-2-(hydroxyimino)acetyl)-2-azaspiro[3.3]heptan-6-yl)amino)-N-(3-(3,4-dihydroisoquinolin-2(1H)-yl)-2-hydroxypropyl)pyrimidine-4-carboxamide (PR-11);

(S)-6-((2-(2-cyclopropyl-2-(methoxyimino)acetyl)-2-azaspiro[3.3]heptan-6-yl)amino)-N-(3-(3,4-dihydroisoquinolin-2(1H)-yl)-2-hydroxypropyl)pyrimidine-4-carboxamide (PR-12);

(S)-N-(3-(3,4-dihydroisoquinolin-2(1H)-yl)-2-hydroxypropyl)-6-((7-(2-(methoxyimino)propanoyl)-7-azaspiro[3.5]nonan-2-yl)amino)pyrimidine-4-carboxamide (PR-13);

(S)-6-((1-(2-((cyclopentyloxy)imino)-2-cyclopropylacetyl)piperidin-4-yl)amino)-N-(3-(3,4-dihydroisoquinolin-2(1H)-yl)-2-hydroxypropyl)pyrimidine-4-carboxamide (PR-14);

(S)-6-((6-(2-(cyclopentyloxy)imino)propanamido)spiro[3.3]heptan-2-yl)amino)-N-(3-(3,4-dihydroisoquinolin-2(1H)-yl)-2-hydroxypropyl)pyrimidine-4-carboxamide (PR-15);

(S)-6-((6-(2-((cyclopentyloxy)imino)-2-cyclopropylacetamido)spiro[3.3]heptan-2-yl)amino)-N-(3-(3,4-dihydroisoquinolin-2(1H)-yl)-2-hydroxypropyl)pyrimidine-4-carboxamide (PR-16);

(S)-6-((1-(2-cyclopropyl-2-((cyclopropylmethoxy)imino)acetyl)piperidin-4-yl)amino)-N-(3-(3,4-dihydroisoquinolin-2(1H)-yl)-2-hydroxypropyl)pyrimidine-4-carboxamide (PR-17);

(S)-6-((2-(2-cyclopropyl-2-((cyclopropylmethoxy)imino)acetyl)-2-azaspiro[3.3]heptan-6-yl)amino)-N-(3-(3,4-dihydroisoquinolin-2(1H)-yl)-2-hydroxypropyl)pyrimidine-4-carboxamide (PR-18);

(S)-6-((1-(2-cyclopropyl-2-((pyridin-2-ylmethoxy)imino)acetyl)piperidin-4-yl)amino)-N-(3-(3,4-dihydroisoquinolin-2(1H)-yl)-2-hydroxypropyl)pyrimidine-4-carboxamide (PR-19);

(S)-6-((6-(2-cyclopropyl-2-((pyridin-2-ylmethoxy)imino)acetamido)spiro[3.3]heptan-2-yl)amino)-N-(3-(3,4-dihydroisoquinolin-2(1H)-yl)-2-hydroxypropyl)pyrimidine-4-carboxamide (PR-20);

6-((1-(2-cyclopropyl-2-(hydroxyimino)acetyl)-3,3-difluoropiperidin-4-yl)amino)-N-((S)-3-(3,4-dihydroisoquinolin-2(1H)-yl)-2-hydroxypropyl)pyrimidine-4-carboxamide (PR-21);

6-((1-(2-cyclopropyl-2-(methoxyimino)acetyl)-3,3-difluoropiperidin-4-yl)amino)-N-((S)-3-(3,4-dihydroisoquinolin-2(1H)-yl)-2-hydroxypropyl)pyrimidine-4-carboxamide (PR-22);

6-((1-(2-((cyclopentyloxy)imino)-2-cyclopropylacetyl)-3,3-difluoropiperidin-4-yl)amino)-N-((S)-3-(3,4-dihydroisoquinolin-2(1H)-yl)-2-hydroxypropyl)pyrimidine-4-carboxamide (PR-23);

6-((1-(2-cyclopropyl-2-(methoxyimino)acetyl)-3-fluoropiperidin-4-yl)amino)-N-((S)-3-(3,4-dihydroisoquinolin-2(1H)-yl)-2-hydroxypropyl)pyrimidine-4-carboxamide (PR-24);

N-((S)-3-(3,4-dihydroisoquinolin-2(1H)-yl)-2-hydroxypropyl)-6-((3-fluoro-1-(2-(methoxyimino)propanoyl)piperidin-4-yl)amino)pyrimidine-4-carboxamide (PR-25);

6-((1-(2-((cyclopropylmethoxy)imino)propanoyl)-3-fluoropiperidin-4-yl)amino)-N-((S)-3-(3,4-dihydroisoquinolin-2(1H)-yl)-2-hydroxypropyl)pyrimidine-4-carboxamide (PR-26);

6-((1-(2-cyclopropyl-2-(hydroxyimino)acetyl)piperidin-3-yl)amino)-N-((S)-3-(3,4-dihydroisoquinolin-2(1H)-yl)-2-hydroxypropyl)pyrimidine-4-carboxamide (PR-27);

6-((1-(2-cyclopropyl-2-(methoxyimino)acetyl)piperidin-3-yl)amino)-N-((S)-3-(3,4-dihydroisoquinolin-2(1H)-yl)-2-hydroxypropyl)pyrimidine-4-carboxamide (PR-28);

N-((S)-3-(3,4-dihydroisoquinolin-2(1H)-yl)-2-hydroxypropyl)-6-((1-(2-(methoxyimino)propanoyl)piperidin-3-yl)amino)pyrimidine-4-carboxamide (PR-29);

6-((1-(2-cyclopropyl-2-(hydroxyimino)acetyl)pyrrolidin-3-yl)amino)-N-((S)-3-(3,4-dihydroisoquinolin-2(1H)-yl)-2-hydroxypropyl)pyrimidine-4-carboxamide (PR-30);

6-((1-(2-cyclopropyl-2-(methoxyimino)acetyl)pyrrolidin-3-yl)amino)-N-((S)-3-(3,4-dihydroisoquinolin-2(1H)-yl)-2-hydroxypropyl)pyrimidine-4-carboxamide (PR-31);

N-((S)-3-(3,4-dihydroisoquinolin-2(1H)-yl)-2-hydroxypropyl)-6-((1-(2-(hydroxyimino)propanoyl)pyrrolidin-3-yl)amino)pyrimidine-4-carboxamide (PR-32);

(S)-N-(3-(3,4-dihydroisoquinolin-2(1H)-yl)-2-hydroxypropyl)-6-((1-(2-(hydroxyimino)-4-methylpentanoyl)piperidin-4-yl)amino)pyrimidine-4-carboxamide (PR-33);

(S)-N-(3-(3,4-dihydroisoquinolin-2(1H)-yl)-2-hydroxypropyl)-6-((6-(2-(hydroxyimino)-4-methylpentanamido)spiro[3.3]heptan-2-yl)amino)pyrimidine-4-carboxamide (PR-34);

6-((1-(2-(4-(cyclopropylsulfonyl)phenyl)-2-(methoxyimino)acetyl)-3-fluoropiperidin-4-yl)amino)-N-((S)-3-(3,4-dihydroisoquinolin-2(1H)-yl)-2-hydroxypropyl)pyrimidine-4-carboxamide (PR-35);

(S)-6-((1-(2-(4-(cyclopropylsulfonyl)phenyl)-2-(methoxyimino)acetyl)piperidin-4-yl)amino)-N-(3-(3,4-dihydroisoquinolin-2(1H)-yl)-2-hydroxypropyl)pyrimidine-4-carboxamide (PR-36);

(S)-6-((7-(2-cyclopropyl-2-(hydroxyimino)acetyl)-7-azaspiro[3.5]nonan-2-yl)amino)-N-(3-(3,4-dihydroisoquinolin-2(1H)-yl)-2-hydroxypropyl)pyrimidine-4-carboxamide (PR-37);

(S)-N-(3-(3,4-dihydroisoquinolin-2(1H)-yl)-2-hydroxypropyl)-6-((7-(2-(hydroxyimino)propanoyl)-7-azaspiro[3.5]nonan-2-yl)amino)pyrimidine-4-carboxamide (PR-38);

(S)-6-((1-(2-(cyclopentyloxy)imino)propanoyl)piperidin-4-yl)amino)-N-(3-(3,4-dihydroisoquinolin-2(1H)-yl)-2-hydroxypropyl)pyrimidine-4-carboxamide (PR-39); and (S)-6-((7-(2-cyclopropyl-2-(methoxyimino)acetyl)-7-azaspiro[3.5]nonan-2-yl)amino)-N-(3-(3,4-dihydroisoquinolin-2(1H)-yl)-2-hydroxypropyl)pyrimidine-4-carboxamide (PR-40).

In the second aspect, the present disclosure provides a pharmaceutical composition, comprising the compound or the pharmaceutically acceptable salt, tautomer, geometric isomer, optical isomer, solvate or isotopic derivative thereof as described above.

In some embodiments of the present disclosure, the pharmaceutical composition comprises the compound or the pharmaceutically acceptable salt, tautomer, geometric isomer, optical isomer, solvate or isotopic derivative thereof as described above, and a pharmaceutically acceptable excipient.

In the third aspect, the present disclosure provides use of the compound or the pharmaceutically acceptable salt, tautomer, geometric isomer, optical isomer, solvate or isotopic derivative thereof as described above or the pharmaceutical composition as described above in the preparation of a medication.

In the fourth aspect, the present disclosure provides use of the compound or the pharmaceutically acceptable salt, tautomer, geometric isomer, optical isomer, solvate or isotopic derivative thereof as described above or the pharmaceutical composition as described above in the preparation of a medication as a PRMT5 inhibitor.

In the fifth aspect, the present disclosure provides use of the compound or the pharmaceutically acceptable salt, tautomer, geometric isomer, optical isomer, solvate or isotopic derivative thereof as described above or the pharmaceutical composition as described above in the preparation of a medication for preventing and/or treating a disease that is at least partially mediated by PRMT5.

In some embodiments of the present disclosure, the disease that is at least partially mediated by PRMT5 is a cell proliferative disease; preferably, the cell proliferative disease is a tumor or cancer; further preferably, the tumor or cancer is a hematological tumor or a solid tumor; still further preferably a hematological malignant tumor or an advanced solid tumor.

In the sixth aspect, the present disclosure provides use of the compound or the pharmaceutically acceptable salt, tautomer, geometric isomer, optical isomer, solvate or isotopic derivative thereof as described above or the pharmaceutical composition as described above in the preparation of a medication for preventing and/or treating a cell proliferative disease.

In some embodiments of the present disclosure, the cell proliferative disease is a tumor or cancer; preferably, the tumor or cancer is a hematological tumor or a solid tumor; further preferably a hematological malignant tumor or an advanced solid tumor.

In the seventh aspect, the present disclosure provides the compound or the pharmaceutically acceptable salt, tautomer, geometric isomer, optical isomer, solvate or isotopic derivative thereof as described above or the pharmaceutical composition as described above for use in the prevention and/or treatment of a disease that is at least partially mediated by PRMT5.

In some embodiments of the present disclosure, the disease that is at least partially mediated by PRMT5 is a cell proliferative disease; preferably, the cell proliferative disease is a tumor or cancer; further preferably, the tumor or cancer is a hematological tumor or a solid tumor; still further preferably a hematological malignant tumor or an advanced solid tumor.

In the eighth aspect, the present disclosure provides the compound or the pharmaceutically acceptable salt, tautomer, geometric isomer, optical isomer, solvate or isotopic derivative thereof as described above or the pharmaceutical composition as described above for use in the prevention and/or treatment of a cell proliferative disease.

In some embodiments of the present disclosure, the cell proliferative disease is a tumor or cancer; preferably, the tumor or cancer is a hematological tumor or a solid tumor; further preferably a hematological malignant tumor or an advanced solid tumor.

In the ninth aspect, the present disclosure provides a method for preventing and/or treating a disease that is at least partially mediated by PRMT5, comprising: administering to a subject in need thereof a prophylactically and/or therapeutically effective amount of the compound or the pharmaceutically acceptable salt, tautomer, geometric isomer, optical isomer, solvate or isotopic derivative thereof as described above or the pharmaceutical composition as described above.

In some embodiments of the present disclosure, the disease that is at least partially mediated by PRMT5 is a cell proliferative disease; preferably, the cell proliferative disease is a tumor or cancer; further preferably, the tumor or cancer is a hematological tumor or a solid tumor; still further preferably a hematological malignant tumor or an advanced solid tumor.

In the tenth aspect, the present disclosure provides a method for preventing and/or treating a cell proliferative disease, comprising: administering to a subject in need thereof a prophylactically and/or therapeutically effective amount of the compound or the pharmaceutically acceptable salt, tautomer, geometric isomer, optical isomer, solvate or isotopic derivative thereof as described above or the pharmaceutical composition as described above.

In some embodiments of the present disclosure, the cell proliferative disease is a tumor or cancer; preferably, the tumor or cancer is a hematological tumor or a solid tumor; further preferably a hematological malignant tumor or an advanced solid tumor.

In some embodiments of the present disclosure, the above-mentioned tumor or cancer is selected from the group consisting of lung cancer, bone cancer, stomach cancer, pancreatic cancer, adenoid cystic carcinoma, skin cancer, head and neck cancer, uterine cancer, ovarian cancer, testicular cancer, fallopian tube cancer, endometrial carcinoma, cervical cancer, vaginal cancer, brain cancer, pituitary adenoma, melanoma, epidermoid carcinoma, and chronic and acute leukemia; preferably, the acute leukemia is acute myeloid leukemia (AML).

Advantageous Effects

The present disclosure provides a structurally novel compound. The results of in vitro enzymatic and cell experiments show that the compounds of the present disclosure have better inhibitory activities against PRMT5 and MV4-11 cells as compared to a positive control drug GSK3326595; the results of in vivo pharmacodynamic experiment show that the compounds of the present disclosure have a significant anti-tumor activity, and have significantly better inhibitory effects on tumor weight and tumor volume than those of the positive control drug GSK3326595; and the results of in vivo pharmacokinetic experiment show that the compounds of the present disclosure have better performance of oral administration, high absorption rate, and good absorption performance.

DETAILED DESCRIPTION

Definitions of Terms

Unless otherwise specified herein, the term "alkyl" refers to a monovalent, linear or branched, saturated aliphatic hydrocarbyl having 1 to 20 carbon atoms, which includes, but is not limited to, methyl, ethyl, n-propyl, isopropyl, n-butyl, isobutyl, tert-butyl, sec-butyl, n-pentyl, neopentyl, 1,1-dimethylpropyl, 1,2-dimethylpropyl, 2,2-dimethylpropyl, 1-ethylpropyl, 2-methylbutyl, 3-methylbutyl, n-hexyl, n-heptyl, n-octyl, and the like. For example, "$C_{1-6}$ alkyl" refers to an alkyl having the number of carbon atoms in the carbon chain of between 1 and 6.

Unless otherwise specified herein, the term "alkylene" refers to a divalent, linear or branched, saturated aliphatic hydrocarbyl having 1 to 20 carbon atoms, which includes, but is not limited to, methylene, 1,2-ethylidene, 1,1-ethylidene, 1,3-propylidene, 1,2-propylidene, 1,1-propylidene, and the like. For example, "$C_{1-6}$ alkylene" refers to an alkylene having the number of carbon atoms in the carbon chain of between 1 and 6.

Unless otherwise specified herein, the term "alkoxy" refers to —O-alkyl, where the alkyl is as defined above, preferably having 1 to 10 carbon atoms, more preferably 1 to 6 carbon atoms, which includes, but is not limited to, methoxy, ethoxy, propoxy, tert-butoxy, pentyloxy, 1-methylbutoxy, 2-methylbutoxy, 3-methylbutoxy, 1,1-dimethylpropoxy, 1,2-dimethylpropoxy, 2,2-dimethylpropoxy, 1-ethylpropoxy, and the like.

Unless otherwise specified herein, the term "alkyl ester group" refers to —OC(O)— alkyl or alkyl-OC(O)—, and "alkanoyloxy" refers to —OC(O)-alkyl, where the alkyl is as defined above, preferably having 1 to 10 carbon atoms, more preferably 1 to 6 carbon atoms, which includes, but is not limited to, acetoxy, pivaloyloxy, and the like.

Unless otherwise specified herein, the term "alkylamino" refers to —NH-alkyl or —N(alkyl)$_2$, where the alkyl is as defined above, preferably having 1 to 10 carbon atoms, more preferably 1 to 6 carbon atoms, which includes, but is not limited to, methylamino, ethylamino, dimethylamino, diethylamino, and the like.

Unless otherwise specified herein, the term "alkylamido" refers to alkyl-C(O)NH— or alkyl-NH—C(O)—, and "cycloalkylamido" and "heterocycloalkylamido" refer to cycloalkyl-C(O)NH— or cycloalkyl-NH—C(O)— and heterocycloalkyl-C(O)NH— or heterocycloalkyl-NH—C(O)— respectively, where the alkyl, cycloalkyl, and heterocycloalkyl are as defined above, preferably having 1 to 10 carbon atoms, more preferably 1 to 6 carbon atoms, which include, but are not limited to, acetamido, pivalamido, and the like.

Unless otherwise specified herein, the term "alkenyl" refers to a monovalent, linear or branched, aliphatic hydrocarbyl having 2 to 20 carbon atoms and at least one carbon-carbon double bond, which includes, but is not limited to, ethenyl, propenyl, butenyl, and the like. For example, "$C_{2-6}$ alkenyl" refers to an alkenyl having the number of carbon atoms in the carbon chain of between 2 and 6.

Unless otherwise specified herein, the term "alkynyl" refers to a monovalent, linear or branched, aliphatic hydrocarbyl having 2 to 20 carbon atoms and at least one carbon-carbon triple bond, which includes, but is not limited to, ethynyl, propynyl, butynyl, and the like. For example, "$C_{2-6}$ alkynyl" refers to an alkynyl having the number of carbon atoms in the carbon chain of between 2 and 6.

Unless otherwise specified herein, the term "carbocyclyl" or "carbocyclic ring" refers to a saturated or partially unsaturated, monocyclic or polycyclic (e.g., fused cyclic, bridged cyclic, or spirocyclic), aliphatic hydrocarbyl having 3 to 14 ring carbon atoms and having no ring heteroatoms. For example, "$C_{3-10}$ carbocyclyl" refers to a carbocyclyl having the number of carbon atoms in the carbon ring of between 3 and 10. Exemplary $C_{3-10}$ carbocyclyl includes, but is not limited to, cyclopropyl ($C_3$), cyclopropenyl ($C_3$), cyclobutyl ($C_4$), cyclobutenyl ($C_4$), cyclopentyl ($C_5$), cyclopentenyl ($C_5$), cyclohexyl ($C_6$), cyclohexenyl ($C_6$), cyclohexadienyl ($C_6$), cycloheptyl ($C_7$), cycloheptenyl ($C_7$), cycloheptadienyl ($C_7$), cycloheptatrienyl ($C_7$), cyclooctyl ($C_8$), cyclooctenyl ($C_8$), bicyclo[2.2.1]heptyl ($C_7$), bicyclo[2.2.2]octyl ($C_8$), cyclononyl ($C_9$), cyclononenyl ($C_9$), cyclodecyl ($C_{10}$), cyclodecenyl ($C_{10}$), octahydro-1H-indenyl ($C_9$), decahydronaphthyl ($C_{10}$), spiro[4.5]decyl ($C_{10}$), and the like.

Unless otherwise specified herein, the term "cycloalkyl" refers to a monocyclic saturated aliphatic hydrocarbyl having specified number of ring carbon atoms, preferably $C_{3-12}$ cycloalkyl, more preferably $C_{3-10}$ cycloalkyl, further preferably $C_{3-7}$ cycloalkyl, $C_{3-6}$ cycloalkyl, $C_{5-7}$ cycloalkyl or $C_{4-6}$ cycloalkyl, which includes, but is not limited to, cyclopropyl, cyclohexyl, methylcyclopropyl, 2-ethylcyclopentyl, dimethylcyclobutyl, and the like.

Unless otherwise specified herein, the term "bridged cyclyl" refers to a bridged cyclic saturated aliphatic hydrocarbyl having specified number of ring carbon atoms, preferably $C_{4-12}$ bridged cyclyl, more preferably $C_{4-10}$ bridged cyclyl, further preferably $C_{4-8}$ bridged cyclyl, $C_4$-7 bridged cyclyl, $C_{5-8}$ bridged cyclyl or $C_{5-7}$ bridged cyclyl, which includes, but is not limited to, bicyclic[2.1.1]hexyl, bicyclic[3.1.0]hexyl, bicyclic[2.2.1]heptyl, bicyclic[2.2.2]octyl, and the like.

Unless otherwise specified herein, the term "monospirocyclyl" refers to a saturated aliphatic hydrocarbyl having specified number of ring carbon atoms and one spiro-carbon atom, preferably $C_{5-10}$ monospirocyclyl, more preferably $C_{5-9}$ monospirocyclyl, further preferably $C_{5-8}$ monospirocyclyl, $C_{5-7}$ monospirocyclyl, $C_{6-8}$ monospirocyclyl or $C_{6-7}$ monospirocyclyl, which includes, but is not limited to, spiro[2.2]pentyl, spiro[2.3]hexyl, spiro[2.4]heptyl, spiro[3.3]heptyl, spiro[3.4]octyl, spiro[3.5]nonyl, spiro[4.4]nonyl, spiro[4.5]decyl, and the like.

Unless otherwise specified herein, the term "fused cyclyl" refers to a hydrocarbyl formed by the fusion of two or more unsaturated or partially unsaturated rings through common side(s), for example, pentalenyl as five-membered/five-membered fused cyclyl, indenyl as five-membered/six-membered fused cyclyl, naphthyl as six-membered/six-membered fused cyclyl, anthryl as six-membered/six-membered/six-membered fused cyclyl, etc.

Unless otherwise specified herein, the term "heterocyclyl" or "heterocyclic ring" refers to a saturated or partially unsaturated, monocyclic or polycyclic (e.g., fused cyclic, bridged cyclic, or spirocyclic), aliphatic group having 3 to 20 ring atoms, including 1 to 4 ring heteroatoms that are each independently selected from the group consisting of N, O, and S. For example, "3— to 10-membered heterocyclyl" refers to a heterocyclyl having the number of ring atoms of between 3 to 10, where the number of ring heteroatoms is preferably 1, 2 or 3. Exemplary 3-membered heterocyclyl containing one heteroatom includes, but is not limited to, aziranyl, oxiranyl, and thiranyl. Exemplary 4-membered heterocyclyl containing one heteroatom includes, but is not limited to, azetanyl, oxetanyl, and thietanyl. Exemplary 5-membered heterocyclyl containing one heteroatom includes, but is not limited to, tetrahydrofuranyl, dihydrofuranyl, tetrahydrothienyl, dihydrothienyl, pyrrolidinyl, dihydropyrrolyl, and 2,5-dioxopyrrolidinyl. Exemplary 5-membered heterocyclyl containing two heteroatoms includes, but is not limited to, imidazolidinyl, dioxolanyl, oxathiolanyl, dithiolanyl, and 2-oxo-oxazolidinyl. Exemplary 5-membered heterocyclyl containing three heteroatoms includes, but is not limited to, triazolinyl, oxadiazolinyl, and thiadiazolinyl. Exemplary 6-membered heterocyclyl containing one heteroatom includes, but is not limited to, piperidinyl, tetrahydropyranyl, dihydropyridinyl, and thianyl. Exemplary 6-membered heterocyclyl containing two heteroatoms includes, but is not limited to, piperazinyl, morpholinyl, thiomorpholinyl, and dioxanyl. Exemplary 6-membered heterocyclyl containing three heteroatoms includes, but is not limited to, triazinanyl, oxadiazinanyl, thiadiazinanyl, oxathiazinanyl, and dioxazinanyl. Exemplary 7-membered heterocyclyl containing one heteroatom includes, but is not limited to, azepanyl, oxepanyl, and thiepanyl. Exemplary 8-membered heterocyclyl containing one heteroatom includes, but is not limited to, azacyclooctyl, oxacyclooctyl, and thiacyclooctyl. Exemplary 5,6-bicyclic heterocyclyl formed by fusing a benzene ring with a 5-membered heterocyclic ring includes, but is not limited to, indolinyl, isoindolinyl, dihydrobenzofuranyl, dihydrobenzothienyl, benzoxazolinonyl, and the like. Exemplary 6,6-bicyclic heterocyclyl formed by fusing a benzene ring with a 6-membered heterocyclic ring includes, but is not limited to, tetrahydroquinolinyl, tetrahydroisoquinolinyl, and the like.

Unless otherwise specified herein, "heterocycloalkyl" refers to a monocyclic saturated aliphatic group having specified number of ring atoms, preferably having 3 to 20 ring atoms, including 1, 2, 3 or 4 (preferably 1, 2 or 3) ring heteroatoms that are each independently selected from the group consisting of N, O, and S, i.e., 3— to 20-membered heterocycloalkyl, preferably 3— to 12-membered heterocycloalkyl, more preferably 3— to 10-membered heterocycloalkyl, further preferably 3— to 8-membered heterocycloalkyl, 4—to 7-membered heterocycloalkyl, 5— to 10-membered heterocycloalkyl or 5— or 6-membered heterocycloalkyl. Some of exemplary "heterocycloalkyl" have been listed when describing "heterocyclyl" or "heterocyclic ring" above.

Unless otherwise specified herein, the term "bridged heterocyclyl" refers to a bridged cyclic saturated aliphatic group having specified number of ring atoms, preferably having 4 to 20 ring atoms, including 1, 2, 3 or 4 (preferably 1, 2 or 3) ring heteroatoms that are each independently selected from the group consisting of N, O, and S, preferably 4— to 12-membered bridged heterocyclyl, more preferably 4— to 10-membered bridged heterocyclyl, further preferably 4— to 8-membered bridged heterocyclyl, 4— to 7-membered bridged heterocyclyl, 5— to 8-membered bridged heterocyclyl or 5— to 7-membered bridged heterocyclyl, which includes, but is not limited to, azabicyclo[2.1.1]hexyl, azabicyclo[3.1.0]hexyl, oxabicyclo[2.2.1]heptyl, oxabicyclo[2.2.2]octyl, etc.

Unless otherwise specified herein, the term "monospiroheterocyclyl" refers to a saturated aliphatic group having specified number of ring carbon atoms and one spiro-carbon atom, preferably having 5 to 20 ring atoms, including 1, 2, 3 or 4 (preferably 1, 2 or 3) ring heteroatoms that are each independently selected from the group consisting of N, O, and S, preferably 5— to 10-membered monospiroheterocyclyl, more preferably 5— to 9-membered monospiroheterocyclyl, further preferably 5— to 8-membered monospiroheterocyclyl, 5— to 7-membered monospiroheterocyclyl, 6— to 8-membered monospiroheterocyclyl or 6— to 7-membered monospiroheterocyclyl, which includes, but is not limited to, oxaspiro[2.4]heptyl, azaspiro[3.3]heptyl, oxaspiro[3.4]octyl, azaspiro[3.5]nonyl, dioxaspiro[4.4]nonyl, 2,4-dioxo-1,3-diazaspiro[4.5]decyl, etc.

Unless otherwise specified herein, the term "fused heterocyclyl" refers to a group formed by the fusion of two or more unsaturated or partially unsaturated rings through common side(s) and at least one of the rings is a heterocyclic ring having at least one heteroatom selected from the group consisting of N, O, and S, for example, dihydropyrrolopyrrolyl as five-membered/five-membered fused heterocyclyl, indolyl and pyrrolopyridinyl as five-membered/six-membered fused heterocyclyl, quinolinyl and naphthyridinyl as six-membered/six-membered fused heterocyclyl, etc.

Unless otherwise specified herein, the term "aryl" or "aromatic ring group" refers to a monocyclic or polycyclic, aromatic hydrocarbyl having 6 to 16, preferably 6 to 14, more preferably 6 to 12, further preferably 6 to 10 ring atoms. For example, "$C_{6-10}$ aryl" refers to an aryl having the number of carbon atoms in the ring of between 6 and 10. Exemplary aryl includes, but is not limited to, phenyl, napthyl, anthryl, phenanthryl, pyrenyl, and the like.

Unless otherwise specified herein, the term "heteroaryl" or "heteroaromatic ring group" refers to a monocyclic or polycyclic, aromatic group having a 5— to 14-membered cyclic structure, preferably 5— to 10-membered cyclic structure, more preferably 5— to 8-membered cyclic structure, further preferably 5— to 6-membered cyclic structure, including 1, 2, 3 or 4 (preferably 1, 2 or 3) ring heteroatoms that are each independently selected from the group consisting of N, O, and S. For example, "5— to 10-membered heteroaryl" refers to a heteroaryl having the number of ring atoms of between 5 and 10.

Exemplary heteroaryl includes, but is not limited to, furyl, thienyl, oxazolyl, thiazolyl, isoxazolyl, oxadiazolyl, thiadiazolyl, pyrrolyl, pyrazolyl, imidazolyl, triazolyl, tetrazolyl, pyridinyl, pyrimidinyl, pyrazinyl, pyridazinyl, triazinyl, phthalazinyl, quinolinyl, isoquinolinyl, pteridyl, purinyl, indolyl, isoindolyl, indazolyl, benzofuranyl, benzothienyl, benzopyridinyl, benzopyrimidinyl, benzopyrazinyl, benzimidazolyl, benzophthalazinyl, pyrrolo[2,3-b]pyridinyl, imidazo[1,2-a]pyridinyl, pyrazolo[1,5-a]pyridinyl, pyrazolo[1,5-a]pyrimidinyl, imidazo[1,2-b]pyridazinyl, [1,2,4]triazolo[4,3-b]pyridazinyl, [1,2,4]triazolo[1,5-a]pyrimidinyl, [1,2,4]triazolo[1,5-a]pyridinyl, etc.

Unless otherwise specified herein, the term "halogen" refers to F, Cl, Br or I.

The term "haloalkyl" means that alkyl as defined herein is substituted with one or more halogens. Exemplary haloalkyl includes, but is not limited to, trichloromethyl (—$CCl_3$), trifluoromethyl (—$CF_3$), dichloromethyl (—$CHCl_2$), 2,2,2-trifluoroethyl (—$CH_2CF_3$), pentafluoroethyl (—$CF_2CF_3$), etc.

Unless otherwise specified herein, the term "hydroxyl" refers to —OH group.

Unless otherwise specified herein, the term "amino" refers to —$NH_2$ group.

Unless otherwise specified herein, the term "carboxyl" refers to —C(O)OH group.

Unless otherwise specified herein, the term "nitro" refers to —$NO_2$ group.

Unless otherwise specified herein, the term "cyano" refers to —CN group.

Unless otherwise specified herein, the term "azido" refers to —$N_3$ group.

Unless otherwise specified herein, the term "oxo (=O)" means that two hydrogen atoms at the same substitution position are substituted with the same oxygen atom to form a double bond.

Unless otherwise specified herein, the term "optionally substituted" means that a hydrogen at a substitutable position of a group may either be unsubstituted or substituted with one or more substituents and the substituents are each independently selected from the group consisting of halogen, hydroxyl, cyano, nitro, amino, azido, oxo, carboxyl, $C_{2-6}$ alkenyl, $C_{2-6}$ alkynyl, $C_{1-6}$ alkyl, $C_{1-6}$ alkoxy, $C_{3-10}$ cycloalkyl, $C_{3-10}$ cycloalkylsulfonyl, 3— to 10-membered heterocycloalkyl, $C_{6-14}$ aryl, and 5— to 10-membered heteroaryl, in which $C_{2-6}$ alkenyl, $C_{2-6}$ alkynyl, $C_{1-6}$ alkyl, $C_{1-6}$ alkoxy, $C_{3-10}$ cycloalkyl, $C_{3-10}$ cycloalkylsulfonyl, 3— to 10-membered heterocycloalkyl, $C_{6-14}$ aryl or 5— to 10-membered heteroaryl is optionally substituted with one or more substituents and the substituents are each independently selected from the group consisting of halogen, hydroxyl, amino, cyano, $C_{1-6}$ alkyl, and $C_{1-6}$ alkoxy, and oxo means that two hydrogen atoms at the same substitution position are substituted with the same oxygen atom to form a double bond.

Unless otherwise specified herein, the term "pharmaceutically acceptable salt" refers to a salt, which is suitable, within the scope of sound medical judgment, for contact with the tissues of mammals (in particular human beings) without undue toxicity, irritation, allergic response or the like and commensurate with a reasonable benefit/risk ratio. Unless otherwise specified herein, the term "salt" includes both acid addition salts derived from inorganic acids and acid addition salts derived from organic acids. If a compound is a free acid, the pharmaceutically acceptable salt thereof includes base addition salts derived from inorganic bases and organic bases.

Geometric isomers refer to isomers arising from a failure to freely rotate due to steric hindrance in the structure. Geometric isomerism may exist in the present compounds. The compounds of the present disclosure may comprise a carbon-carbon double bond or carbon-nitrogen double bond having E— or Z-configuration, where the term "E" denotes that two higher priority substituents are on opposite sides of the carbon-carbon or carbon-nitrogen double bond, and the term "Z" denotes that two higher priority substituents are on the same side of the carbon-carbon or carbon-nitrogen double bond (determined by the Cahn-Ingold-Prelog Sequence Rules). The compounds of the present disclosure may also exist as mixtures of "E" and "Z" isomers. The relative position between the substituents around a cycloalkyl or heterocycloalkyl is referred to as cis or trans configuration.

Optical isomers refer to substances with the same molecular structure, similar physical and chemical properties, but different optical rotations. The compounds of the present disclosure having the R- or S-configuration may comprise an asymmetrically substituted carbon atom, where the terms "R" and "S" are as defined in IUPAC 1974 Recommendations for Section E, Fundamental Stereochemistry, Pure Appl. Chem. (1976) 45, 13-10. Compound having asymmetrically substituted carbon atoms (with the equal amount of R and S configurations) is referred to as a racemate, when focusing on those carbon atoms. An atom having an excess of one configuration (relative to the other) allows this configuration to become larger in amount, preferably in an excess of about 85% to 90%, more preferably in an excess of about 95% to 99%, and even more preferably in an excess of greater than about 99%. Accordingly, the present disclosure includes racemic mixtures, optical isomers having relative configurations, optical isomers having absolute configurations, and mixtures of the optical isomers having relative configurations and the optical isomers having absolute configurations.

The term "solvate" refers to a complex formed by one or more solvent molecules and the compound of the present disclosure.

The term "tautomer" refers to structural isomers of different energies that may be interconvertible over a low energy barrier. If tautomerism is possible (e.g., in a solution), a chemical equilibrium of tautomers can be achieved. For example, proton tautomers (also referred to as prototropic tautomers) include those interconverted by proton migration, such as keto-enol isomerization and imine-enamine isomerization. Valence tautomers include those interconverted by rearrangements of some of the bonding electrons. Unless otherwise indicated, all tautomeric forms of the compounds of the present disclosure are within the scope of the present disclosure.

The term "isotopic derivative" means that the compounds of the present disclosure may exist in isotopically labelled or enriched form, and comprise one or more atoms whose atomic weight or mass number differs from that of the atom with the highest natural abundance. Isotopes may be radioactive or non-radioactive. Isotopes of atoms such as hydrogen, carbon, phosphorus, sulfur, fluorine, chlorine, and iodine include, but are not limited to, $^2H$, $^3H$, $^{13}C$, 14C, $^{15}N$, 180, $^{32}p$ 35S, $^{18}F$, $^{36}Cl$, and $^{125}I$. Compounds comprising other isotopes of these atoms and/or other atoms are within the scope of the present disclosure.

In another embodiment, isotopically labelled compounds comprise deuterium (2H), tritium ($^3H$) or $^{14}C$ isotopes. The isotopically labelled compounds of the present disclosure may be prepared by general methods familiar to a person skilled in the art. In this regard, the relevant literature includes: Lizondo, J et al, Drugs Fut, 21(11), 1116(1996); Brickner, S J et al, J Med Chem, 39(3), 673(1996); and Mallesham, B et al, Org Lett, 5(7), 963(2003).

Isotope-containing compounds have already been applied in pharmaceutical researches. The in vivo pharmacokinetic profiles of the compounds have been studied by evaluating the mechanism of action and metabolic pathway of non-isotopically labelled parent compounds (Blake et al, J. Pharm. Sci. 64, 3, 367-391(1975)). In terms of the design of therapeutic drug with safety and efficacy, such pharmacokinetic studies are of significance because the in vivo active compound administered to the patient or the metabolite derived from the parent compound has been proven to be toxic or carcinogenic (Kushner et al, Can. J. Physiol. Pharmacol., 77, 79-88(1999); Foster et al, Advances in Drug Research Vol. 14, pp. 2-36, Academic press, London, 1985; and Kato et al, J. Labelled Comp. Radiopharmaceut., 36(10):927-932(1995)).

In addition, drugs comprising non-radioactive isotopes, such as deuterated drugs known as "heavy drugs", can be used to treat associated diseases and conditions. The proportions of isotopes present in the above compounds increase beyond their natural abundances is referred to as enrichment. Exemplary amounts of enrichment include about 0.5, 1, 2, 3, 4, 5, 6, 7, 8, 9, 10, 12, 16, 21, 25, 29, 33, 37, 42, 46, 50, 54, 58, 63, 67, 71, 75, 79, 84, 88, 92, 96 to about 100 mol %.

Any possible position in molecular structure may be substituted with an isotope to obtain an isotopic derivative. For example, any possible position in molecule may be substituted with a deuterium (2H) to afford a derivative in deuterated form.

Stable isotope labelling can alter the physical and chemical properties of the drugs, such as pKa and lipid solubility. If the isotopic substitutions influence the regions involved in ligand-receptor interactions, these effects and alterations may influence the pharmacodynamic response of drug molecules. Although some physical properties of stable isotope-labelled molecules differ from those of unlabelled molecules, the chemical and biological properties are the same, with one important difference that any bond involving a heavy isotope and an additional atom is stronger than the same bond between a light isotope and that atom due to the increased mass of the heavy isotope. Accordingly, introducing an isotope into a site of metabolism or enzyme-catalyzed conversion may potentially slow down the reaction, which may alter pharmacokinetic properties or effects as compared to non-isotopic compounds.

The term "pharmaceutically acceptable excipient" includes, but is not limited to, any adjuvants, carriers, fillers, glidants, sweetening agents, diluents, preservatives, dyes, colorants, flavor enhancers, surfactants, wetting agents, dispersants, suspending agents, stabilizers, isotonic agents, solvents or emulsifiers approved by the U.S. Food and Drug Administration, the National Medical Products Administration, etc. as acceptable for use in humans or domestic animals.

The term "prevention" as used herein means that when used in reference to a disease or condition (e.g., cancer), the compound or drug (e.g., a combination product claimed herein) is capable of reducing the frequency or delaying the onset of symptoms of a medical condition in a subject, as compared to a subject to whom the compound or drug is not administered.

The term "treatment" as used herein refers to the alleviation of, relief from, or amelioration of symptoms of a disease or condition, amelioration of potential metabolism-induced symptoms, suppression of a disease or symptoms, e.g., prevented progression of a disease or condition, relief from a disease or condition, induced regression of a disease or condition, relief from pathological states induced by a disease or condition, or prevention of symptoms of a disease or condition.

The term "cell proliferative disease" as used herein refers to a condition in which a population of cells grow at a rate lower or higher than that predicted under certain physiological states and conditions.

The term "tumor" includes benign tumors, malignant tumors, and borderline tumors, where the malignant tumors are also collectively referred to as cancer.

Based on the knowledge of medicinal chemistry, the isotopic derivatives, geometric isomers, tautomers, optical isomers, solvates, etc. of the compounds of the present disclosure may also produce in vivo and in vitro effects similar to those produced by the compounds of the present disclosure.

Unless the configuration or conformation is explicitly indicated, the chemical formula should not be deemed to assign an absolute configuration or conformation in the present disclosure.

Unless otherwise specified herein, the term "exemplary" is intended to serve as an instance, example or illustration and should not be construed as being preferred over other instances, examples or illustrations.

3,4-Dihydroisoquinoline Compound

Specifically, the present disclosure provides a compound represented by formula (I) or a pharmaceutically acceptable salt, tautomer, geometric isomer, optical isomer, solvate or isotopic derivative thereof,

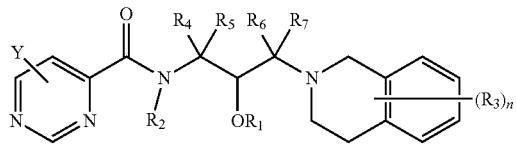

(I)

wherein Y is

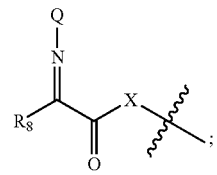

X is selected from the group consisting of

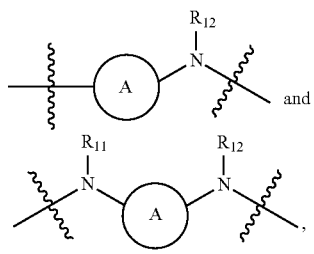

wherein the N atom linked to $R_{12}$ is linked to the pyrimidine ring;

ring A is selected from the group consisting of the following optionally substituted groups: $C_{3-10}$ cycloalkyl, 3— to 10-membered heterocycloalkyl, 4— to 12-membered bridged cyclyl, 4— to 12-membered bridged heterocyclyl, monospirocyclyl, monospiroheterocyclyl, fused cyclyl, and fused heterocyclyl, wherein the monospirocyclyl and monospiroheterocyclyl are selected from the group consisting of 3-membered/5-membered, 4-membered/4-membered, 4-membered/5-membered, 4-membered/6-membered, 5-membered/5-membered, and 5-membered/6-membered rings, where the number of ring atoms in each ring includes the number of spiro atom; and wherein the fused cyclyl and the fused heterocyclyl are selected from the group consisting of 5-membered/5-membered, 5-membered/6-membered, and 6-membered/6-membered rings, where the number of ring atoms in each ring includes the number of shared atoms;

$R_1$, $R_2$, $R_3$, $R_4$, $R_5$, $R_6$, $R_7$, $R_{11}$, and $R_{12}$ are each independently selected, at each occurrence, from the group consisting of the following optionally substituted groups: hydrogen, halogen, hydroxyl, amino, carboxyl, nitro, cyano, oxo, azido, $C_{2-6}$ alkenyl, $C_{2-6}$ alkynyl, $C_{1-6}$ alkyl, $C_{1-6}$ alkoxy, a $C_{1-6}$ alkyl ester group, $C_{1-6}$ alkylamino, $C_{1-6}$ alkylamido, $C_{3-10}$ cycloalkyl, 3— to 10-membered heterocycloalkyl, $C_{3-10}$ cycloalkylamino, 3— to 10-membered heterocycloalkylamino, $C_{3-10}$ cycloalkylamido, 3— to 10-membered heterocycloalkylamido, $C_{6-10}$ aryl, and 5— to 10-membered heteroaryl, wherein the oxo denotes that two hydrogen atoms at the same substitution position are substituted with the same oxygen atom to form a double bond; when either of $R_4$ and $R_5$ is oxo, the other is absent; when either of $R_6$ and $R_7$ is oxo, the other is absent; n is 0, 1, 2, 3, 4, 5 or 6; $R_8$ is selected from the group consisting of the following optionally substituted groups: hydrogen, halogen, cyano, —$OR_{13}$, —$N(R_{13})R_{14}$, —NH—C(O)$R_{13}$, —NH—$OR_{13}$, —OC(O)$R_{13}$, —$C_{1-6}$ alkylene-N($R_{13}$)$R_{14}$, $C_{1-6}$ alkyl, $C_{3-10}$ cycloalkyl, $C_{2-6}$ alkenyl, $C_{2-6}$ alkynyl, 3— to 10-membered heterocycloalkyl, $C_{6-14}$ aryl, and 5— to 10-membered heteroaryl, wherein $R_{13}$ and $R_{14}$ are each independently selected from the group consisting of hydrogen, $C_{1-6}$ alkyl, $C_{3-10}$ cycloalkyl, 3— to 10-membered heterocycloalkyl, $C_{6-14}$ aryl, and 5— to 10-membered heteroaryl;

Q is selected from the group consisting of the following optionally substituted groups: hydrogen, halogen, cyano, and —$OR_9$, —$N(R_9)R_{10}$, —$C(O)R_9$, —$C(O)OR_9$, —$C(O)N(R_9)R_{10}$, —$OC(O)R_9$, —$OC(O)N(R_9)R_{10}$, $C_{1-6}$ alkyl, $C_{3-10}$ cycloalkyl, $C_{2-6}$ alkenyl, $C_{2-6}$ alkynyl, 3— to 10-membered heterocycloalkyl, $C_{6-14}$ aryl, 5— to 10-membered heteroaryl, 4— to 12-membered bridged cyclyl, 4— to 12-membered bridged heterocyclyl, monospirocyclyl, monospiroheterocyclyl, fused cyclyl and fused heterocyclyl, wherein $R_9$ and $R_{10}$ are each independently selected from the group consisting of the following optionally substituted groups: hydrogen, $C_{1-6}$ alkyl, $C_{3-10}$ cycloalkyl, $C_{2-6}$ alkenyl, $C_{2-6}$ alkynyl, 3— to 10-membered heterocycloalkyl, $C_{6-14}$ aryl, and 5— to 10-membered heteroaryl;

when a group is substituted, a hydrogen atom at a substitutable position of the group is substituted with one or more substituents and the substituents are each independently selected from the group consisting of halogen, hydroxyl, cyano, nitro, amino, azido, oxo, carboxyl, $C_{2-6}$ alkenyl, $C_{2-6}$ alkynyl, $C_{1-6}$ alkyl, $C_{1-6}$ alkoxy, $C_{3-10}$ cycloalkyl, $C_{3-10}$ cycloalkylsulfonyl, 3— to 10-membered heterocycloalkyl, $C_{6-14}$ aryl, and 5— to 10-membered heteroaryl, wherein the $C_{2-6}$ alkenyl, $C_{2-6}$ alkynyl, $C_{1-6}$ alkyl, $C_{1-6}$ alkoxy, $C_{3-10}$ cycloalkyl, $C_{3-10}$ cycloalkylsulfonyl, 3— to 10-membered heterocycloalkyl, $C_{6-14}$ aryl or 5— to 10-membered heteroaryl is optionally substituted with one or more substituents and the substituents are each independently selected from the group consisting of halogen, hydroxyl, amino, cyano, $C_{1-6}$ alkyl, and $C_{1-6}$ alkoxy, and oxo denotes that two hydrogen atoms at the same substitution position are substituted with the same oxygen atom to form a double bond; and when the heterocycloalkyl, bridged heterocyclyl, monospiroheterocyclyl, fused heterocyclyl and/or heteroaryl are present, the number of ring heteroatom in the groups is each independently 1 to 4, preferably 1 to 3, and the ring heteroatom is each independently selected from the group consisting of N, O, and S.

The compound of formula (I) may be prepared by the following preparation method comprising the condensation reaction of compound S and compound T:

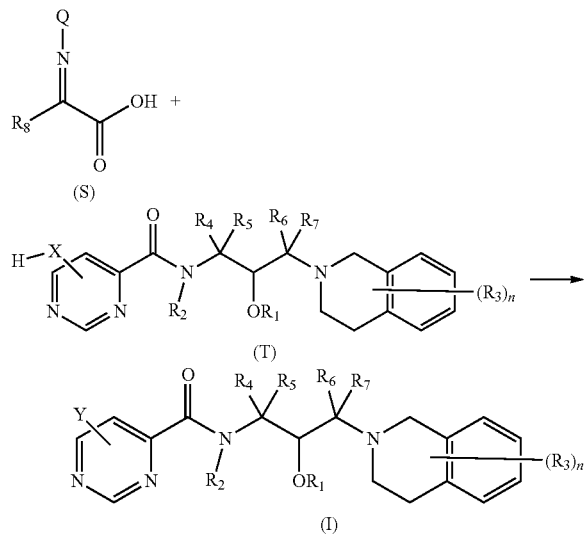

wherein Q, X, Y, $R_1$, $R_2$, $R_3$, $R_4$, $R_5$, $R_6$, $R_7$, $R_8$, and n are as defined in formula (I).

In one embodiment, there is provided a compound represented by formula (II) or a pharmaceutically acceptable salt, tautomer, geometric isomer, optical isomer, solvate or isotopic derivative thereof,

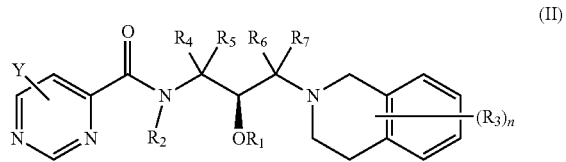

wherein Y, $R_1$, $R_2$, $R_3$, $R_4$, $R_5$, $R_6$, $R_7$, and n are as defined in formula (I).

In one embodiment, in Y group of the compound of formula (I) or formula (II), the configuration of the carbon-nitrogen double bond linked to Q is Z configuration. In another embodiment, the configuration of this carbon-nitrogen double bond is E configuration. In another embodiment, the compound of formula (I) or formula (II) is a mixture of compounds in E configuration and Z configuration at any ratio.

In one embodiment, there is provided a compound represented by formula (III) or a pharmaceutically acceptable salt, tautomer, geometric isomer, optical isomer, solvate or isotopic derivative thereof,

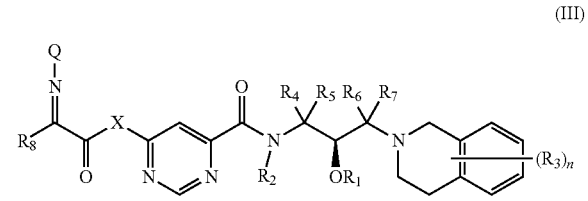

wherein X, Q, $R_1$, $R_2$, $R_3$, $R_4$, $R_5$, $R_6$, $R_7$, $R_8$, and n are as defined in formula (I).

In one embodiment, the configuration of the carbon-nitrogen double bond linked to Q in the compound of formula (III) is Z configuration. In another embodiment, the configuration of this carbon-nitrogen double bond is E configuration. In another embodiment, the compound of formula (III) is a mixture of compounds in E configuration and Z configuration at any ratio.

In one embodiment, in the structure represented by the formula (I), (II) or (III), ring A is selected from the group consisting of the following optionally substituted groups: $C_{5-7}$ cycloalkyl, 4— to 7-membered heterocycloalkyl, 4— to 10-membered bridged cyclyl, 4—to 10-membered bridged heterocyclyl, monospirocyclyl, and monospiroheterocyclyl, wherein the monospirocyclyl and monospiroheterocyclyl are selected from the group consisting of 3-membered/5-membered, 4-membered/4-membered, 4-membered/5-membered, 4-membered/6-membered, 5-membered/5-membered, and 5-membered/6-membered rings, where the number of ring atoms in each ring includes the number of spiro atom; when a group is substituted, a hydrogen atom at a substitutable position of the group is substituted with one or more substituents and the substituents are each independently selected from the group consisting of halogen, hydroxyl, cyano, nitro, amino, azido, oxo, carboxyl, $C_{1-6}$ alkyl, and $C_{1-6}$ alkoxy, wherein the $C_{1-6}$ alkyl or $C_{1-6}$ alkoxy is optionally substituted with one or more substituents and the substituents are each independently selected from the group consisting of halogen, hydroxyl, amino, and cyano, and oxo denotes that two hydrogen atoms at the same substitution position are substituted with the same oxygen atom to form a double bond.

In one embodiment, in the structure represented by the formula (I), (II) or (III), ring A is selected from the group consisting of the following optionally substituted groups: $C_{5-6}$ cycloalkyl, 4— to 6-membered heterocycloalkyl, 4-membered/4-membered monospirocyclyl, 4-membered/6-membered monospirocyclyl, 4-membered/4-membered monospiroheterocyclyl, and 4-membered/6-membered monospiroheterocyclyl; when a group is substituted, a hydrogen atom at a substitutable position of the group is substituted with one or more substituents and the substituents are each independently selected from the group consisting of halogen, hydroxyl, cyano, amino, $C_{1-4}$ alkyl, and $C_{1-4}$ alkoxy, wherein $C_{1-4}$ alkyl or $C_{1-4}$ alkoxy is optionally substituted with one or more substituents and the substituents are each independently selected from the group consisting of halogen, hydroxyl, amino, and cyano.

In one embodiment, in the structure represented by the formula (I), (II) or (III), X is

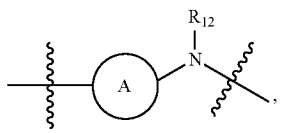

wherein ring A is selected from the group consisting of optionally substituted 4— to 6-membered heterocycloalkyl, 4-membered/4-membered monospiroheterocyclyl, and 4-membered/6-membered monospiroheterocyclyl, and the atom in ring A that is linked to

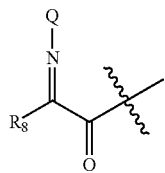

is a heteroatom, preferably a nitrogen atom; when a group is substituted, a hydrogen atom at a substitutable position of the group is substituted with one or more substituents and the substituents are each independently selected from the group consisting of halogen, hydroxyl, cyano, amino, $C_{1-4}$ alkyl, and $C_{1-4}$ alkoxy, wherein the $C_{1-4}$ alkyl or $C_{1-4}$ alkoxy is optionally substituted with one or more substituents and the substituents are each independently selected from the group consisting of halogen, hydroxyl, amino, and cyano.

In one embodiment, in the structure represented by the formula (I), (II) or (III), X is

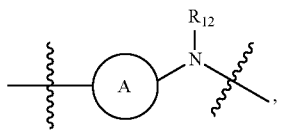

wherein ring A is selected from the group consisting of optionally substituted 4— to 6-membered heterocycloalkyl, 4-membered/4-membered monospiroheterocyclyl, and 4-membered/6-membered monospiroheterocyclyl, and the atom in ring A that is linked to

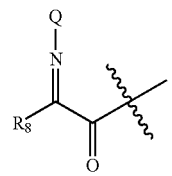

is a heteroatom, preferably a nitrogen atom; when a group is substituted, a hydrogen atom at a substitutable position of the group is substituted with one or more substituents and the substituents are each independently selected from the group consisting of halogen, hydroxyl, $C_{1-4}$ alkyl, and $C_{1-4}$ alkoxy, wherein the $C_{1-4}$ alkyl or $C_{1-4}$ alkoxy is optionally substituted with one or more substituents and the substituents are each independently selected from the group consisting of halogen and hydroxyl; preferably, the substituents are each independently selected from the group consisting of F, Cl, —$CH_3$, —OH, and —$OCH_3$.

In one embodiment, in the structure represented by the formula (I), (II) or (III), X is

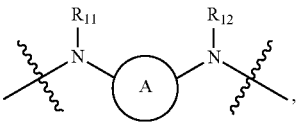

wherein ring A is selected from the group consisting of optionally substituted $C_{5-6}$ cycloalkyl, 4-membered/4-membered monospirocyclyl and 4-membered/6-membered monospirocyclyl; when a group is substituted, a hydrogen atom at a substitutable position of the group is substituted with one or more substituents and the substituents are each independently selected from the group consisting of halogen, hydroxyl, cyano, amino, $C_{1-4}$ alkyl, and $C_{1-4}$ alkoxy, wherein the $C_{1-4}$ alkyl or $C_{1-4}$ alkoxy is optionally substituted with one or more substituents and the substituents are each independently selected from the group consisting of halogen, hydroxyl, amino, and cyano; preferably, the substituents are each independently selected from the group consisting of F, Cl, —$CH_3$, —OH, and —$OCH_3$.

In one embodiment, in the structure represented by the formula (I), (II) or (III), X is

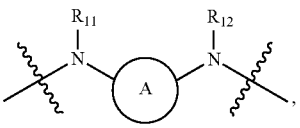

wherein ring A is selected from the group consisting of optionally substituted 4-membered/4-membered monospirocyclyl; when a group is substituted, a hydrogen atom at a substitutable position of the group is substituted with one or more substituents and the substituents are each independently selected from the group consisting of halogen, hydroxyl, cyano, amino, $C_{1-4}$ alkyl, and $C_{1-4}$ alkoxy, wherein the C$_{1-4}$ alkyl or C$_{1-4}$ alkoxy is optionally substituted with one or more substituents and the substituents are each independently selected from the group consisting of halogen, hydroxyl, amino, and cyano.

In one embodiment, in the structure represented by the formula (I), (II) or (III), X is

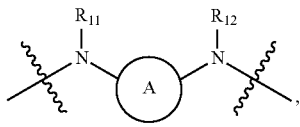

wherein ring A is selected from the group consisting of optionally substituted 4-membered/4-membered monospirocyclyl; when a group is substituted, a hydrogen atom at a substitutable position of the group is substituted with one or more substituents and the substituents are each independently selected from the group consisting of halogen, hydroxyl, C$_{1-4}$ alkyl, and C$_{1-4}$ alkoxy, wherein the C$_{1-4}$ alkyl or C$_{1-4}$ alkoxy is optionally substituted with one or more substituents and the substituents are each independently selected from the group consisting of halogen and hydroxyl; preferably, the substituents are each independently selected from the group consisting of F, Cl, —CH$_3$, —OH, and —OCH$_3$.

In one embodiment, in the structure represented by the formula (I), (II) or (III), X is selected from the group consisting of the following optionally substituted fragments:

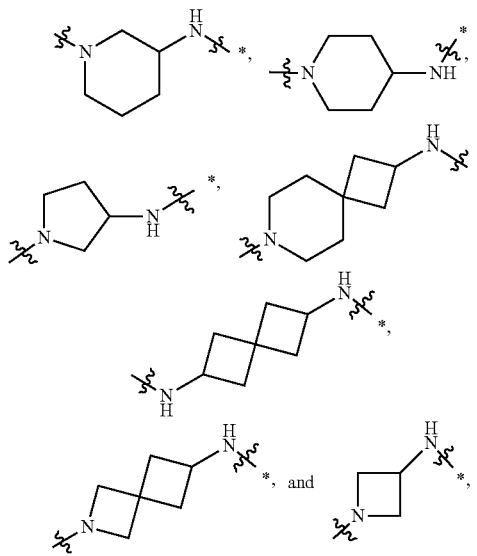

wherein the N atom at the terminal marked by an asterisk "*" is linked to the pyrimidine ring; and when a group is substituted, a hydrogen atom at a substitutable position of the group is substituted with one or more substituents and the substituents are each independently selected from the group consisting of halogen, hydroxyl, cyano, amino, C$_{1-4}$ alkyl, and C$_{1-4}$ alkoxy, wherein the C$_{1-4}$ alkyl or C$_{1-4}$ alkoxy is optionally substituted with one or more substituents and the substituents are each independently selected from the group consisting of halogen, hydroxyl, amino, and cyano; preferably, when a group is substituted, a hydrogen atom at a substitutable position of the group is substituted with one or more substituents and the substituents are each independently selected from the group consisting of halogen, hydroxyl, C$_{1-4}$ alkyl, and C$_{1-4}$ alkoxy, wherein the C$_{1-4}$ alkyl or C$_{1-4}$ alkoxy is optionally substituted with one or more substituents and the substituents are each independently selected from the group consisting of halogen, hydroxyl, amino, and cyano; preferably, when a group is substituted, a hydrogen atom at a substitutable position of the group is substituted with one, two or three substituents and the substituents are each independently selected from the group consisting of —F, —Cl, —CH$_3$, and —OH.

In one embodiment, in the structure represented by the formula (I), (II) or (III), X is selected from the group consisting of the following fragments:

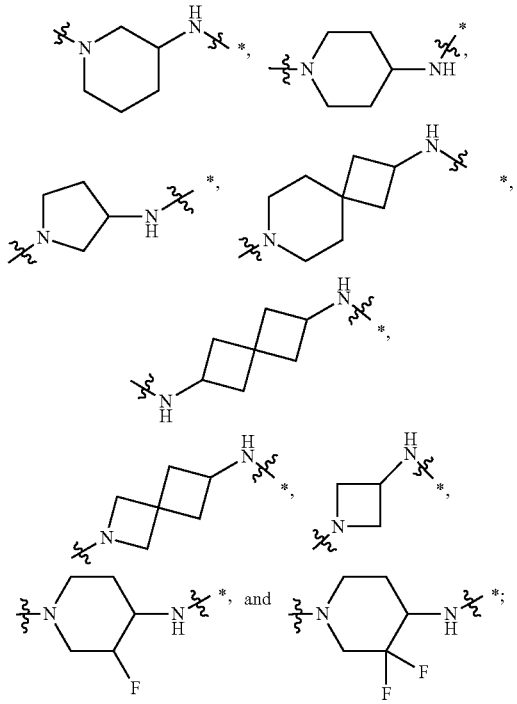

preferably, X is selected from the group consisting of the following fragments:

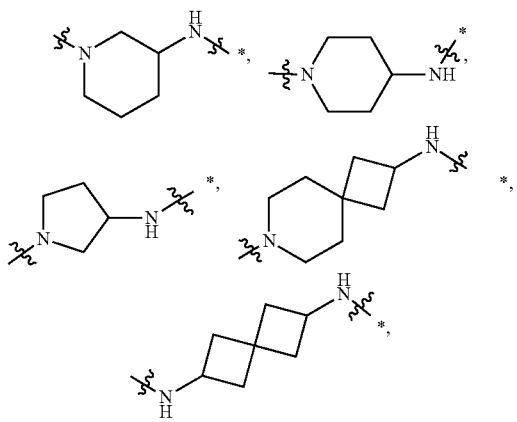

-continued

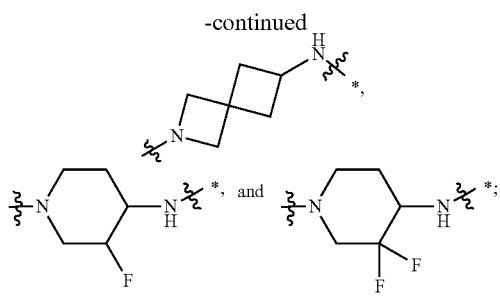

further preferably, X is selected from the group consisting of the following fragments:

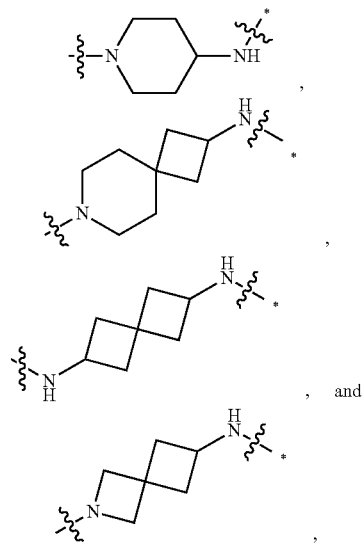

, and wherein the N atom at the terminal marked by an asterisk "*" is linked to the pyrimidine ring.

In one embodiment, in the structure represented by the formula (I), (II) or (III), $R_1$, $R_2$, $R_3$, $R_4$, $R_5$, $R_6$, $R_7$, $R_{11}$, and $R_{11}$, at each occurrence, are each independently selected from the group consisting of hydrogen, halogen, hydroxyl, amino, nitro, oxo, $C_{1-6}$ alkyl, and $C_{1-6}$ alkoxy; preferably, $R_1$, $R_2$, $R_3$, $R_4$, $R_5$, $R_6$, $R_7$, $R_{11}$, and $R_{11}$, at each occurrence, are each independently selected from the group consisting of hydrogen, halogen, hydroxyl, amino, and $C_{1-6}$ alkyl; further preferably, $R_1$, $R_2$, $R_3$, $R_4$, $R_5$, $R_6$, $R_7$, $R_{11}$, and $R_{12}$, at each occurrence, are each independently selected from the group consisting of hydrogen, halogen, hydroxyl, and $C_{1-3}$ alkyl; further preferably, $R_1$, $R_2$, $R_3$, $R_4$, $R_5$, $R_6$, $R_7$, $R_{11}$, and $R_{12}$, at each occurrence, are each independently hydrogen.

In one embodiment, in the structure represented by the formula (I), (II) or (III), $R_8$ is selected from the group consisting of optionally substituted hydrogen, —N($R_{13}$)$R_{14}$, —$C_{1-6}$ alkylene-N($R_{13}$)$R_{14}$, $C_{1-6}$ alkyl, $C_{3-10}$ cycloalkyl, and $C_{6-14}$ aryl, wherein $R_{13}$ and $R_{14}$ are each independently selected from the group consisting of hydrogen and $C_{1-6}$ alkyl; preferably, in the structure represented by the formula (I), (II) or (III), $R_8$ is selected from the group consisting of optionally substituted hydrogen, $C_{1-6}$ alkyl, $C_{3-10}$ cycloalkyl, and $C_{6-14}$ aryl; further preferably, $R_8$ is selected from the group consisting of optionally substituted $C_{1-6}$ alkyl, $C_{3-10}$ cycloalkyl, and $C_{6-14}$ aryl; further preferably, $R_8$ is selected from the group consisting of optionally substituted $C_{1-4}$ alkyl, $C_{3-7}$ cycloalkyl, and $C_{6-10}$ aryl; further preferably, $R_8$ is selected from the group consisting of optionally substituted $C_{1-3}$ alkyl, $C_{3-6}$ cycloalkyl, and $C_{6-9}$ aryl; and when a group is substituted, a hydrogen atom at a substitutable position of the group is substituted with one or more substituents and the substituents are each independently selected from the group consisting of halogen, hydroxyl, $C_{3-10}$ cycloalkyl, $C_{3-10}$ cycloalkylsulfonyl, 3— to 10-membered heterocycloalkyl, $C_{6-14}$ aryl, and 5— to 10-membered heteroaryl; preferably, the substituents are each independently selected from the group consisting of halogen, hydroxyl, $C_{3-10}$ cycloalkyl, and $C_{3-10}$ cycloalkylsulfonyl; more preferably, the substituents are each independently selected from the group consisting of halogen and $C_{3-10}$ cycloalkylsulfonyl.

In one embodiment, in the structure represented by the formula (I), (II) or (III), $R_8$ is selected from the group consisting of —H

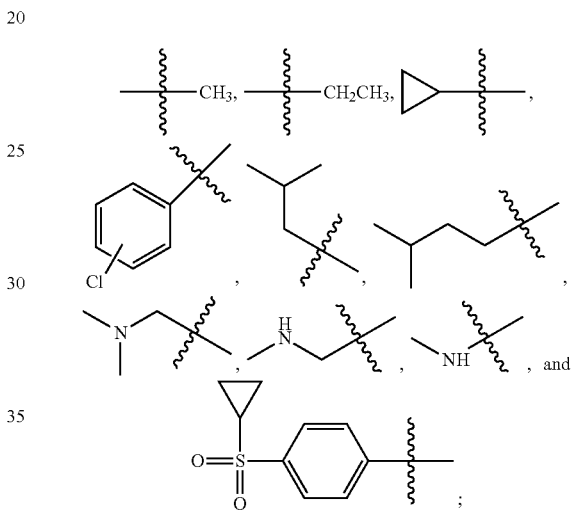

preferably, $R_8$ is selected from the group consisting of

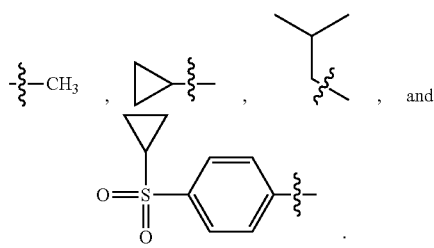

In one embodiment, in the structure represented by the formula (I), (II) or (III), Q is selected from the group consisting of the following optionally substituted groups: hydrogen, —$OR_9$, —N($R_9$)$R_{10}$, —C(O)$R_9$, —C(O)$OR_9$, —OC(O)$R_9$, $C_{1-6}$ alkyl, $C_{3-7}$ cycloalkyl, $C_{2-4}$ alkenyl, $C_{2-4}$ alkynyl, 5— to 7-membered heterocycloalkyl, $C_{6-10}$ aryl, and 5— to 7-membered heteroaryl, wherein the heteroatom in heterocycloalkyl or heteroaryl is an O atom or an N atom, and the number of the heteroatom is 1; and wherein $R_9$ and $R_{10}$ are each independently selected from the group consisting of the following optionally substituted groups: hydrogen, $C_{1-6}$ alkyl, $C_{3-10}$ cycloalkyl, $C_{2-6}$ alkenyl, $C_{2-6}$ alkynyl, 3— to 10-membered heterocycloalkyl, $C_{6-14}$ aryl, and 5— to 10-membered heteroaryl; and when a group is substituted, a hydrogen atom at a substitutable position of the group is substituted with one or more substituents and the substituents are each independently selected from the group consisting of halogen, hydroxyl, cyano, amino, $C_{1-4}$ alkyl, $C_{1-4}$ alkoxy, $C_{3-7}$ cycloalkyl, and 5— to 7-membered heteroaryl, wherein the $C_{1-4}$ alkyl, $C_{1-4}$ alkoxy, $C_{3-7}$ cycloalkyl or 5— to 7-membered heteroaryl is optionally substituted with one or more substituents and the substituents are each independently selected from the group consisting of halogen, hydroxyl, amino, and cyano.

In one embodiment, in the structure represented by the formula (I), (II) or (III), Q is selected from the group consisting of optionally substituted —OR$_9$, $C_{1-6}$ alkyl, and $C_{3-7}$ cycloalkyl, wherein R$_9$ is selected from the group consisting of optionally substituted hydrogen, $C_{1-6}$ alkyl, $C_{5-7}$ cycloalkyl, 3— to 10-membered heterocycloalkyl, $C_{6-14}$ aryl, and 5— to 10-membered heteroaryl; preferably, R$_9$ is selected from the group consisting of optionally substituted hydrogen, $C_{1-6}$ alkyl, and $C_{5-7}$ cycloalkyl; and when a group is substituted, a hydrogen atom at a substitutable position of the group is substituted with one or more substituents and the substituents are each independently selected from the group consisting of halogen, hydroxyl, cyano, amino, $C_{1-4}$ alkyl, $C_{1-4}$ alkoxy, $C_{3-7}$ cycloalkyl, and 5— to 7-membered heteroaryl, wherein the $C_{1-4}$ alkyl, $C_{1-4}$ alkoxy, $C_{3-7}$ cycloalkyl or 5— to 7-membered heteroaryl is optionally substituted with one or more substituents and the substituents are each independently selected from the group consisting of halogen, hydroxyl, amino, and cyano.

In one embodiment, Q in formula (I), (II) or (III) is —OR$_9$, wherein R$_9$ is selected from the group consisting of optionally substituted hydrogen, $C_{1-6}$ alkyl, $C_{5-7}$ cycloalkyl, 3— to 10-membered heterocycloalkyl, $C_{6-14}$ aryl, and 5— to 10-membered heteroaryl; preferably, R$_9$ is selected from the group consisting of optionally substituted hydrogen, $C_{1-6}$ alkyl, and $C_{5-7}$ cycloalkyl; and when a group is substituted, a hydrogen atom at a substitutable position of the group is substituted with one or more substituents and the substituents are each independently selected from the group consisting of halogen, hydroxyl, cyano, amino, $C_{1-4}$ alkyl, $C_{1-4}$ alkoxy, $C_{3-7}$ cycloalkyl, and 5— to 7-membered heteroaryl; preferably, the substituents are each independently selected from the group consisting of $C_{3-7}$ cycloalkyl, and 5— to 7-membered heteroaryl.

In one embodiment, Q in formula (I), (II) or (III) is selected from the group consisting of hydroxyl, methoxy, cyclopentyloxy, cyclopropylmethoxy, and pyridin-2-yl-methoxy.

In one embodiment, the present disclosure provides a compound or a pharmaceutically acceptable salt, tautomer, optical isomer, solvate or isotopic derivative thereof, wherein the compound has a structure as follows:

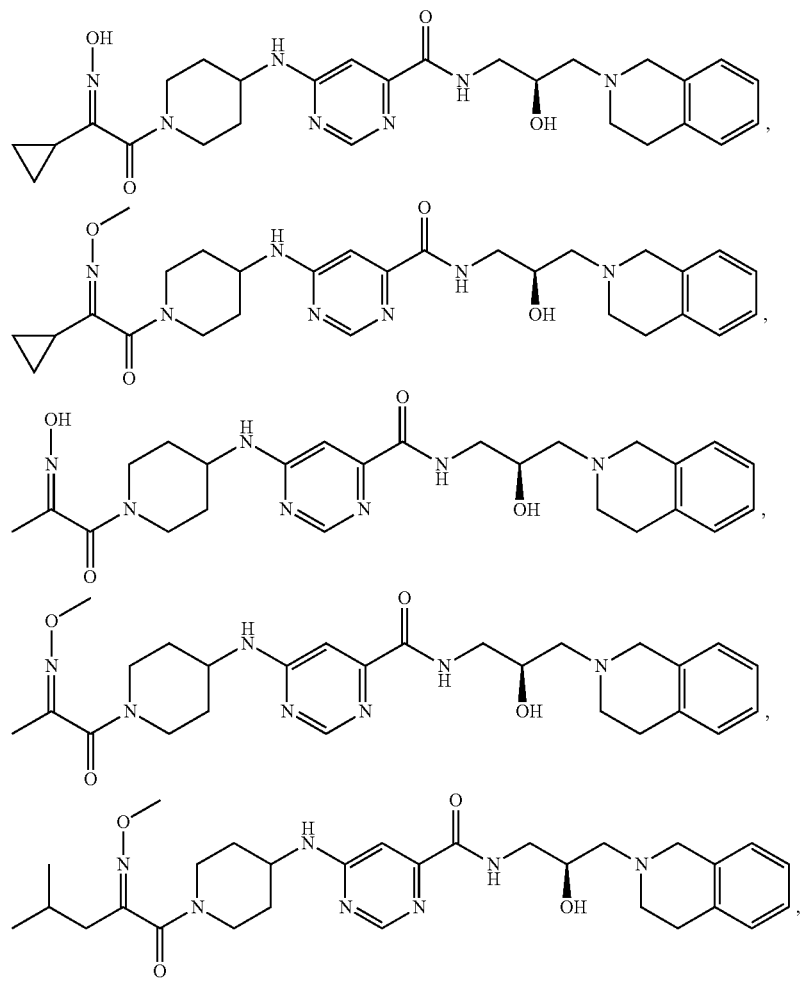

-continued
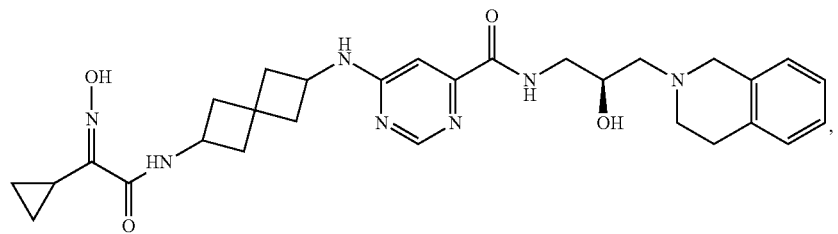
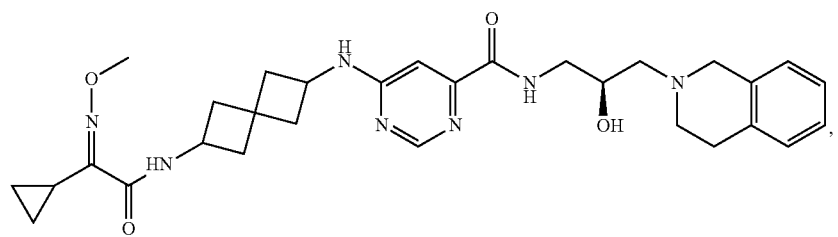
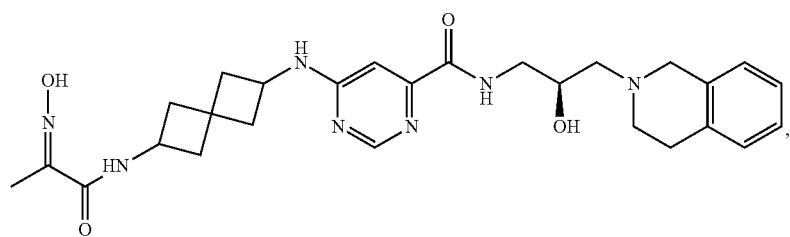
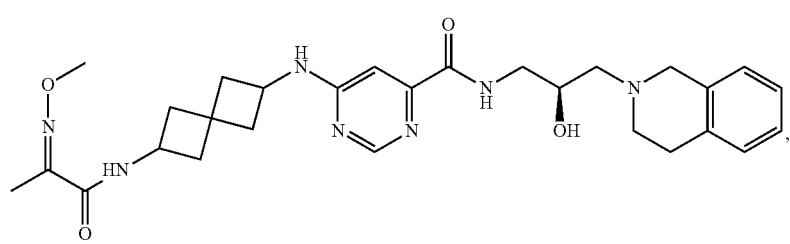
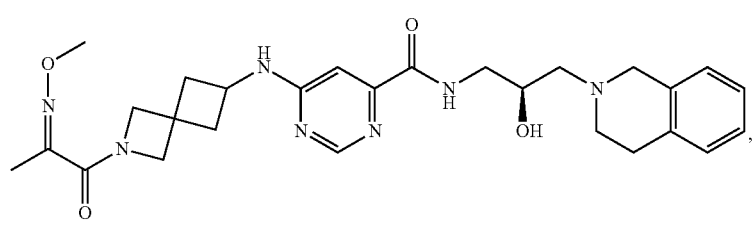
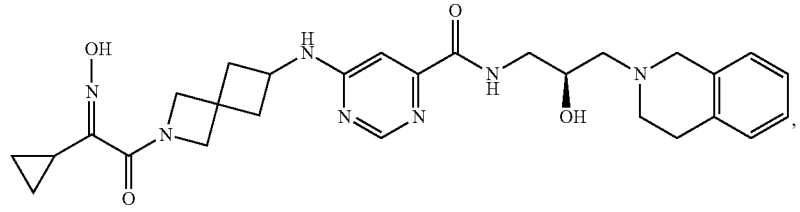
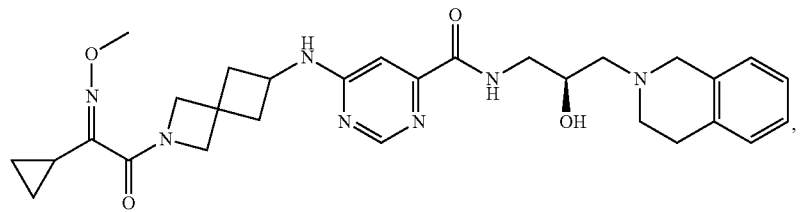

-continued
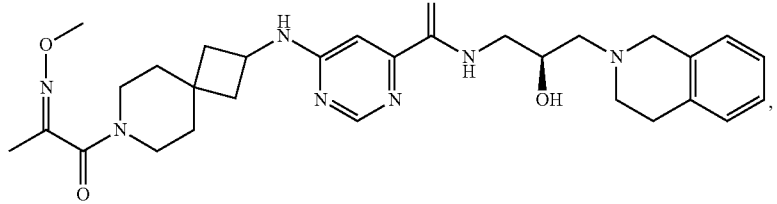
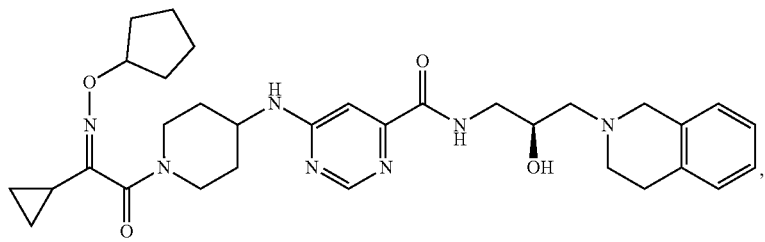
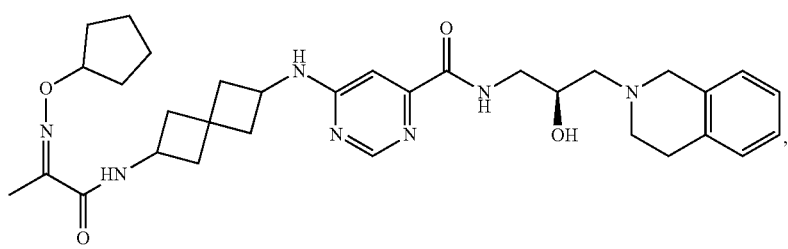
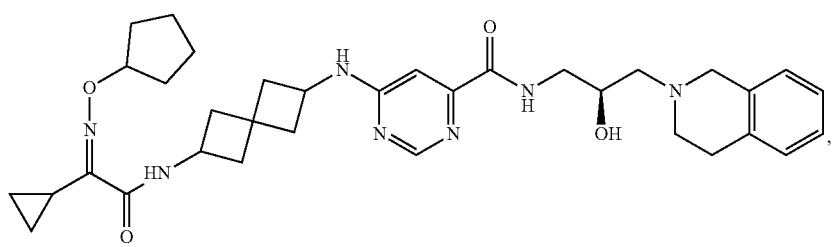
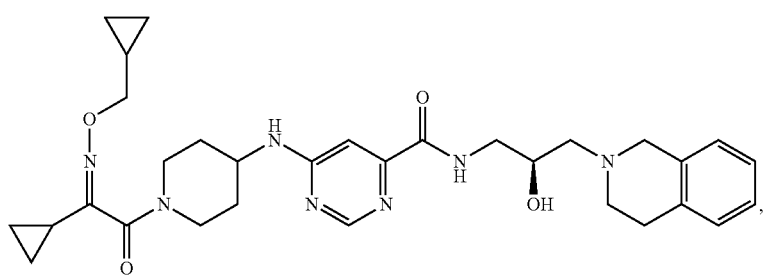
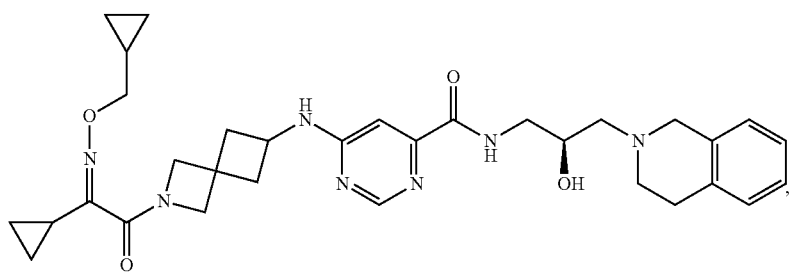

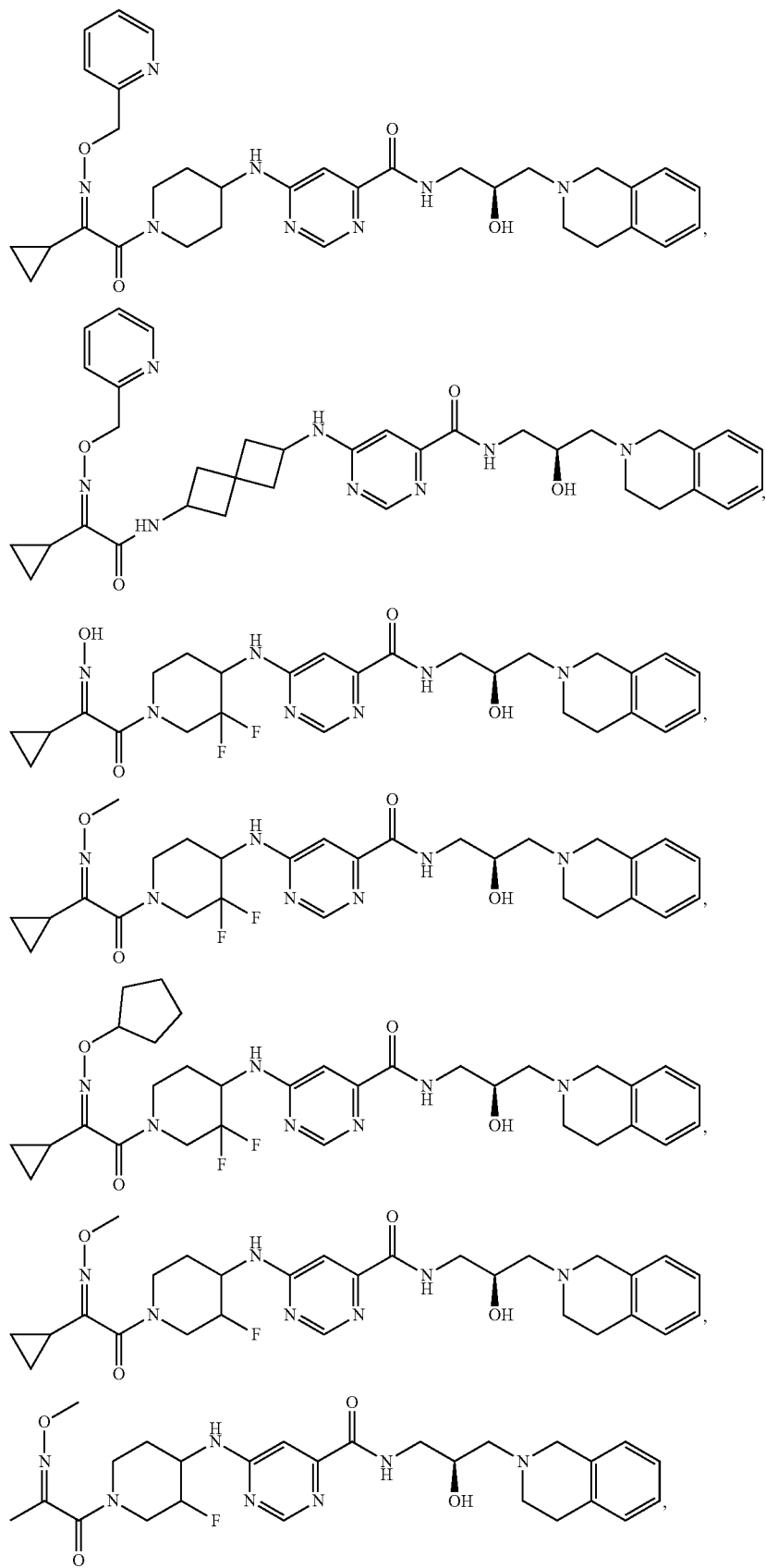

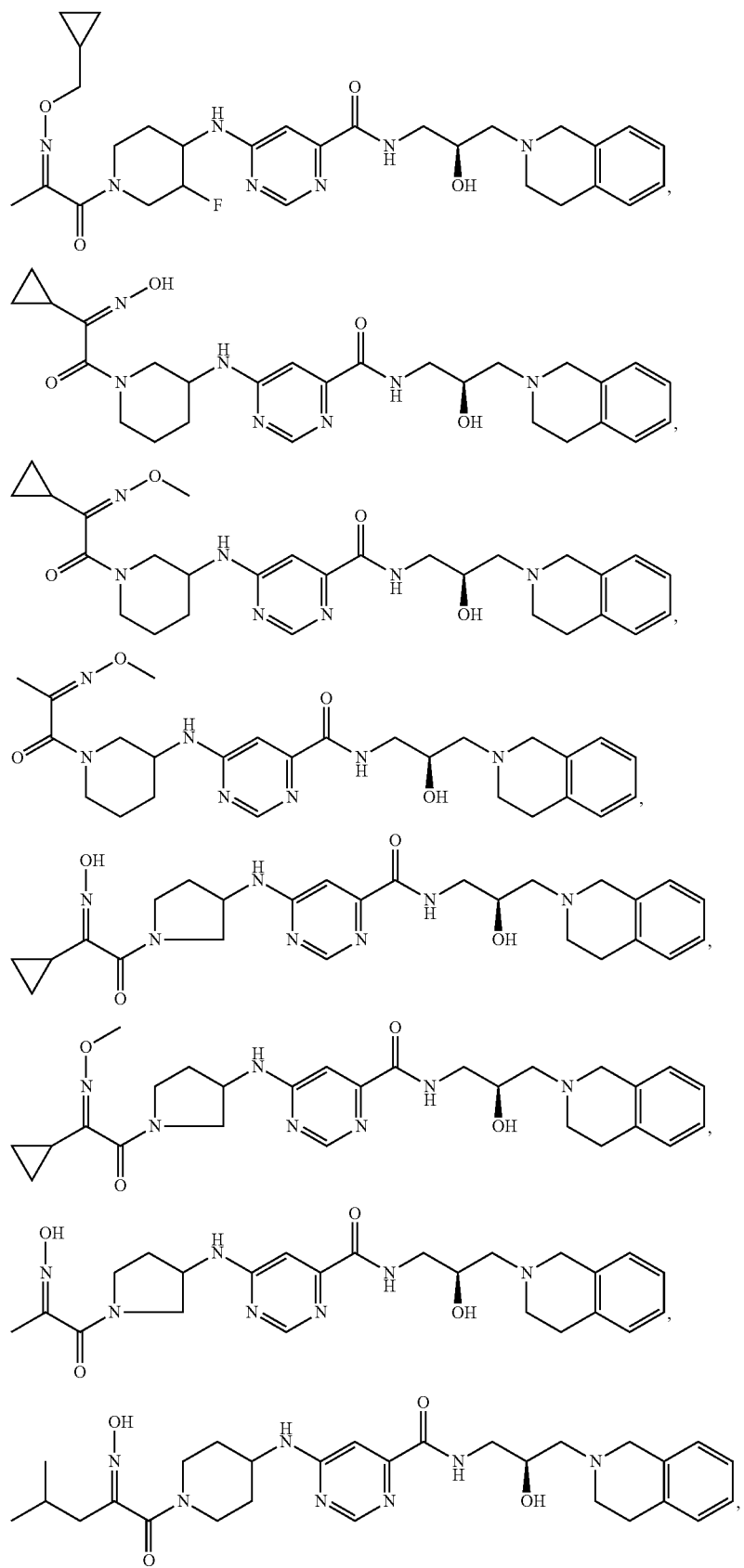

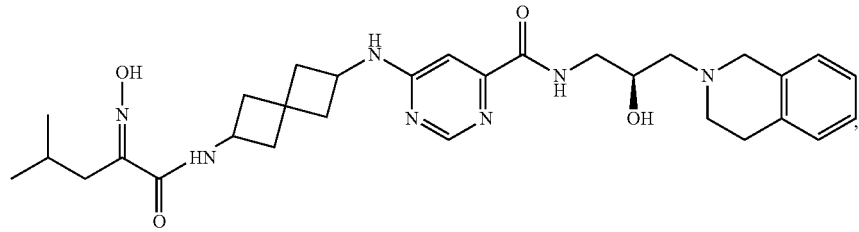
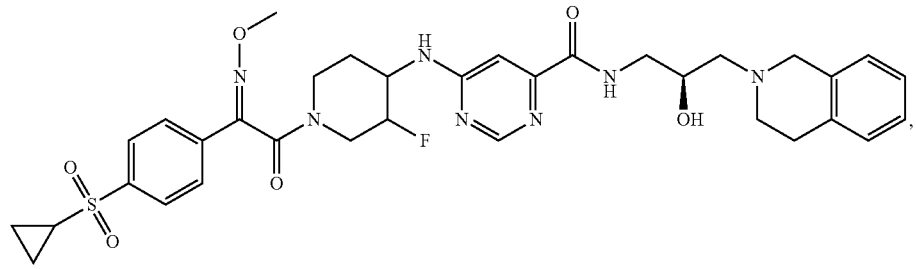
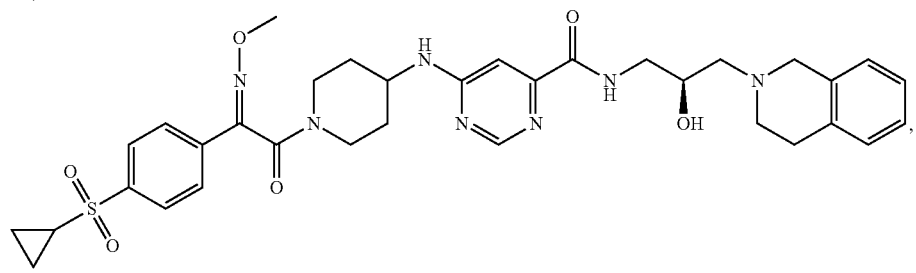
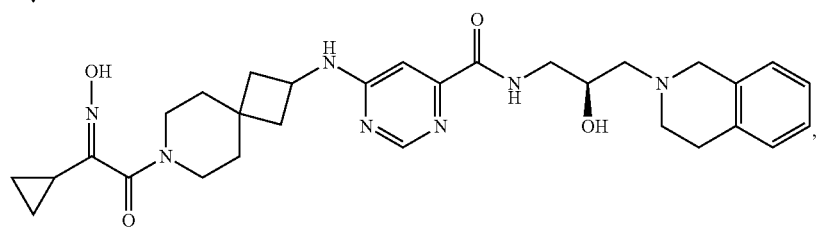
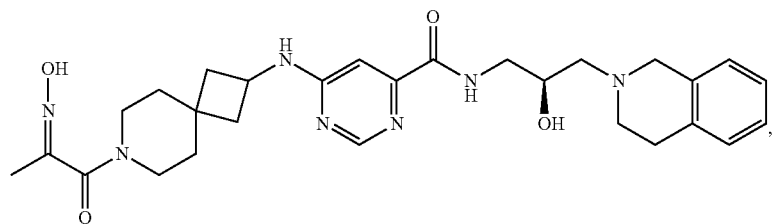
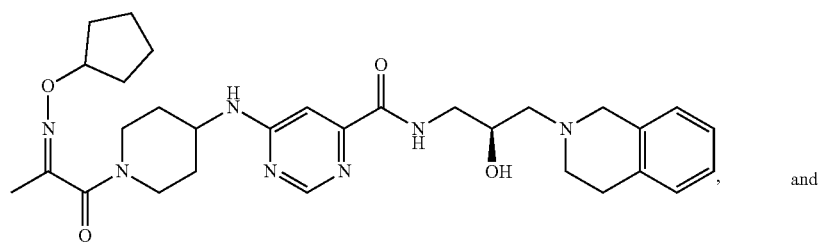, and
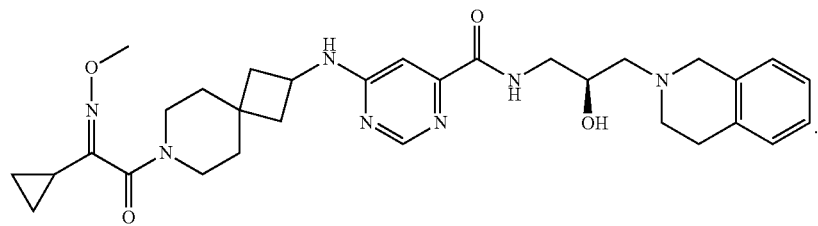

Pharmaceutic Compound Comprising the Compound

In one embodiment, the pharmaceutical composition of the present disclosure comprises the compound (e.g., the compound of formula (I), (II) or (III) as described above or the specific compound) of the present disclosure or the pharmaceutically acceptable salt, tautomer, geometric isomer, optical isomer, solvate or isotopic derivative thereof.

In one embodiment, the pharmaceutical composition of the present disclosure comprises the compound (e.g., the compound of formula (I), (II) or (III) as described above or the specific compound) of the present disclosure or the pharmaceutically acceptable salt, tautomer, geometric isomer, optical isomer, solvate or isotopic derivative thereof, and one or more pharmaceutically acceptable excipients.

Medical Applications of the Compound

In one embodiment, the present disclosure provides use of the above compound (e.g., the compound of formula (I), (II) or (III) or the specific compound as described above) or the pharmaceutically acceptable salt, tautomer, geometric isomer, optical isomer, solvate or isotopic derivative thereof or the above pharmaceutical composition in the preparation of a medication.

In one embodiment, the present disclosure provides use of the above compound (e.g., the compound of formula (I), (II) or (III) or the specific compound as described above) or the pharmaceutically acceptable salt, tautomer, geometric isomer, optical isomer, solvate or isotopic derivative thereof or the above pharmaceutical composition in the preparation of a medication as a PRMT5 inhibitor.

In one embodiment, the present disclosure provides use of the above compound (e.g., the compound of formula (I), (II) or (III) or the specific compound as described above) or the pharmaceutically acceptable salt, tautomer, geometric isomer, optical isomer, solvate or isotopic derivative thereof or the above pharmaceutical composition in the preparation of a medication for preventing and/or treating a disease that is at least partially mediated by PRMT5.

In some embodiments of the present disclosure, the disease that is at least partially mediated by PRMT5 is a cell proliferative disease; preferably, the cell proliferative disease is a tumor or cancer; further preferably, the tumor or cancer is a hematological tumor or a solid tumor; still further preferably a hematological malignant tumor or an advanced solid tumor.

In one embodiment, the present disclosure provides use of the above compound (e.g., the compound of formula (I), (II) or (III) or the specific compound as described above) or the pharmaceutically acceptable salt, tautomer, geometric isomer, optical isomer, solvate or isotopic derivative thereof or the above pharmaceutical composition in the preparation of a medication for preventing and/or treating a cell proliferative disease.

In some embodiments of the present disclosure, the cell proliferative disease is a tumor or cancer; preferably, the tumor or cancer is a hematological tumor or a solid tumor; further preferably a hematological malignant tumor or an advanced solid tumor.

In one embodiment, the present disclosure provides the above compound (e.g., the compound of formula (I), (II) or (III) or the specific compound as described above) or the pharmaceutically acceptable salt, tautomer, geometric isomer, optical isomer, solvate or isotopic derivative thereof or the above pharmaceutical composition for use in the prevention and/or treatment of a disease that is at least partially mediated by PRMT5.

In some embodiments of the present disclosure, the disease that is at least partially mediated by PRMT5 is a cell proliferative disease; preferably, the cell proliferative disease is a tumor or cancer; further preferably, the tumor or cancer is a hematological tumor or a solid tumor; still further preferably a hematological malignant tumor or an advanced solid tumor.

In one embodiment, the present disclosure provides the above compound (e.g., the compound of formula (I), (II) or (III) or the specific compound as described above) or the pharmaceutically acceptable salt, tautomer, geometric isomer, optical isomer, solvate or isotopic derivative thereof or the above pharmaceutical composition for use in the prevention and/or treatment of a cell proliferative disease.

In some embodiments of the present disclosure, the cell proliferative disease is a tumor or cancer; preferably, the tumor or cancer is a hematological tumor or a solid tumor; further preferably a hematological malignant tumor or an advanced solid tumor.

In one embodiment, the present disclosure provides a method for preventing and/or treating a disease that is at least partially mediated by PRMT5, comprising: administering to a subject in need thereof a prophylactically and/or therapeutically effective amount of the above compound (e.g., the compound of formula (I), (II) or (III) or the specific compound as described above) or the pharmaceutically acceptable salt, tautomer, geometric isomer, optical isomer, solvate or isotopic derivative thereof or the above pharmaceutical composition.

In some embodiments of the present disclosure, the disease that is at least partially mediated by PRMT5 is a cell proliferative disease; preferably, the cell proliferative disease is a tumor or cancer; further preferably, the tumor or cancer is a hematological tumor or a solid tumor; still further preferably a hematological malignant tumor or an advanced solid tumor.

In one embodiment, the present disclosure provides a method for preventing and/or treating a cell proliferative disease, comprising: administering to a subject in need thereof a prophylactically and/or therapeutically effective amount of the above compound (e.g., the compound of formula (I), (II) or (III) or the specific compound as described above) or the pharmaceutically acceptable salt, tautomer, geometric isomer, optical isomer, solvate or isotopic derivative thereof or the above pharmaceutical composition.

In some embodiments of the present disclosure, the cell proliferative disease is a tumor or cancer; preferably, the tumor or cancer is a hematological tumor or a solid tumor; further preferably a hematological malignant tumor or an advanced solid tumor.

In one embodiment, the above-mentioned tumor or cancer is selected from the group consisting of lung cancer, bone cancer, stomach cancer, pancreatic cancer, adenoid cystic carcinoma, skin cancer, head and neck cancer, uterine cancer, ovarian cancer, testicular cancer, fallopian tube cancer, endometrial carcinoma, cervical cancer, vaginal cancer, brain cancer, pituitary adenoma, melanoma, epidermoid carcinoma, and chronic and acute leukemia; preferably, the acute leukemia is acute myeloid leukemia (AML).

Preparation of the Compound

The compound of formula (I) may be prepared by the following preparation method comprising the condensation reaction of compound S and compound T:

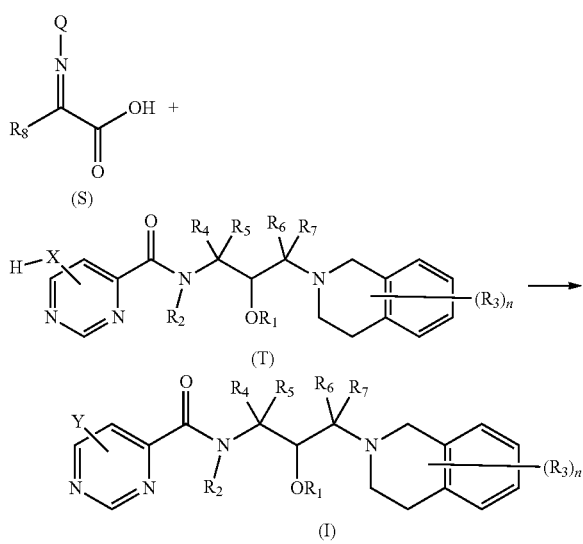

wherein Q, X, Y, $R_1$, $R_2$, $R_3$, $R_4$, $R_5$, $R_6$, $R_7$, $R_8$, and n are as defined in formula (I).

The present disclosure will be further illustrated below with reference to specific examples. It should be appreciated that these examples are intended only to illustrate the present disclosure but not to limit the scope of the present disclosure. The experimental methods for which no specific conditions are indicated in the following examples are usually carried out in accordance with conventional conditions or the conditions suggested by manufacturers. Unless otherwise defined herein, all technical and scientific terms used in these examples have the same meanings as those familiar to a person skilled in the art. In addition, any methods and materials similar or equivalent to those described may be applicable in the present disclosure. The preferred embodiments and materials described herein are for illustrative purposes only.

The raw materials, reaction reagents, catalysts or solvents involved in the following specific embodiments may all be commercially available or prepared by conventional methods in the prior art.

The abbreviations used in the preparation examples, examples, and elsewhere herein are as shown in the table below.

| | |
|---|---|
| DCM | Dichloromethane |
| TEA | Triethylamine |
| DIPEA | N,N-Diisopropylethylamine |
| DMF | N,N-Dimethylformamide |
| EtOAc | Ethyl acetate |
| h/hr | Hour |
| ml/mL | Milliliter |
| HATU | 2-(7-Azabenzotriazol-1-yl)-N,N,N',N'-tetramethyluronium hexafluorophosphate |
| MeOH | Methanol |
| TFA | Trifluoroacetic acid |
| DMSO-$d_6$ | Hexadeuterodimethyl sulfoxide |
| $D_2O$ | Heavy water |
| $CD_3OD$ | Tetradeuteromethanol |
| SAM | S-Adenosyl methionine |
| DTT | Dithiothreitol |
| MTT | 3-(4,5-Dimethylthiazol-2-yl)-2,5-diphenyl-2H-tetrazol-3-ium bromide |

Preparation Examples

The following preparation examples describe the preparation methods for key intermediates of the specific compounds of the present disclosure.

Preparation Example 1: Preparation of (S)-6-((6-aminospiro[3.3]heptan-2-yl)amino)-N-(3-(3,4-dihydroisoquinolin-2(1H)-yl)-2-hydroxypropyl)pyrimidine-4-carboxamide (T-1)

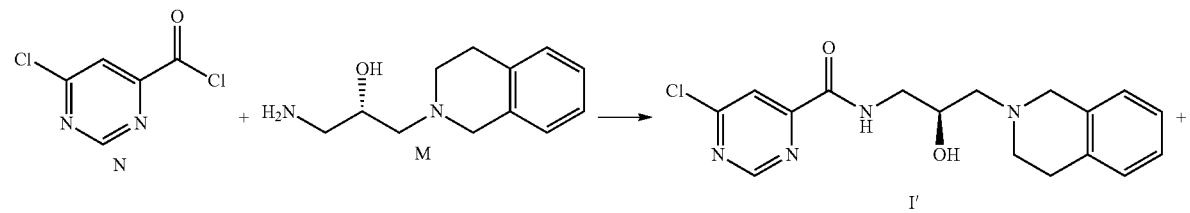

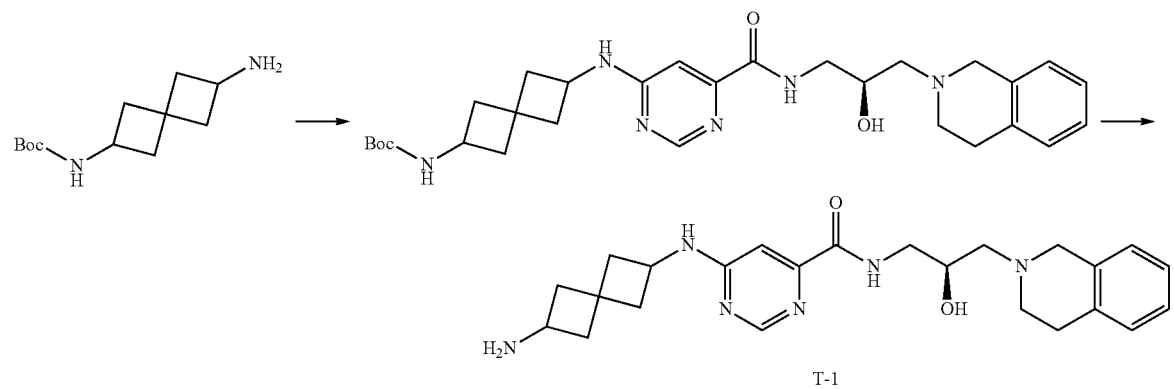

Step 1: (S)-6-chloro-N-(3-(3,4-dihydroisoquinolin-2 (1H)-yl)-2-hydroxypropyl)pyrimidine-4-carboxamide

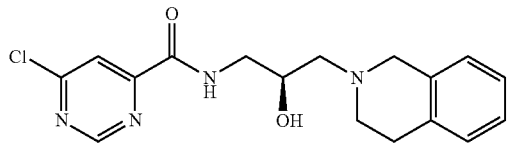 [SMILES: O=C(NC[C@H](O)CN1CCc2ccccc2C1)c1cc(Cl)ncn1]

In a 100 mL reaction flask, 6-chloropyrimidine-4-carbonyl chloride (0.63 g, 3.56 mmol) was dissolved in DCM (10 mL), and at 0° C., TEA (0.72 g, 7.12 mmol) was added. Thereafter, (S)-1-amino-3-(3,4-dihydroisoquinolin-2(1H)-yl)propan-2-ol (0.66 g, 3.20 mmol) was added. The reaction solution was stirred at 25° C. for 2 h. After the reaction was completed (monitored by TLC), the reaction solution was diluted with H$_2$O (5 mL), and extracted with DCM (15 mL×2). The combined organic phase was washed with saturated saline (10 mL), dried over Na$_2$SO$_4$, filtered, and concentrated under reduced pressure to afford a residue. The residue was purified by column chromatography (DCM:MeOH=10:1, v/v, the same below) to give a yellow oily target compound (0.68 g, 61.28%).

Step 2: Tert-butyl (S)-(6-((6-(3-(3,4-dihydroisoquinolin-2(1H)-yl)-2-hydroxypropyl)carbamoyl)pyrimidin-4-yl)amino)spiro[3.3]heptan-2-yl)carbamate

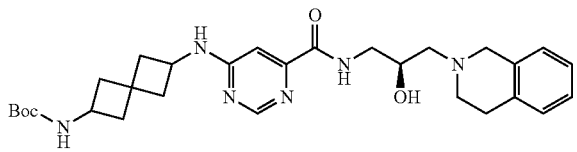 [SMILES: CC(C)(C)OC(=O)NC1CC2(C1)CC(Nc1cc(C(=O)NC[C@H](O)CN3CCc4ccccc4C3)ncn1)C2]

(S)-6-Chloro-N-(3-(3,4-dihydroisoquinolin-2(1H)-yl)-2-hydroxypropyl)pyrimidine-4-carboxamide (0.34 g, 0.97 mmol) was dissolved in isopropanol (20 mL), and TEA (0.25 g, 2.47 mmol) and tert-butyl (6-aminospiro[3.3]heptan-2-yl)carbamate (0.27 g, 1.2 mmol) were added in sequence. The reaction solution was warmed up to 85° C. and reacted for 8 h. After the reaction was completed (monitored by TLC), the reaction solution was concentrated under reduced pressure and purified by column chromatography (DCM:MeOH=30:1) to give a target compound (0.43 g, 82.60%).

Step 3: Preparation of (S)-6-((6-aminospiro[3.3]heptan-2-yl)amino)-N-(3-(3,4-dihydroisoquinolin-2(1H)-yl)-2-hydroxypropyl)pyrimidine-4-carboxamide (T-1)

T-1

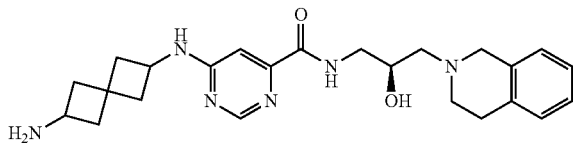

Tert-butyl (S)-(6-((6-(3-(3,4-dihydroisoquinolin-2(1H)-yl)-2-hydroxypropyl)carbamoyl)pyrimidin-4-yl)amino)spiro[3.3]heptan-2-yl)carbamate (0.38 g, 0.71 mmol) was dissolved in dichloromethane (20 mL), and trifluoroacetic acid (1 mL) was added and reacted at room temperature for 1 h. The reaction solution was concentrated to dryness under reduced pressure to give a target compound (0.20 g, 64.52%).

MS: m/z 437.41 [M+H]$^+$.

Preparation Example 2: Preparation of (S)-N-(3-(3, 4-dihydroisoquinolin-2(1H)-yl)-2-hydroxypropyl)-6-(piperidin-4-ylamino)pyrimidine-4-carboxamide (T-2)

T-2

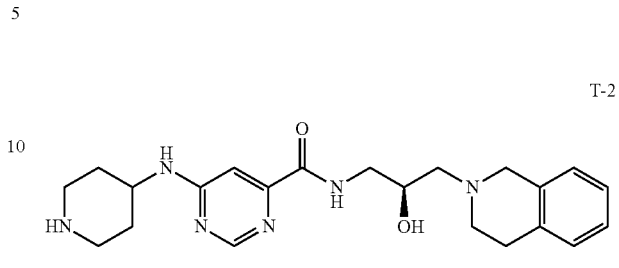

The synthesis method was the same as that of Preparation Example 1, except that tert-butyl (6-aminospiro[3.3]heptan-2-yl)carbamate was replaced with tert-butyl 4-aminopiperidine-1-carboxylate (0.24 g, 1.2 mmol) to give a target compound (0.25 g, 85.77%).

MS: m/z 411.54 [M+H]$^+$.

Preparation Example 3: Preparation of (S)-6-((7-azaspiro[3.5]nonan-2-yl)amino)-N-(3-(3,4-dihydroisoquinolin-2(1H)-yl)-2-hydroxypropyl)pyrimidine-4-carboxamide (T-3)

T-3

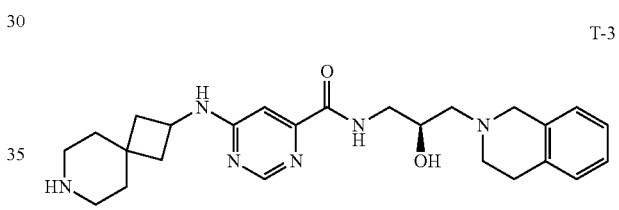

The synthesis method was the same as that of Preparation Example 1, except that tert-butyl 4-aminopiperidine-1-carboxylate was replaced with 2-amino-7-tert-butoxycarbonyl-7-azaspiro[3.5]nonane (0.29 g, 1.2 mmol) to give a target compound (0.30 g, 93.77%).

MS: m/z 451.46 [M+H]$^+$.

Preparation Example 4: Preparation of (S)-6-((2-azaspiro[3.3]heptan-6-yl)amino)-N-(3-(3,4-dihydroisoquinolin-2(1H)-yl)-2-hydroxypropyl)pyrimidine-4-carboxamide (T-4)

T-4

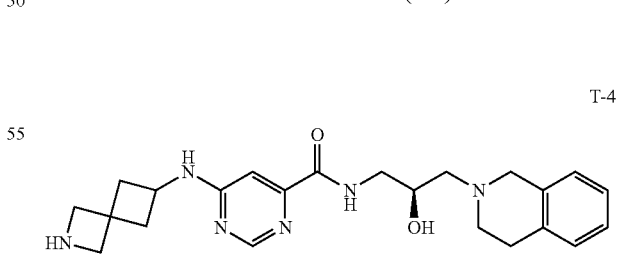

The synthesis method was the same as that of Preparation Example 1, except that 20 tert-butyl 4-aminopiperidine-1-carboxylate (0.25 g, 1.2 mmol) was replaced with tert-butyl 6-amino-2-azaspiro[3.3]heptane-2-carboxylate to give a target compound (0.26 g, 86.67%).

MS: m/z 423.38 [M+H]$^+$.

Preparation Example 5 to Preparation Example 8

With reference to the process steps in Preparation Example 1, intermediates T-5 to T-8 were prepared by reacting the corresponding starting materials below with (S)-6-chloro-N-(3-(3,4-dihydroisoquinolin-2(1H)-yl)-2-hydroxypropyl)pyrimidine-4-carboxamide

| Preparation Example | Starting Material | Structure and Ser. No. of Intermediate | Characterization Data [M + H]⁺ |
|---|---|---|---|
| 5 | | T-5 | 447.35 |
| 6 | | T-6 | 429.32 |
| 7 | | T-7 | 411.29 |
| 8 | | T-8 | 397.42 |

Preparation Example 9: Preparation of 2-cyclopropyl-2-(hydroxyimino)acetic acid (S-1)

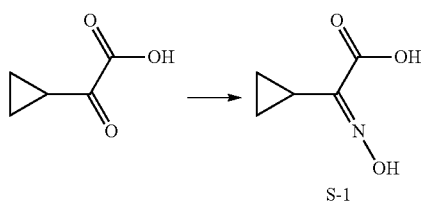

2-Cyclopropyl-2-oxoacetic acid (1.14 g, 10.00 mmol, 1 eq) was dissolved in a mixed solvent of tetrahydrofuran (20 ml) and water (100 ml), and KOH (0.62 g, 11.00 mmol, 1.1 eq) was added, and stirred until the reaction solution was clear. Thereafter, under the ice bath condition, hydroxylamine hydrochloride (1.39 g, 20.00 mmol, 2.0 eq) was added in batches, and reacted for 2 h. The reaction solution was filtered to give a target compound (1.00 g, 77.45%).

$^1$H NMR (600 MHz, D$_2$O): δ0.842-0.962 (m, 4H), 1.970-2.066 (m, 1H).

Preparation Example 10: Preparation of 2-cyclopropyl-2-(methoxyimino)acetic

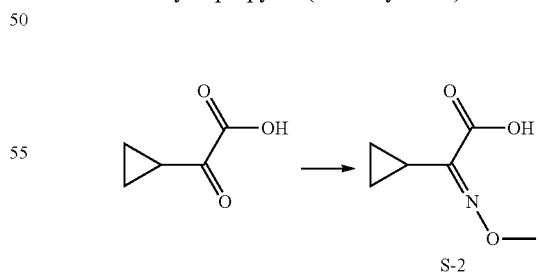

The synthesis method was the same as that of Preparation Example 9, except that hydroxylamine hydrochloride was replaced with methoxyamine hydrochloride (1.67 g, 20.00 mmol) to give a target compound (1.00 g, 70.00%).

$^1$H NMR (600 MHz, D$_2$O): δ0.842-0.9617 (m, 4H), 1.970-2.066 (m, 1H), 3.951 (s, 3H).

Preparation Example 11: Preparation of 2-(hydroxyimino)propanoic acid (S-3)

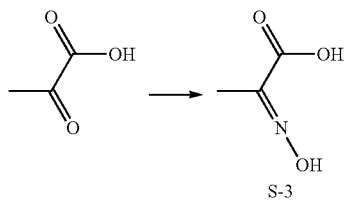

S-3

The synthesis method was the same as that of Preparation Example 9, except that 2-cyclopropyl-2-oxoacetic acid was replaced with 2-oxopropanoic acid (0.88 g, 10.00 mmol) to give a target compound (0.75 g, 72.81%).

$^1$H NMR (600 MHz, DMSO-$d_6$): δ 1.887 (s, 3H), 12.073 (s, 1H), 12.630 (s, 1H).

Preparation Example 12: Preparation of 2-(methoxyimino)propanoic acid (S-4)

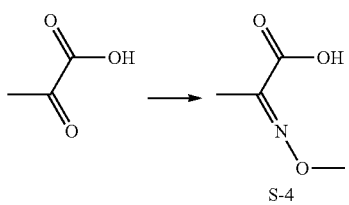

S-4

The synthesis method was the same as that of Preparation Example 9, except that 2-cyclopropyl-2-oxoacetic acid and hydroxylamine hydrochloride were replaced with 2-oxopropanoic acid (0.88 g, 10.00 mmol) and methoxyamine hydrochloride (1.67 g, 20.00 mmol) respectively to give a target compound (0.91 g, 77.78%).

$^1$H NMR (600 MHz, DMSO-$d_6$): δ 1.920 (s, 3H), 3.953 (s, 3H), 12.985 (s, 1H).

Preparation Example 13: Preparation of 2-(methoxyimino)-4-methylpentanoic acid (S-5)

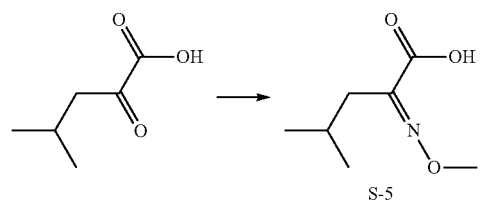

S-5

The synthesis method was the same as that of Preparation Example 9, except that 2-cyclopropyl-2-oxoacetic acid and hydroxylamine hydrochloride were replaced with 4-methyl-2-oxopentanoic acid (1.30 g, 10.00 mmol) and methoxyamine hydrochloride (1.67 g, 20.00 mmol) respectively to give a target compound (1.20 g, 75.39%).

$^1$H NMR (600 MHz, DMSO-$d_6$): δ 0.846-0.857 (m, 6H), 1.883-1.929 (m, 1H), 2.364-2.376 (m, 2H), 3.926 (s, 3H), 12.899 (s, 1H).

Preparation Example 14 to Preparation Example 20

With reference to the process steps in Preparation Example 9, intermediates S-6 to S-12 were prepared using the corresponding starting materials below and the preparation method.

| Preparation Example | Starting Material | Structure and Ser. No. of Intermediate | Characterization Data [M − H]$^-$ |
|---|---|---|---|
| 14 | ![cyclopropyl-2-oxoacetic acid and H2N-O-cyclopentyl] | S-6 | 196.13 |
| 15 | ![2-oxopropanoic acid and H2N-O-cyclopentyl] | S-7 | 170.21 |

| Preparation Example | Starting Material | Structure and Ser. No. of Intermediate | Characterization Data [M − H]⁻ |
|---|---|---|---|
| 16 | 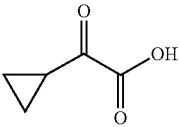 and 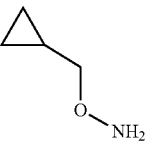 | 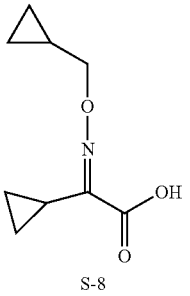<br>S-8 | 182.34 |
| 17 | 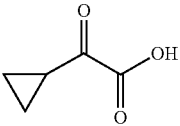 and 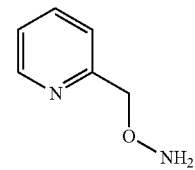 | 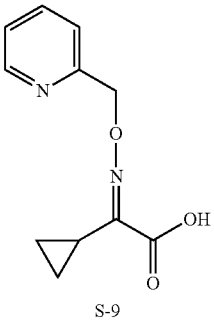<br>S-9 | 219.13 |
| 18 | 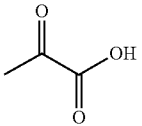 and 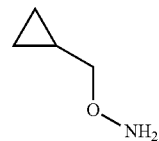 | 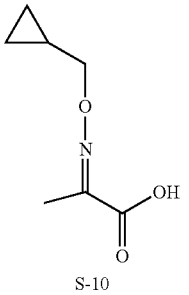<br>S-10 | 156.16 |
| 19 | 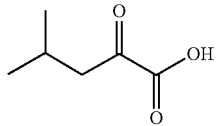<br>and hydroxylamine hydrochloride | 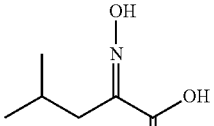<br>S-11 | 144.15 |
| 20 | 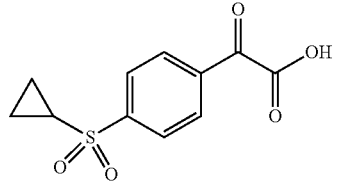<br>and methoxyamine hydrochloride | 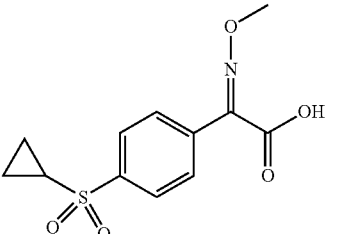<br>S-12 | 282.11 |

EXAMPLES

Preparation methods for the specific compounds of the present disclosure using the starting materials or the key intermediates prepared in the above Preparation Examples were described in the examples below.

Example 1: Preparation of (S)-6-((1-(2-cyclopropyl-2-(hydroxyimino)acetyl)piperidin-4-yl)amino)-N-(3-(3,4-dihydroisoquinolin-2(1H)-yl)-2-hydroxypropyl)pyrimidine-4-carboxamide (PR-1)

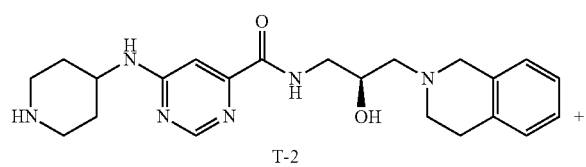

T-2

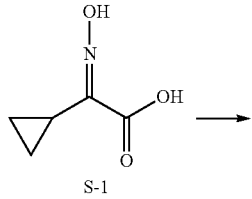

S-1

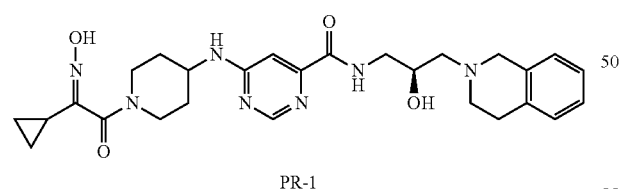

PR-1

Intermediate T-2 (0.25 g, 0.610 mmol) was dissolved in DMF (20 mL), and TEA (3 mL, the volume could be adjusted as long as the pH value of the system was more than 10), intermediate S-1 (0.094 g, 0.730 mmol), and HATU (0.30 g, 0.789 mmol) were added in sequence and reacted at room temperature for 2 h. After the reaction was complete monitored by TLC, the reaction solution was added with water and ethyl acetate and subjected to liquid-liquid separation. The organic phase was washed with water and saturated saline respectively, each for once, and then concentrated. The residue was purified by column chromatography (dichloromethane:methanol=30:1) to give a target compound (0.1 g, 31.47%).

MS: m/z 522.57 [M+H]$^+$.

$^1$H NMR (600 MHz, DMSO-d$_6$): δ 0.653-0.658 (d, 2H), 0.865-0.882 (d, 2H), 1.233-1.352 (m, 2H), 1.910-1.926 (m, 2H), 2.236-2.273 (m, 1H), 2.522 (m, 2H), 2.712-2.835 (m, 4H), 2.901-2.940 (m, 1H), 3.175-3.195 (m, 1H), 3.330 (m, 1H), 3.410-3.431 (m, 1H), 3.638-3.724 (m, 3H), 3.899 (m, 1H), 4.157-4.178 (m, 2H), 4.992 (s, 1H), 7.011-7.114 (m, 5H), 7.776-7.787 (d, 1H), 8.298 (s, 1H), 8.754 (s, 1H), 11.074 (s, 1H).

Example 2: Preparation of (S)-6-((1-(2-cyclopropyl-2-(methoxyimino)acetyl)piperidin-4-yl)amino)-N-(3-(3,4-dihydroisoquinolin-2(1H)-yl)-2-hydroxypropyl)pyrimidine-4-carboxamide (PR-2)

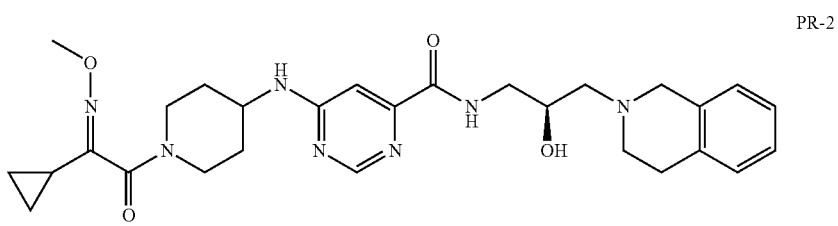 [SMILES: CON=C(C(=O)N1CCC(Nc2cc(C(=O)NC[C@H](O)CN3CCc4ccccc4C3)ncn2)CC1)C1CC1]

PR-2

The synthesis method was the same as that of Example 1, except that intermediate S-1 was replaced with intermediate S-2 (0.104 g, 0.730 mmol) to give a target compound (0.30 g, 91.96%).

MS: m/z 536.61 [M+H]$^+$.

$^1$H NMR (600 MHz, DMSO-d$_6$): δ 0.684-0.701 (d, 2H), 0.917-0.931 (d, 2H), 1.231-1.354 (m, 2H), 1.928 (s, 2H), 2.185-2.213 (m, 1H), 2.522 (m, 2H), 2.688-2.745 (m, 2H), 2.829 (s, 2H), 2.929 (m, 1H), 3.218-3.236 (m, 1H), 3.298 (m, 1H), 3.409-3.418 (m, 1H), 3.608-3.723 (m, 3H), 3.824 (s, 3H), 3.887-3.894 (m, 1H), 4.148-4.165 (m, 2H), 4.969 (s, 1H), 7.008-7.1114 (m, 5H), 7.779-7.790 (d, 1H), 8.754 (s, 1H), 8.763 (s, 1H).

Example 3: Preparation of (S)-N-(3-(3,4-dihydroisoquinolin-2(1H)-yl)-2-hydroxypropyl)-6-((1-(2-(hydroxyimino)propanoyl)piperidin-4-yl)amino)pyrimidine-4-carboxamide (PR-3)

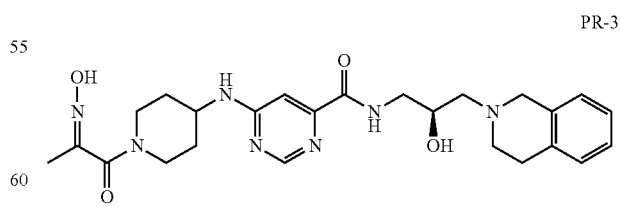

PR-3

The synthesis method was the same as that of Example 1, except that intermediate S-1 was replaced with intermediate S-3 (0.075 g, 0.730 mmol) to give a target compound (0.20 g, 66.29%).

MS: m/z 496.34 [M+H]$^+$.

¹H NMR (600 MHz, DMSO-d₆): δ 1.435 (m, 2H), 1.942-1.966 (m, 6H), 2.686-2.695 (m, 1H), 2.735-2.754 (m, 1H), 2.816-2.835 (m, 2H), 2.941-2.981 (m, 1H), 3.196-3.235 (m, 1H), 3.302 (m, 2H), 3.408-3.429 (m, 1H), 3.572-3.643 (m, 2H), 3.880-3.898 (m, 2H), 4.146 (m, 1H), 4.215-4.235 (m, 1H), 4.976 (s, 1H), 7.005-7.109 (m, 5H), 7.779-7.791 (d, 1H), 8.289 (s, 1H), 8.748-8.767 (t, 1H), 11.326 (s, 1H).

Example 4: Preparation of (S)-N-(3-(3,4-dihydroisoquinolin-2(1H)-yl)-2-hydroxypropyl)-6-((1-(2-(methoxyimino)propanoyl)piperidin-4-yl)amino)pyrimidine-4-carboxamide (PR-4)

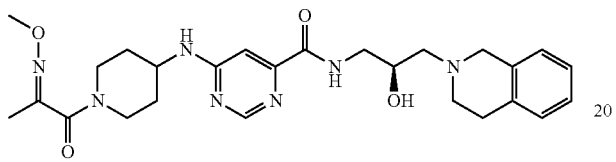

PR-4

The synthesis method was the same as that of Example 1, except that intermediate S-1 was replaced with intermediate S-4 (0.085 g, 0.730 mmol) to give a target compound (0.22 g, 70.75%).

MS: m/z 510.34 [M+H]⁺.

¹H NMR (600 MHz, CD₃OD): δ1.459-1.533 (m, 2H), 1.996 (s, 3H), 2.036-2.063 (m, 2H), 2.645-2.655 (m, 2H), 2.814-2.848 (m, 2H), 2.907-2.926 (m, 2H), 3.014 (m, 1H), 3.261-3.303 (m, 1H), 3.466-3.550 (m, 2H), 3.710 (s, 2H), 3.909 (s, 3H), 4.018-4.074 (m, 2H), 4.210 (s, 1H), 4.399-4.420 (d, 1H), 6.987-7.108 (m, 5H), 8.238 (s, 1H).

Example 5: Preparation of (S)-N-(3-(3,4-dihydroisoquinolin-2(1H)-yl)-2-hydroxypropyl)-6-((1-(2-(methoxyimino)-4-methylpentanoyl)piperidin-4-yl)amino)pyrimidine-4-carboxamide (PR-5)

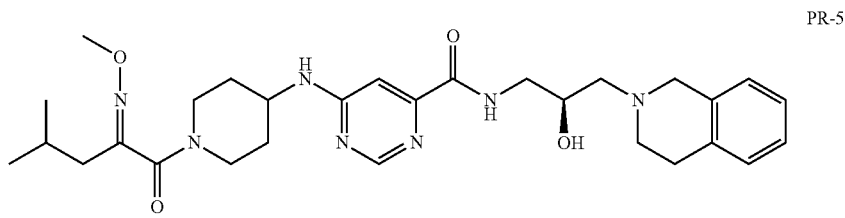 [SMILES: CON=C(CC(C)C)C(=O)N1CCC(Nc2cc(C(=O)NC[C@H](O)CN3CCc4ccccc4C3)ncn2)CC1]

PR-5

The synthesis method was the same as that of Example 1, except that intermediate S-1 was replaced with intermediate S-5 (0.116 g, 0.730 mmol) to give a target compound (0.17 g, 50.59%).

MS: m/z 552.67 [M+H]⁺.

¹H NMR (600 MHz, DMSO-d₆): δ 0.912 (m, 6H), 1.324-1.465 (m, 2H), 1.829-1.863 (m, 1H), 1.957 (m, 2H), 2.389-2.401 (d, 2H), 2.683-2.768 (m, 3H), 2.826-2.835 (m, 2H), 2.962-3.000 (t, 1H), 3.3250-3.298 (m, 2H), 3.423-3.444 (m, 2H), 3.589-3.657 (m, 2H), 3.836 (s, 3H), 3.902-3.969 (m, 2H), 4.198 (s, 1H), 4.252-4.271 (m, 1H), 4.984 (s, 1H), 7.013-7.117 (m, 5H), 7.797-7.805 (d, 1H), 8.302 (s, 1H), 8.759-8.768 (t, 1H).

Example 6: Preparation of (S)-6-((6-(2-cyclopropyl-2-(hydroxyimino)acetamido)spiro[3.3]heptan-2-yl)amino)-N-(3-(3,4-dihydroisoquinolin-2(1H)-yl)-2-hydroxypropyl)pyrimidine-4-carboxamide (PR-6)

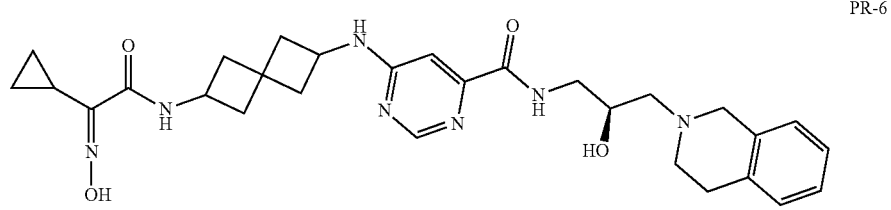 [SMILES: O=C(NC1CC2(C1)CC(Nc1cc(C(=O)NC[C@H](O)CN3CCc4ccccc4C3)ncn1)C2)C(=NO)C1CC1]

PR-6

The synthesis method was the same as that of Example 1, except that intermediate T-2 was replaced with intermediate T-1 (0.27 g, 0.610 mmol) to give a target compound (0.21 g, 62.86%).

MS: m/z 548.48 [M+H]$^+$.

$^1$H NMR (600 MHz, DMSO-d$_6$): δ 0.763-0.782 (m, 2H), 1.012-1.020 (m, 2H), 1.860-1.987 (m, 2H), 2.006-2.053 (m, 3H), 2.116-2.155 (m, 2H), 2.272-2.332 (m, 2H), 2.445 (m, 1H), 2.685-2.824 (m, 4H), 3.283-3.292 (m, 1H), 3.409 (br. s, 1H), 3.599-3.617 (m, 2H), 3.879-3.887 (m, 1H), 4.022-4.082 (m, 2H), 4.310 (m, 1H), 4.961 (s, 1H), 6.991-7.108 (m, 5H), 7.960-7.971 (d, 1H), 8.177-8.190 (d, 1H), 8.266 (s, 1H), 8.732 (s, 1H), 11.206 (s, 1H).

Example 7: Preparation of (S)-6-((6-(2-cyclopropyl-2-(methoxyimino)acetamido)spiro[3.3]heptan-2-yl)amino)-N-(3-(3,4-dihydroisoquinolin-2(1H)-yl)-2-hydroxypropyl)pyrimidine-4-carboxamide (PR-7)

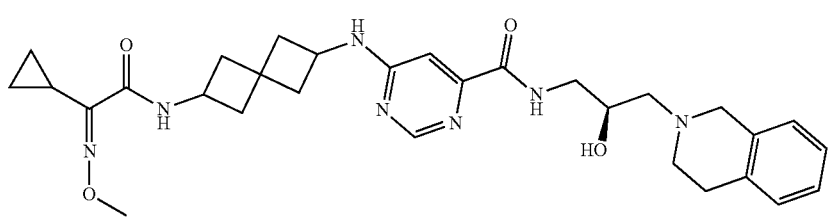

PR-7

The synthesis method was the same as that of Example 1, except that intermediate T-2 was replaced with intermediate T-1 (0.27 g, 0.610 mmol) and that intermediate S-1 was replaced with intermediate S-2 (0.104 g, 0.730 mmol) to give a target compound (0.23 g, 67.12%).

MS: m/z 562.68 [M+H]$^+$.

$^1$H NMR (600 MHz, DMSO-d$_6$): δ 0.817-0.843 (m, 2H), 0.969-0.994 (m, 2H), 1.979-1.997 (m, 2H), 2.012-2.086 (m, 3H), 2.116-2.160 (m, 2H), 2.271-2.351 (m, 2H), 2.464 (m, 1H), 2.681-2.833 (m, 4H), 3.283-3.292 (m, 1H), 3.410 (br. s, 1H), 3.603-3.621 (m, 2H), 3.860-3.889 (m, 4H), 4.021-4.069 (m, 2H), 4.311 (m, 1H), 4.966 (s, 1H), 6.994-7.108 (m, 5H), 7.962-7.973 (d, 1H), 8.268 (s, 1H), 8.367-8.379 (d, 1H), 8.735 (s, 1H).

Example 8: Preparation of (S)-N-(3-(3,4-dihydroisoquinolin-2(1H)-yl)-2-hydroxypropyl)-6-((6-(2-(hydroxyimino)propanamido)spiro[3.3]heptan-2-yl)amino)pyrimidine-4-carboxamide (PR-8)

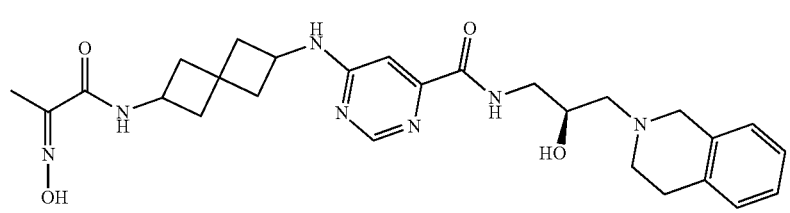

PR-8

The synthesis method was the same as that of Example 1, except that intermediate T-2 was replaced with intermediate T-1 (0.27 g, 0.610 mmol) and that intermediate S-1 was replaced with intermediate S-3 (0.075 g, 0.730 mmol) to give a target compound (0.15 g, 47.14%).

MS: m/z 522.43 [M+H]$^+$.

$^1$H NMR (600 MHz, CD$_3$OD): δ1.940-2.115 (m, 7H), 2.305-2.312 (m, 1H), 2.396 (m, 1H), 2.500 (m, 1H), 2.578 (m, 1H), 2.661-2.671 (d, 2H), 2.849-2.924 (m, 4H), 3.484-3.525 (m, 2H), 3.732 (s, 2H), 4.050-4.079 (m, 1H), 4.245-4.272 (m, 1H), 4.357 (s, 1H), 6.994-7.107 (m, 5H), 8.208 (s, 1H).

Example 9: Preparation of (S)-N-(3-(3,4-dihydroisoquinolin-2(1H)-yl)-2-hydroxypropyl)-6-((6-(2-(methoxyimino)propanamido)spiro[3.3]heptan-2-yl)amino)pyrimidine-4-carboxamide (PR-9)

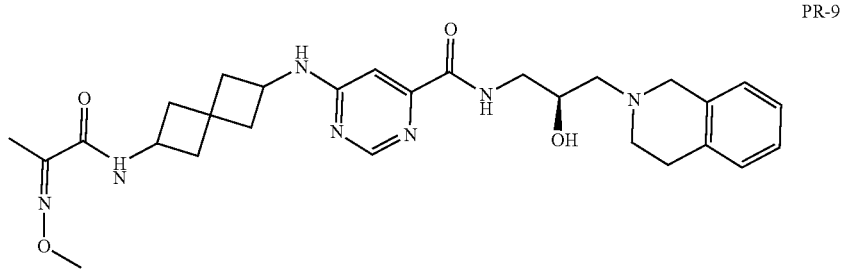 [SMILES: CON=C(C)C(=O)NC1CC2(C1)CC(Nc1cc(C(=O)NC[C@H](O)CN3CCc4ccccc4C3)ncn1)C2]

PR-9

The synthesis method was the same as that of Example 1, except that intermediate T-2 was replaced with intermediate T-1 (0.27 g, 0.610 mmol) and that intermediate S-1 was replaced with intermediate S-4 (0.085 g, 0.730 mmol) to give a target compound (0.20 g, 61.26%).

MS: m/z 536.17 [M+H]$^+$.

$^1$H NMR (600 MHz, CD$_3$OD): δ1.935-2.167 (m, 7H), 2.289-2.328 (m, 1H), 2.412 (m, 1H), 2.506 (m, 1H), 2.591 (m, 1H), 2.728-2.743 (d, 2H), 2.947-2.958 (m, 4H), 3.468-3.550 (m, 2H), 3.841 (s, 2H), 3.990-4.098 (s, 3H), 4.107-4.117 (m, 1H), 4.255-4.282 (m, 1H), 4.367 (s, 1H), 7.020-7.133 (m, 5H), 8.234 (s, 1H).

Example 10: Preparation of (S)-N-(3-(3,4-dihydroisoquinolin-2(1H)-yl)-2-hydroxypropyl)-6-((2-(2-(methoxyimino)propanoyl)-2-azaspiro[3.3]heptan-6-yl)amino)pyrimidine-4-carboxamide (PR-10)

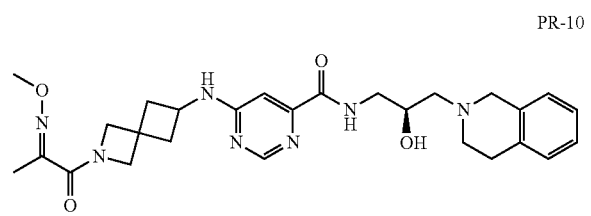 [SMILES: CON=C(C)C(=O)N1CC2(CC(Nc3cc(C(=O)NC[C@H](O)CN4CCc5ccccc5C4)ncn3)C2)C1]

PR-10

The synthesis method was the same as that of Example 1, except that intermediate T-2 was replaced with intermediate T-4 (0.26 g, 0.610 mmol) and that intermediate S-1 was replaced with intermediate S-4 (0.085 g, 0.730 mmol) to give a target compound (0.13 g, 40.86%).

MS: m/z 522.74 [M+H]$^+$.

$^1$H NMR (600 MHz, DMSO-d$_6$): δ 1.879 (s, 3H), 2.104 (m, 2H), 2.513-2.690 (m, 3H), 2.740-2.749 (m, 1H), 2.820-2.838 (m, 2H), 3.283-3.292 (m, 1H), 3.425-3.434 (m, 1H), 3.604-3.648 (m, 2H), 3.907-3.933 (m, 6H), 4.021-4.059 (m, 2H), 4.281-4.308 (m, 2H), 4.408 (m, 1H), 4.989 (s, 1H), 7.001-7.113 (m, 5H), 8.013-8.037 (t, 1H), 8.280-8.282 (d, 1H), 8.763-8.781 (t, 1H).

Example 11: Preparation of (S)-6-((2-(2-cyclopropyl-2-(hydroxyimino)acetyl)-2-azaspiro[3.3]heptan-6-yl)amino)-N-(3-(3,4-dihydroisoquinolin-2(1H)-yl)-2-hydroxypropyl)pyrimidine-4-carboxamide (PR-11)

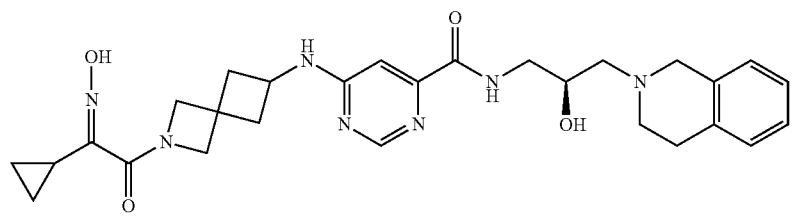

PR-11

The synthesis method was the same as that of Example 1, except that intermediate T-2 was replaced with intermediate T-4 (0.26 g, 0.610 mmol) to give a target compound (0.09 g, 28.52%).

MS: m/z 534.64 [M+H]$^+$.

$^1$H NMR (600 MHz, DMSO-d$_6$): δ 0.779-0.804 (d, 2H), 0.979-0.992 (d, 2H), 2.088-2.167 (m, 3H), 2.513-2.690 (m, 3H), 2.740-2.753 (m, 1H), 2.822-2.841 (m, 2H), 3.283-3.292 (m, 2H), 3.425-3.434 (m, 1H), 3.607-3.627 (m, 2H), 3.853-3.969 (m, 4H), 4.111 (m, 1H), 4.226 (m, 1H), 4.308 (m, 1H), 4.987 (s, 1H), 7.012-7.117 (m, 5H), 8.007-8.018 (t, 1H), 8.282 (d, 1H), 8.762 (s, 1H), 11.326 (s, 1H).

Example 12: Preparation of (S)-6-((2-(2-cyclopropyl-2-(methoxyimino)acetyl)-2-azaspiro[3.3]heptan-6-yl)amino)-N-(3-(3,4-dihydroisoquinolin-2(1H)-yl)-2-hydroxypropyl)pyrimidine-4-carboxamide (PR-12)

Example 13: Preparation of (S)-N-(3-(3,4-dihydroisoquinolin-2(1H)-yl)-2-hydroxypropyl)-6-((7-(2-(methoxyimino)propanoyl)-7-azaspiro[3.5]nonan-2-yl)amino)pyrimidine-4-carboxamide (PR-13)

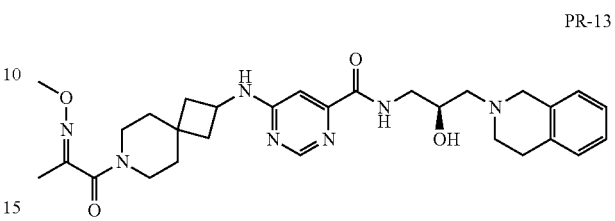

PR-13

The synthesis method was the same as that of Example 1, except that intermediate T-2 was replaced with intermediate T-3 (0.27 g, 0.610 mmol) and that intermediate S-1 was replaced with intermediate S-4 (0.085 g, 0.730 mmol) to give a target compound (0.21 g, 62.68%).

MS: m/z 550.24 [M+H]$^+$.

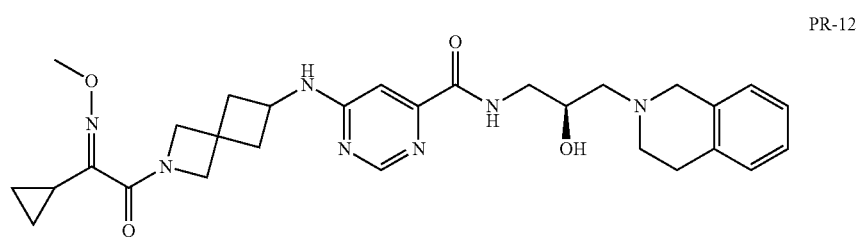 [SMILES: CON=C(C(=O)N1CC2(CC(Nc3cc(C(=O)NC[C@H](O)CN4CCc5ccccc5C4)ncn3)C2)C1)C1CC1]

PR-12

The synthesis method was the same as that of Example 1, except that intermediate T-2 was replaced with intermediate T-4 (0.26 g, 0.610 mmol) and that intermediate S-1 was replaced with intermediate S-2 (0.104 g, 0.730 mmol) to give a target compound (0.14 g, 41.90%).

MS: m/z 548.24 [M+H]$^+$.

$^1$H NMR (600 MHz, DMSO-d$_6$): δ 0.838-0.852 (d, 2H), 0.999 (d, 2H), 1.241 (m, 1H), 2.089-2.099 (m, 3H), 2.513-2.589 (m, 3H), 2.715-2.769 (m, 2H), 2.841 (m, 2H), 3.283-3.292 (m, 1H), 3.418-3.438 (m, 1H), 3.643 (m, 2H), 3.855-3.902 (m, 5H), 3.989 (m, 1H), 4.151 (s, 1H), 4.274-4.301 (m, 2H), 4.997 (s, 1H), 7.020-7.111 (m, 5H), 8.010-8.019 (t, 1H), 8.291 (d, 1H), 8.764 (s, 1H).

$^1$H NMR (600 MHz, DMSO-d$_6$): δ 1.547 (m, 2H), 1.614 (m, 2H), 1.723 (m, 2H), 1.918-1.929 (d, 3H), 2.313-2.326 (m, 2H), 2.511-2.549 (m, 1H), 2.684-2.769 (m, 2H), 2.826-2.844 (m, 2H), 3.283-3.292 (m, 2H), 3.418-3.503 (m, 4H), 3.616-3.634 (m, 2H), 3.833-3.849 (m, 3H), 3.897-3.905 (m, 1H), 4.427 (m, 1H), 4.986 (s, 1H), 5.761 (s, 1H), 7.012-7.117 (m, 5H), 8.036-8.057 (t, 1H), 8.286 (s, 1H), 8.759 (s, 1H).

Example 14 to Example 40

According to the method of Example 1, the corresponding reactants were chosen to synthesize compounds PR-14 to PR-40 respectively, whose structural formulae and characterization data was shown below respectively.

| Example | Reactant | Chemical Formula | Characterization Data [M + H]+ |
|---|---|---|---|
| 14 | S-6 and T-2 | PR-14 | 590.61 |
| 15 | S-7 and T-1 | PR-15 | 590.35 |
| 16 | S-6 and T-1 | PR-16 | 616.59 |
| 17 | S-8 and T-2 | PR-17 | 576.71 |
| 18 | S-8 and T-4 | PR-18 | 588.55 |

| Example | Reactant | Chemical Formula | Characterization Data [M + H]+ |
|---|---|---|---|
| 19 | S-9 and T-2 | 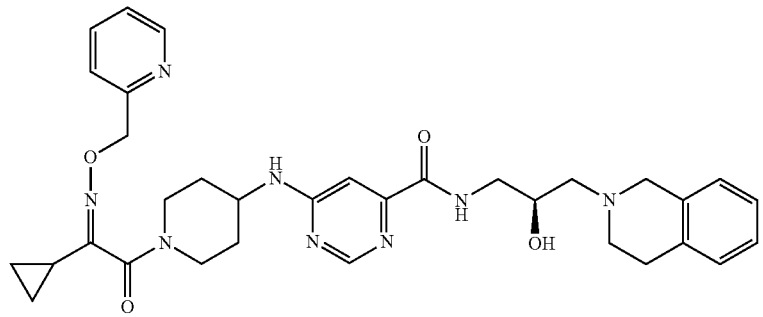<br>PR-19 | 613.77 |
| 20 | S-9 and T-1 | 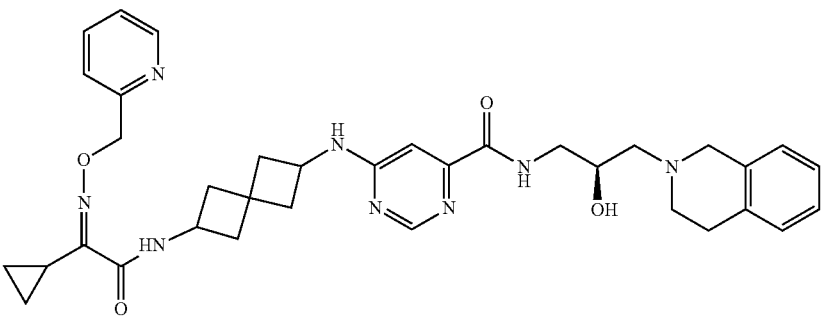<br>PR-20 | 639.68 |
| 21 | S-1 and T-5 | 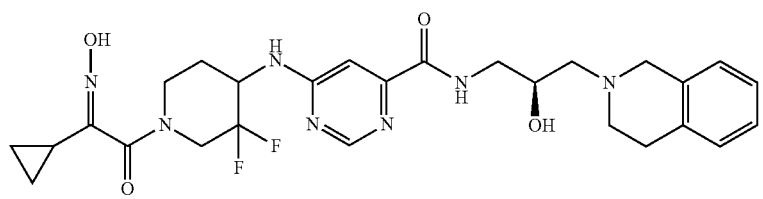<br>PR-21 | 558.60 |
| 22 | S-2 and T-5 | 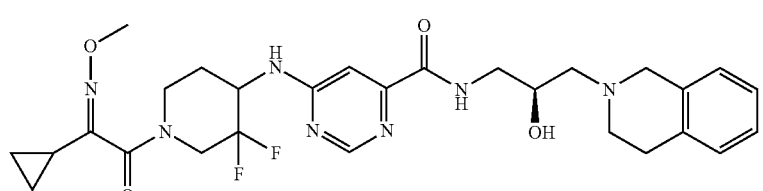<br>PR-22 | 572.60 |
| 23 | S-6 and T-5 | 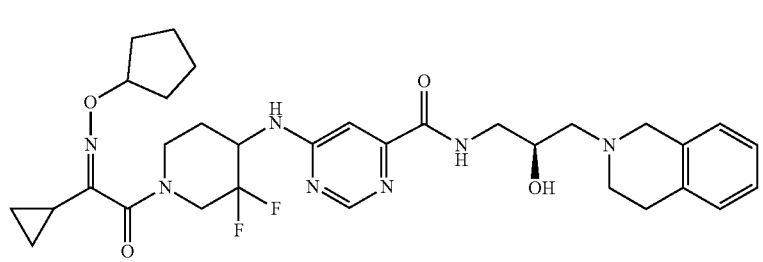<br>PR-23 | 626.71 |

-continued
| Example | Reactant | Chemical Formula | Characterization Data [M + H]+ |
|---|---|---|---|
| 24 | S-2 and T-6 | 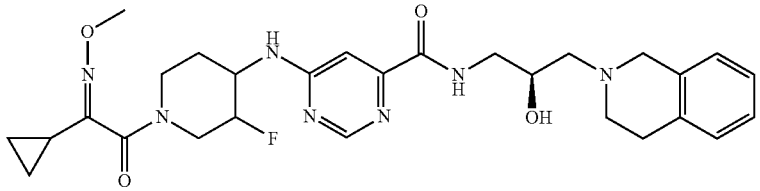 PR-24 | 554.68 |
| 25 | S-4 and T-6 | 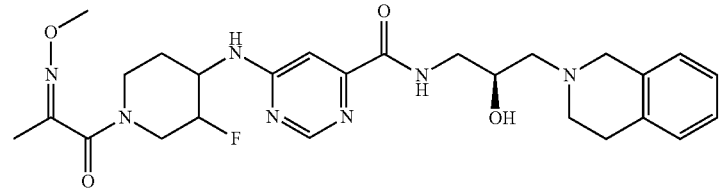 PR-25 | 528.43 |
| 26 | S-10 and T-6 | 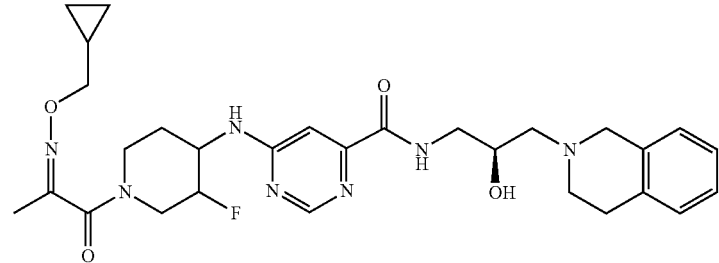 PR-26 | 568.69 |
| 27 | S-1 and T-7 | 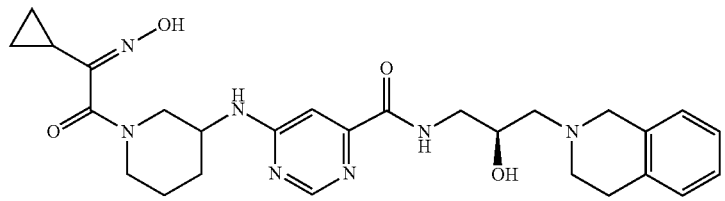 PR-27 | 522.43 |
| 28 | S-2 and T-7 | 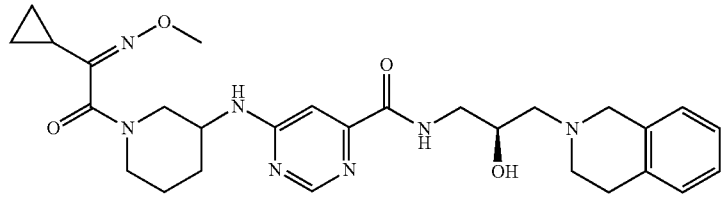 PR-28 | 536.41 |
| 29 | S-4 and T-7 | 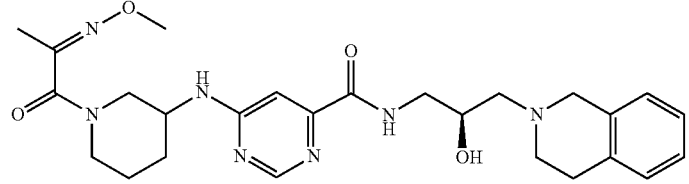 PR-29 | 510.37 |

-continued

| Example | Reactant | Chemical Formula | Characterization Data [M + H]+ |
|---|---|---|---|
| 30 | S-1 and T-8 | PR-30 | 508.54 |
| 31 | S-2 and T-8 | PR-31 | 522.33 |
| 32 | S-3 and T-8 | PR-32 | 482.38 |
| 33 | S-11 and T-2 | PR-33 | 538.30 |
| 34 | S-11 and T-1 | PR-34 | 564.41 |
| 35 | S-12 and T-6 | PR-35 | 694.71 |

| Example | Reactant | Chemical Formula | Characterization Data [M + H]+ |
|---|---|---|---|
| 36 | S-12 and T-2 | PR-36 | 676.49 |
| 37 | S-1 and T-3 | PR-37 | 562.38 |
| 38 | S-3 and T-3 | PR-38 | 536.39 |
| 39 | S-7 and T-2 | PR-39 | 564.64 |
| 40 | S-2 and T-3 | PR-40 | 576.60 |

Test Example 1: Experiment on In Vitro Efficacy

1. Cell Experiment

The complete medium required for the culture of human acute monocytic leukemia cell line MV4-11 (Shanghai Cell Bank) for experiment was IMDM (Cat NO. 12440-053, gibco) supplemented with 10% FBS (Cat NO. SA311.02, cellmax). The cells were cultured in an incubator at 37° C. with 5% $CO_2$. The experiment reagents included dimethyl sulfoxide (Tianjin Kemiou Chemical Reagent Co., Ltd.) and MTT (THIAZOLYL BLUE TETRAZOLIUM BROMIDE, CAS. NO. 298-93-1, VWR). The control compound GSK3326595 for experiment was homemade or commercially available. The test compound was encapsulated and stored at 4° C.

Dimethyl sulfoxide was used as a vehicle to fully dissolve the test compound, thereby formulating a stock solution at a concentration of $5 \times 10^{-2}$ mol/L. The stock solution was stored at −20° C. With the complete medium as diluent, the test compound was subjected to gradient dilution to afford dilutions at different concentrations for standby application. In a 96-well culture plate, the suspension of the human acute monocytic leukemia cell line MV4-11 in the complete medium, at a volume of 100 μL/well ($2 \times 10^3$ cells/well), was added. Afterwards, the dilutions at different concentrations of the corresponding test compounds (100 μL/well) were added, respectively. Each of the test compounds was provided with 8 concentration gradients and three replicates were used for each concentration. The plates were incubated in an incubator at 37° C. with 5% $CO_2$. On Day 6, the plate was treated with MTT (20 μL/well) and incubated for 4 h in an incubator at 37° C. with 5% $CO_2$. The supernatant was discarded. Dimethyl sulfoxide (150 μL/well) was added and mixed well by shaking. The OD value at 550 nm was measured with a microplate reader. Wells containing only cell suspensions without the test compounds were control wells, and wells containing only complete media were blank wells. The cell growth inhibition rate was calculated according to the following equation:

Inhibition rate=(OD value$_{control\ well}$−OD value$_{sample\ well}$)/(OD value$_{control\ well}$−OD value$_{blank\ well}$)×100%.

According to the inhibition rate at each concentration, the half maximal inhibitory concentration $IC_{50}$ value was calculated using the SPSS software. The results were listed in Table 2.

2. Enzymatic Experiment

The radiometric assay for PRMT5 based on FlashPlate technology was adopted to determine $IC_{50}$ of the test compound.

After dissolved in dimethyl sulfoxide respectively, the test compounds were added into an Echo Qualified 384-well plate and diluted to the desired concentrations. The diluted test compounds were transferred from the Echo Qualified 384-well plate to a 384-well reaction plate using an Echo 550 instrument, and dimethyl sulfoxide was transferred into both the control and blank wells. PRMT5 was added to 1×reaction buffer (including 10 mM Tris-HCl; pH 8.0; 0.01% Tween-20; 1 mM DTT) to form a 1.67×enzyme solution (at an enzyme concentration of 5 nM). A polypeptide substrate and [3H]-SAM were added to 1× reaction buffer to form a 2.5× substrate solution (the terminal concentrations of the substrates were 100 nM and 250 nM, respectively). At a volume of 15 μL/well, the 1.67× enzyme solution was added into wells of the 384-well reaction plate. In case of the blank wells, the enzyme solution was replaced with 15 μL of the 1× reaction buffer. The reaction plate was centrifuged at 1000 rpm for 1 min, and incubated at room temperature for 15 min. To each well of the 384-well reaction plate, 10 μL of the 2.5× substrate solution was added, centrifuged at 1000 rpm for 1 min, and reacted at 25° C. for 60 min. To each well of the 384-well reaction plate, 5 μL of reaction stop solution (which was 125 M cold SAM solution) was added to terminate the reaction. From each well of the test plate, 25 μL was measured and transferred to Flashplate and left at room temperature for 1 h. Thereafter, the Flashplate was washed with 0.1% Tween-20 solution three times. Readings were taken with MicroBeta 2. The data was converted into the inhibition rate data.

Inhibition rate=(conversion rate$_{control\ well}$−conversion rate$_{compound\ well}$)/(conversion rate$_{control\ well}$−conversion rate$_{blank\ well}$)×100%. The $IC_{50}$curves were fitted using XLFit5.4.0.8. The fitting equation was as follows:Y=Bottom+(Top-Bottom)/(1+($IC_{50}$/X)$^{HillSlope}$).

TABLE 1

Experimental data for enzymatic effects of the compounds of the present disclosure

| Test Compound | Enzymology ($IC_{50}$, nM) |
|---|---|
| GSK3326595 | 47 |
| PR-1 | 13 |
| PR-2 | 13 |
| PR-3 | 15 |
| PR-4 | 31 |
| PR-5 | 23 |
| PR-6 | 16 |
| PR-7 | 14 |
| PR-8 | 19 |
| PR-9 | 23 |
| PR-10 | 16 |
| PR-11 | 18 |
| PR-12 | 2.7 |
| PR-13 | 16 |

TABLE 2

Experimental data for cytological effects of the compounds of the present disclosure

| Test Compounds | MV4-11 MTT ($IC_{50}$, nM) |
|---|---|
| GSK3326595 | 6.683 |
| PR-1 | 5.017 |
| PR-3 | 1.244 |
| PR-4 | 6.767 |
| PR-5 | 1.438 |
| PR-6 | 1.900 |
| PR-7 | 1.043 |
| PR-8 | 0.980 |
| PR-9 | 6.843 |
| PR-10 | 0.664 |
| PR-11 | 1.403 |
| PR-12 | 0.691 |
| PR-13 | 1.532 |

The enzymatic and cytological screening results showed that the compounds of the present disclosure exhibited better inhibitory activities at both enzyme and cell levels, as compared to the positive control drug GSK3326595 (the 208th compound in WO2014100719).

Test Example 2: Experiment on In Vivo Efficacy

Experimental female NOD-SCID mice, SPF grade, 4 to 5 weeks, were purchased from Beijing Vital River Laboratory Animal Technology Co., Ltd. The mice were intraperitoneally injected with cyclophosphamide at a dose of 100 mg/kg one day before cell inoculation. The human acute monocytic leukemia cell line MV4-11 ($1 \times 10^7$/0.1 ml/mouse) was subcutaneously inoculated into forelimb axilla of mice to establish a subcutaneous xenograft model. When the tumor volumes reached about 110 $mm^3$ (10 days after inoculation), the mice were equally grouped according to the tumor volume, with 5 mice in each group, i.e., vehicle group (2% DMSO+98% (0.2 g/mL) hydroxypropyl-β-cyclodextrin) and test drug groups. For the test drug groups, the dose of administration was 100 mg/kg, the dosing volume was 10 mL/kg, the dosing frequency was BID, the tumor diameters were measured twice per week, and the data was recorded. The mice were administered for 11 consecutive days. When the experiment ended, the tumors were dissected and weighed.

The body weight growth rate, the tumor volume, and the tumor weight inhibition rate were calculated according to the following equations: body weight growth rate=$X(w_i-w_0)/X_{w_0} \times 10000$, where $W_i$ denoted the body weight of a mouse in each test drug group on the $n^{th}$ day, and $W_0$ denoted the body weight of a mouse in each test drug group at the beginning of administration; tumor volume (V)=½×a×b², where a and b denoted the long diameter and the short diameter of a tumor, respectively; d0 denoted before grouping for administration, d9 denoted the 9$^{th}$ day after administration, relative tumor volume (RTV)=d9 tumor volume/d0 tumor volume; tumor weight inhibition rate=(tumor weight $_{vehicle\ group}$-tumor weight$_{test\ drug\ group}$)/tumor weight$_{vehicle\ group} \times 1000$ The results were listed in Table 3.

TABLE 4

PK experimental data for the compounds of the present disclosure in SD rats

| Drug | Dose (mg/kg) | $T_{max}$ (hr) | $C_{max}$ (ng/mL) | $AUC_{0-24\ h}$ (h*ng/mL) |
|---|---|---|---|---|
| GSK3326595 | 25 | 2.67 | 60.3 | 589 |
| PR-2 | 25 | 0.5 | 473 | 821 |
| PR-4 | 25 | 0.333 | 2370 | 4406 |
| PR-5 | 25 | 0.333 | 660 | 674 |
| PR-7 | 25 | 0.667 | 1117 | 2545 |
| PR-9 | 25 | 0.5 | 875 | 1267 |
| PR-10 | 25 | 0.417 | 1337 | 2038 |
| PR-13 | 25 | 0.833 | 516 | 840 |

TABLE 3

In vivo experimental data for the compounds of the present disclosure in MV4-11 xenografts model

| Drug | Dose (mg/kg) | Animal number (piece) | Body Weight Change (%) | d0 Tumor Volume (mm³) | d9 Tumor Volume (mm³) | RTV (d9) | Tumor Weight (g) | Tumor weight inhibition rate (%) |
|---|---|---|---|---|---|---|---|---|
| Vehicle group | 0 | (4/5) | 6.8 | 164.5 ± 29.1 | 575.1 ± 205.3 | 3.7 ± 1.7 | 0.7265 ± 0.2458 | 0.0 |
| GSK3326595 | 100 | (5/5) | -6.8 | 165.2 ± 23.1 | 135 ± 43** | 0.8 ± 0.2** | 0.1124 ± 0.0764*** | 84.5 |
| PR-4 | 100 | (5/5) | -6.1 | 165.3 ± 27.5 | 55.7 ± 19.7***## | 0.4 ± 0.1**## | 0.0648 ± 0.0267***### | 91.1 |
| PR-7 | 100 | (5/5) | -6.9 | 165.6 ± 28.1 | 60.2 ± 20.1***## | 0.4 ± 0.1***## | 0.0710 ± 0.0353***## | 90.2 |
| PR-10 | 100 | (4/5) | -1.5 | 164.8 ± 32.5 | 34.3 ± 29.2**## | 0.2 ± 0.2**### | 0.0153 ± 0.0105***### | 97.9 |
| PR-13 | 100 | (5/5) | 3.7 | 165.4 ± 30.2 | 69.7 ± 22.9***# | 0.4 ± 0.1**## | 0.0679 ± 0.0225***## | 90.6 |

Note: Compared with the vehicle group, *p<0.05, p<0.01, *p<0.001; compared with the control drug GSK3326595, ##p<0.01, ###p<0.001; in group PR-10, one animal died due to incorrect gavage, and the other animals in this group did not experience significant weight loss, so the death was not caused by drug toxicity.

The experimental results of the in vivo efficacy in MV4-11 xenografts model showed that the compounds of the present disclosure had a significant tumor-inhibitory activity, and had significantly better inhibitory effects on the tumor volume and tumor weight than those of the control drug GSK3326595.

Test Example 3: Pharmacokinetic Experiment

SD rats (male, 180 g to 200 g, Beijing Vital River Laboratory Animal Technology Co., Ltd.) were administered with the test compounds (solvent: 2% DMSO+98% (0.2 g/mL) hydroxypropyl-β-cyclodextrin, dosing volume: 5 mL/kg) by gavage. Blood was collected from the orbits of the rats at different points in time (0.25, 0.5, 1, 2, 4, 8, 24 h) after administration. The collected whole blood was anticoagulated with heparin sodium and centrifuged at 3000 g to obtain rat plasma samples, and methanol was added thereto to precipitate proteins. The drug concentration in rat plasma after administration was determined by HIPLC-MS/MS method. A drug concentration-time curve was plotted and the pharmacokinetic parameters were calculated. Pharmacokinetic behaviors of the compounds after administration in rats were described by means of the parameter estimation of non-compartmental model based on statistical moment theory. The results were listed in Table 4.

The results of the PK experiment suggested that the compounds of the present disclosure were all better absorbed in rats with a shorter time to peak, a higher peak concentration, and a significantly increased in vivo exposure as compared to the positive control drug GSK3326595.

The foregoing is merely the specific embodiments of the present disclosure, but the scope of the present disclosure is not limited thereto. Variations or substitutions readily conceivable to any person skilled in the art within the technical scope disclosed herein should be covered by the scope of the present disclosure.

What is claimed is:

1. A compound represented by formula (I), or a pharmaceutically acceptable salt, tautomer, geometric isomer, optical isomer, solvate or isotopic derivative thereof,

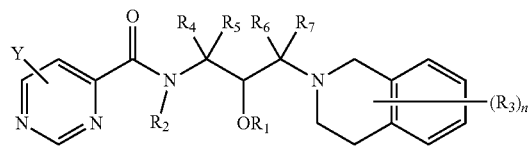

wherein
Y is

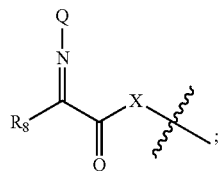

X is selected from the group consisting of

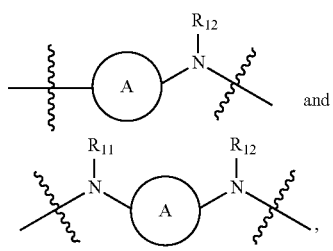

wherein the N atom linked to $R_{12}$ is linked to the pyrimidine ring;

ring A is selected from the group consisting of the following optionally substituted groups: $C_{3-10}$ cycloalkyl, 3- to 10-membered heterocycloalkyl, 4- to 12-membered bridged cyclyl, 4- to 12-membered bridged heterocyclyl, monospirocyclyl, monospiroheterocyclyl, fused cyclyl, and fused heterocyclyl, wherein the monospirocyclyl and monospiroheterocyclyl are selected from the group consisting of 3-membered/5-membered, 4-membered/4-membered, 4-membered/5-membered, 4-membered/6-membered, 5-membered/5-membered, and 5-membered/6-membered rings, where the number of ring atoms in each ring includes the number of spiro atom; and wherein the fused cyclyl and fused heterocyclyl are selected from the group consisting of 5-membered/5-membered, 5-membered/6-membered, and 6-membered/6-membered rings, where the number of ring atoms in each ring includes the number of shared atoms;

$R_1$, $R_2$, $R_{11}$, and $R_{12}$ are each independently selected, at each occurrence, from the group consisting of hydrogen and the following optionally substituted groups: $C_{2-6}$ alkenyl, $C_{2-6}$ alkynyl, $C_{1-6}$ alkyl, $C_{3-10}$ cycloalkyl, 3- to 10-membered heterocycloalkyl, $C_{6-10}$ aryl, and 5- to 10-membered heteroaryl;

$R_3$, $R_4$, $R_5$, $R_6$, and $R_7$ are each independently selected, at each occurrence, from the group consisting of hydrogen, halogen, hydroxyl, amino, carboxyl, nitro, cyano, oxo, azido, and the following optionally substituted groups: $C_{2-6}$ alkenyl, $C_{2-6}$ alkynyl, $C_{1-6}$ alkyl, $C_{1-6}$ alkoxy, a $C_{1-6}$ alkyl ester group, $C_{1-6}$ alkylamino, $C_{1-6}$ alkylamido, $C_{3-10}$ cycloalkyl, 3- to 10-membered heterocycloalkyl, $C_{3-10}$ cycloalkylamino, 3- to 10-membered heterocycloalkylamino, $C_{3-10}$ cycloalkylamido, 3- to 10-membered heterocycloalkylamido, $C_{6-10}$ aryl, and 5- to 10-membered heteroaryl, wherein the oxo denotes that two hydrogen atoms at the same substitution position are substituted with the same oxygen atom to form a double bond; when either of $R_4$ and $R_5$ is oxo, the other is absent; when either of $R_6$ and $R_7$ is oxo, the other is absent; n is 0, 1, 2, 3, 4, 5 or 6;

$R_8$ is selected from the group consisting of hydrogen, halogen, cyano, and the following optionally substituted groups: —$OR_{13}$,—$N(R_{13})R_{14}$,—NH—C(O)$R_{13}$,—NH—$OR_{13}$, —OC(O)$R_{13}$,—$C_{1-6}$ alkylene-N($R_{13}$)$R_{14}$, $C_{1-6}$ alkyl, $C_{3-10}$ cycloalkyl, $C_{2-6}$ alkenyl, $C_{2-6}$ alkynyl, 3- to 10-membered heterocycloalkyl, $C_{6-14}$ aryl, and 5- to 10-membered heteroaryl, wherein $R_{13}$ and $R_{14}$ are each independently selected from the group consisting of hydrogen, $C_{1-6}$ alkyl, $C_{3-10}$ cycloalkyl, 3- to 10-membered heterocycloalkyl, $C_{6-14}$ aryl, and 5-to 10-membered heteroaryl;

Q is selected from the group consisting of hydrogen, halogen, cyano, and the following optionally substituted groups: —$OR_9$, —$N(R_9)R_{10}$,—C(O)$R_9$,—C(O)$OR_9$,—C(O)N($R_9$)$R_{10}$,—OC(O)$R_9$,—OC(O)N($R_9$)$R_{10}$, $C_{1-6}$ alkyl, $C_{3-10}$ cycloalkyl, $C_{2-6}$ alkenyl, $C_{2-6}$ alkynyl, 3- to 10-membered heterocycloalkyl, $C_{6-14}$ aryl, 5- to 10-membered heteroaryl, 4- to 12-membered bridged cyclyl, 4- to 12-membered bridged heterocyclyl, monospirocyclyl, monospiroheterocyclyl, fused cyclyl and fused heterocyclyl, wherein $R_9$ and $R_{10}$ are each independently selected from the group consisting of hydrogen, and the following optionally substituted groups: $C_{1-6}$ alkyl, $C_{3-10}$ cycloalkyl, $C_{2-6}$ alkenyl, $C_{2-6}$ alkynyl, 3- to 10-membered heterocycloalkyl, $C_{6-14}$ aryl, and 5- to 10-membered heteroaryl;

when a group is substituted, a hydrogen atom at a substitutable position of the group is substituted with one or more substituents and the substituents are each independently selected from the group consisting of halogen, hydroxyl, cyano, nitro, amino, azido, oxo, carboxyl, $C_{2-6}$ alkenyl, $C_{2-6}$ alkynyl, $C_{1-6}$ alkyl, $C_{1-6}$ alkoxy, $C_{3-10}$ cycloalkyl, $C_{3-10}$ cycloalkylsulfonyl, 3- to 10-membered heterocycloalkyl, $C_{6-14}$ aryl, and 5- to 10-membered heteroaryl, wherein the $C_{2-6}$ alkenyl, $C_{2-6}$ alkynyl, $C_{1-6}$ alkyl, $C_{1-6}$ alkoxy, $C_{3-10}$ cycloalkyl, $C_{3-10}$ cycloalkylsulfonyl, 3- to 10-membered heterocycloalkyl, $C_{6-14}$ aryl or 5- to 10-membered heteroaryl is optionally substituted with one or more substituents and the substituents are each independently selected from the group consisting of halogen, hydroxyl, amino, cyano, $C_{1-6}$ alkyl, and $C_{1-6}$ alkoxy, and oxo denotes that two hydrogen atoms at the same substitution position are substituted with the same oxygen atom to form a double bond; and when the heterocycloalkyl, bridged heterocyclyl, monospiroheterocyclyl, fused heterocyclyl and/or heteroaryl are present, the number of ring heteroatom in the group is each independently 1 to 4, and the ring heteroatom is each independently selected from the group consisting of N, O, and S.

2. The compound or the pharmaceutically acceptable salt, tautomer, geometric isomer, optical isomer, solvate or isotopic derivative thereof according to claim 1, wherein the compound has a structure represented by formula (II):

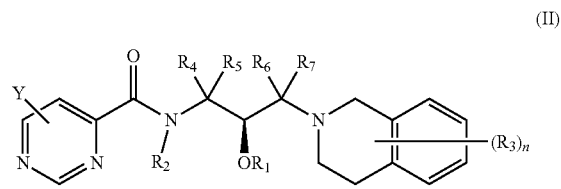

wherein Y, $R_1$, $R_2$, $R_3$, $R_4$, $R_5$, $R_6$, $R_7$, and n are as defined in claim 1.

3. The compound or the pharmaceutically acceptable salt, tautomer, geometric isomer, optical isomer, solvate or isotopic derivative thereof according to claim 1, wherein the compound has a structure represented by formula (III):

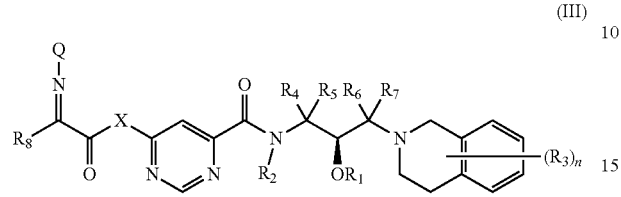

(III)

wherein X, Q, $R_1$, $R_2$, $R_3$, $R_4$, $R_5$, $R_6$, $R_7$, $R_8$, and n are as defined in claim 1.

4. The compound or the pharmaceutically acceptable salt, tautomer, geometric isomer, optical isomer, solvate or isotopic derivative thereof according to claim 1,
wherein ring A is selected from the group consisting of the following optionally substituted groups: $C_{5-7}$ cycloalkyl, 4- to 7-membered heterocycloalkyl, 4- to 10-membered bridged cyclyl, 4- to 10-membered bridged heterocyclyl, monospirocyclyl, and monospiroheterocyclyl, wherein the monospirocyclyl and monospiroheterocyclyl are selected from the group consisting of 3-membered/5-membered, 4-membered/4-membered, 4-membered/5-membered, 4-membered/6-membered, 5-membered/5-membered, and 5-membered/6-membered rings, where the number of ring atoms in each ring includes the number of spiro atom; when a group is substituted, a hydrogen atom at a substitutable position of the group is substituted with one or more substituents and the substituents are each independently selected from the group consisting of halogen, hydroxyl, cyano, nitro, amino, azido, oxo, carboxyl, $C_{1-6}$ alkyl, and $C_{1-6}$ alkoxy, wherein the $C_{1-6}$ alkyl or $C_{1-6}$ alkoxy is optionally substituted with one or more substituents and the substituents are each independently selected from the group consisting of halogen, hydroxyl, amino, and cyano, and oxo denotes that two hydrogen atoms at the same substitution position are substituted with the same oxygen atom to form a double bond.

5. The compound or the pharmaceutically acceptable salt, tautomer, geometric isomer, optical isomer, solvate or isotopic derivative thereof according to claim 1,
wherein X is

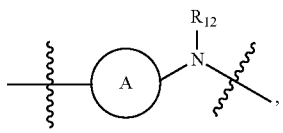

wherein ring A is selected from the group consisting of the following optionally substituted groups: 4- to 6-membered heterocycloalkyl, 4-membered/4-membered monospiroheterocyclyl and 4-membered/6-membered monospiroheterocyclyl, and the atom in ring A that is linked to

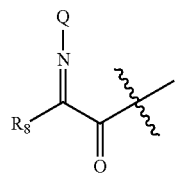

is a heteroatom; when a group is substituted, a hydrogen atom at a substitutable position of the group is substituted with one or more substituents and the substituents are each independently selected from the group consisting of halogen, hydroxyl, cyano, amino, $C_{1-4}$ alkyl, and $C_{1-4}$ alkoxy, wherein the $C_{1-4}$ alkyl or $C_{1-4}$ alkoxy is optionally substituted with one or more substituents and the substituents are each independently selected from the group consisting of halogen, hydroxyl, amino, and cyano; or
wherein X is

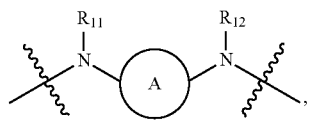

wherein ring A is selected from the group consisting of the following optionally substituted groups: $C_{5-6}$ cycloalkyl, 4-membered/4-membered monospirocyclyl, and 4-membered/6-membered monospirocyclyl; when a group is substituted, a hydrogen atom at a substitutable position of the group is substituted with one or more substituents and the substituents are each independently selected from the group consisting of halogen, hydroxyl, cyano, amino, $C_{1-4}$ alkyl, and $C_{1-4}$ alkoxy, wherein the $C_{1-4}$ alkyl or $C_{1-4}$ alkoxy is optionally substituted with one or more substituents and the substituents are each independently selected from the group consisting of halogen, hydroxyl, amino, and cyano.

6. The compound or the pharmaceutically acceptable salt, tautomer, geometric isomer, optical isomer, solvate or isotopic derivative thereof according to claim 1,
wherein X is selected from the group consisting of the following optionally substituted fragments:

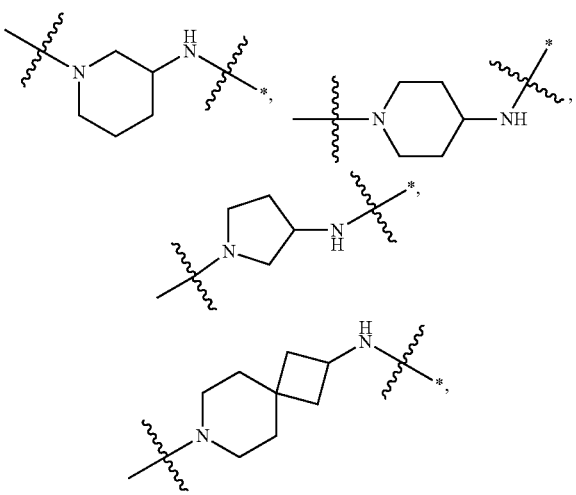

-continued

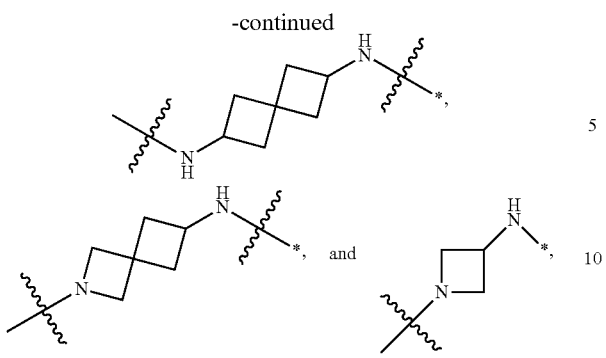

wherein the N atom at the terminal marked by an asterisk "*" is linked to the pyrimidine ring; and when a group is substituted, a hydrogen atom at a substitutable position of the group is substituted with one or more substituents and the substituents are each independently selected from the group consisting of halogen, hydroxyl, cyano, amino, $C_{1-4}$ alkyl, and $C_{1-4}$ alkoxy, wherein the $C_{1-4}$ alkyl or $C_{1-4}$ alkoxy is optionally substituted with one or more substituents and the substituents are each independently selected from the group consisting of halogen, hydroxyl, amino, and cyano.

7. The compound or the pharmaceutically acceptable salt, tautomer, geometric isomer, optical isomer, solvate or isotopic derivative thereof according to claim 1, wherein X is selected from the group consisting of the following fragments:

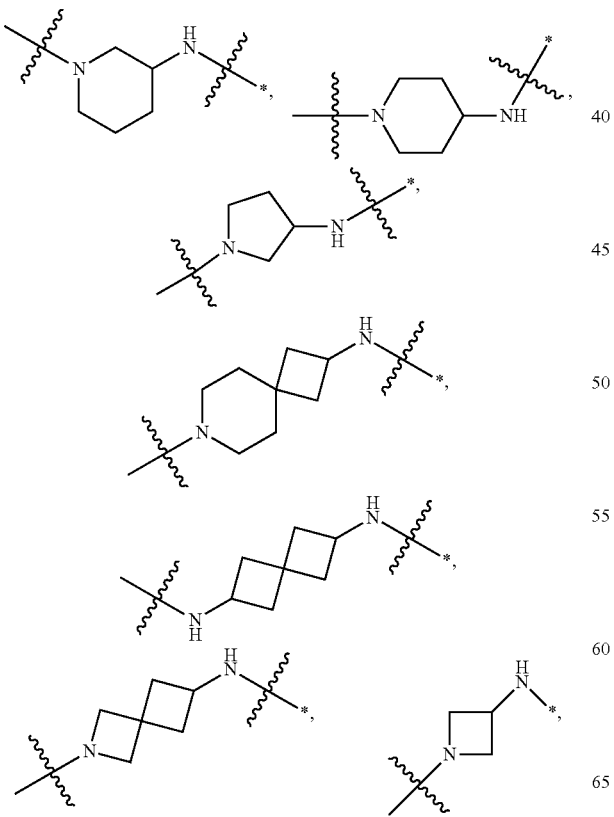

-continued

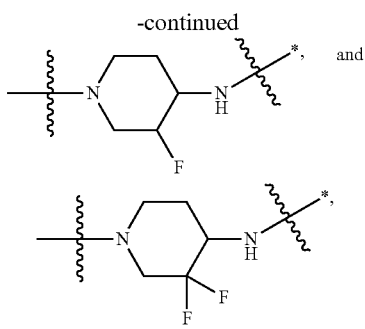

wherein the N atom at the terminal marked by an asterisk "*" is linked to the pyrimidine ring.

8. The compound or the pharmaceutically acceptable salt, tautomer, geometric isomer, optical isomer, solvate or isotopic derivative thereof according to claim 1, wherein $R_8$ is selected from the group consisting of hydrogen, and the following optionally substituted groups: —$N(R_{13})R_{14}$, —$C_{1-6}$ alkylene-$N(R_{13})R_{14}$, $C_{1-6}$ alkyl, $C_{3-10}$ cycloalkyl, and $C_{6-14}$ aryl, wherein $R_{13}$ and $R_{14}$ are each independently selected from the group consisting of hydrogen and $C_{1-6}$ alkyl; and when a group is substituted, a hydrogen atom at a substitutable position of the group is substituted with one or more substituents and the substituents are each independently selected from the group consisting of halogen, hydroxyl, $C_{3-10}$ cycloalkyl, $C_{3-10}$ cycloalkylsulfonyl, 3- to 10-membered heterocycloalkyl, $C_{6-14}$ aryl, and 5- to 10-membered heteroaryl.

9. The compound or the pharmaceutically acceptable salt, tautomer, geometric isomer, optical isomer, solvate or isotopic derivative thereof according to claim 1, wherein $R_8$ is selected from the group consisting of —H,

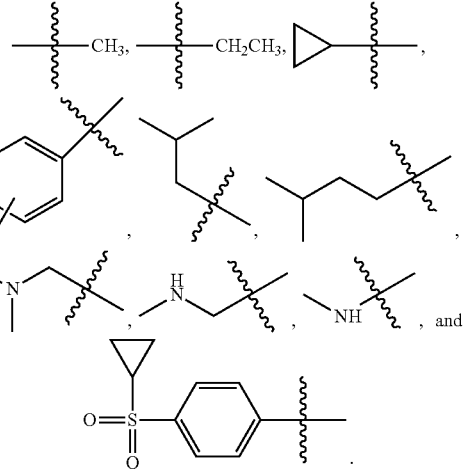

10. The compound or the pharmaceutically acceptable salt, tautomer, geometric isomer, optical isomer, solvate or isotopic derivative thereof according to claim 1, wherein $R_1$, $R_2$, $R_3$, $R_4$, $R_5$, $R_6$, $R_7$, $R_{11}$, and $R_{12}$, at each occurrence, are each independently selected from hydrogen.

11. The compound or the pharmaceutically acceptable salt, tautomer, geometric isomer, optical isomer, solvate or isotopic derivative thereof according to claim 1, wherein Q is —OR₉, wherein R₉ is selected from the group consisting of hydrogen, and the following optionally substituted groups: $C_{1-6}$ alkyl, $C_{5-7}$ cycloalkyl, 3- to 10-membered heterocycloalkyl, $C_{6-14}$ aryl, and 5- to 10-membered heteroaryl; and when a group is substituted, a hydrogen atom at a substitutable position of the group is substituted with one or more substituents and the substituents are each independently selected from the group consisting of halogen, hydroxyl, cyano, amino, $C_{1-4}$ alkyl, $C_{1-4}$ alkoxy, $C_{3-7}$ cycloalkyl, and 5- to 7-membered heteroaryl.

12. The compound or the pharmaceutically acceptable salt, tautomer, geometric isomer, optical isomer, solvate or isotopic derivative thereof according to claim 1, wherein Q is selected from the group consisting of hydroxyl, methoxy, cyclopentyloxy, cyclopropylmethoxy, and pyridin-2-ylmethoxy.

13. A compound or a pharmaceutically acceptable salt, tautomer, geometric isomer, optical isomer, solvate or isotopic derivative thereof, wherein the compound is one of the following compounds:

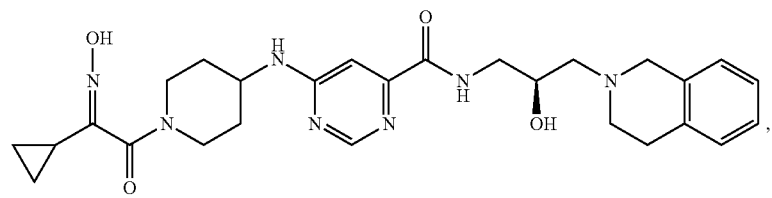

,

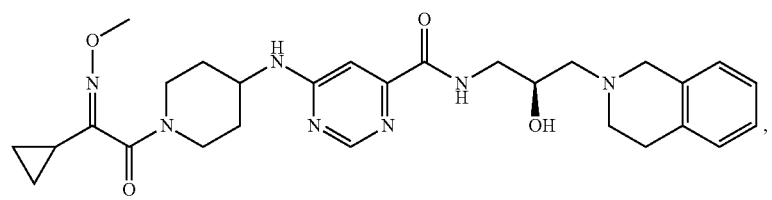

,

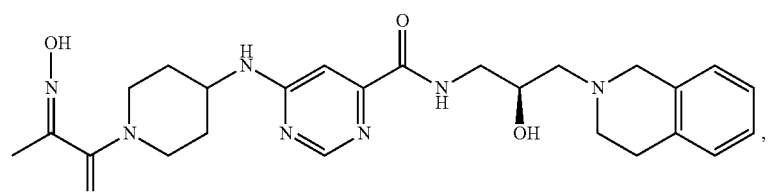

,

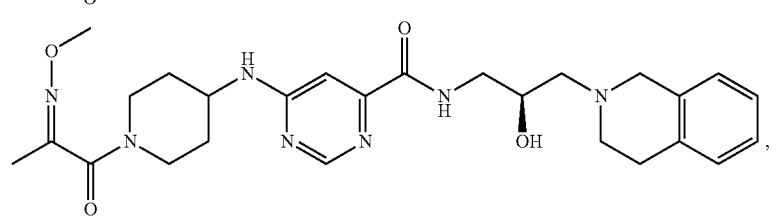

,

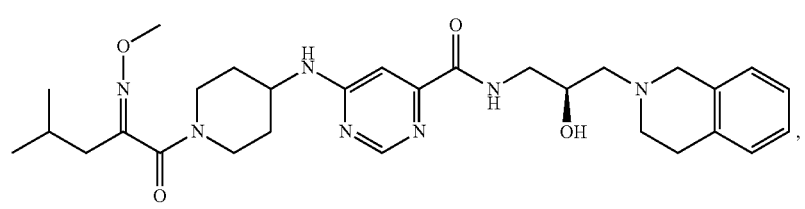

,

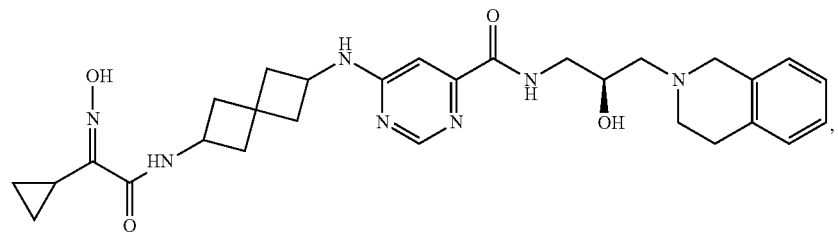

,

-continued
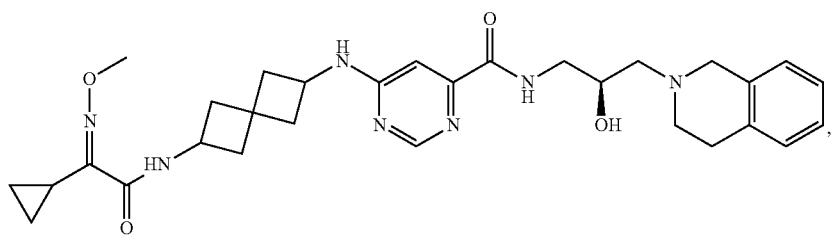
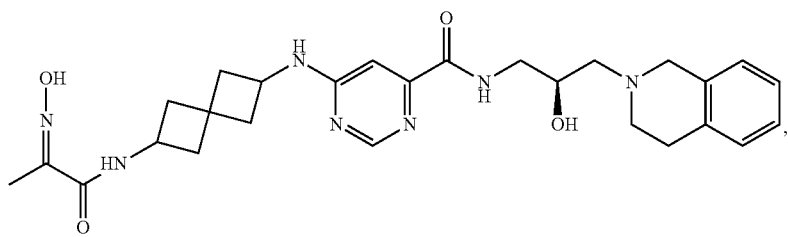
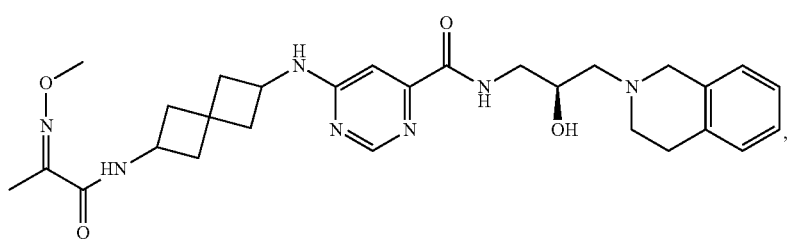
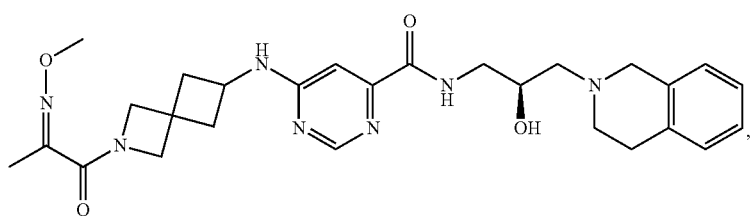
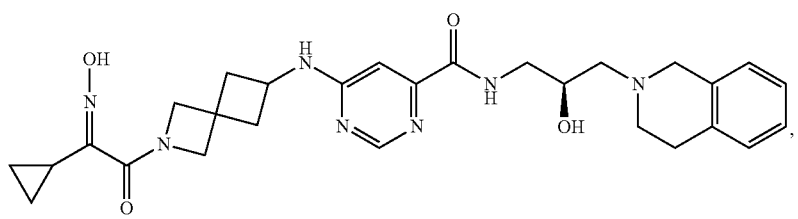
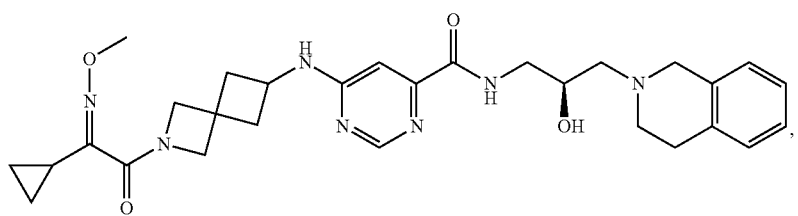
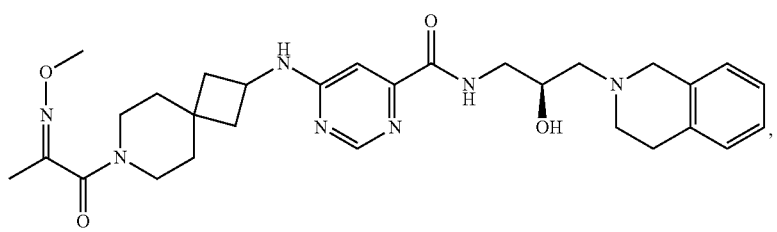

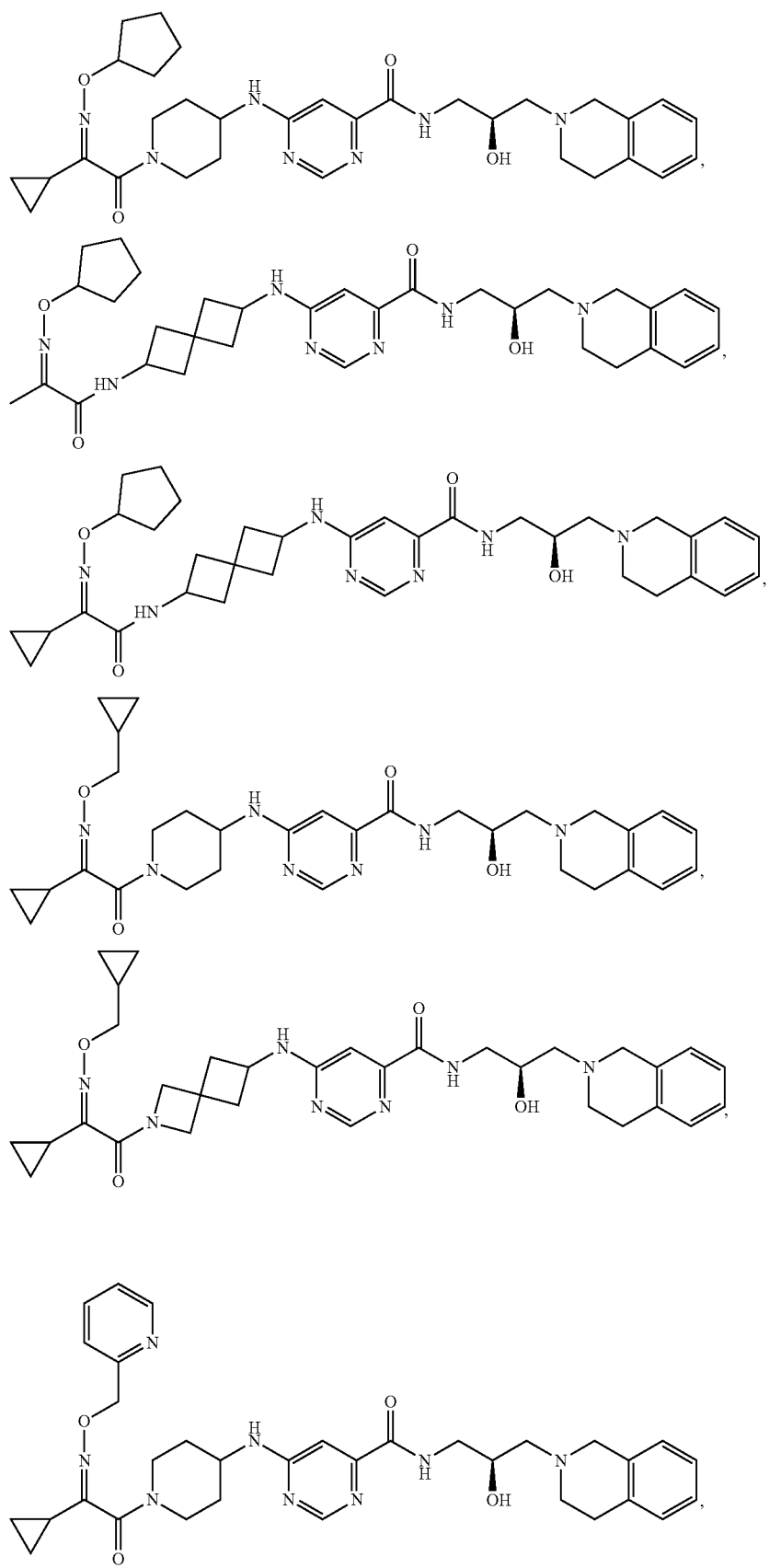

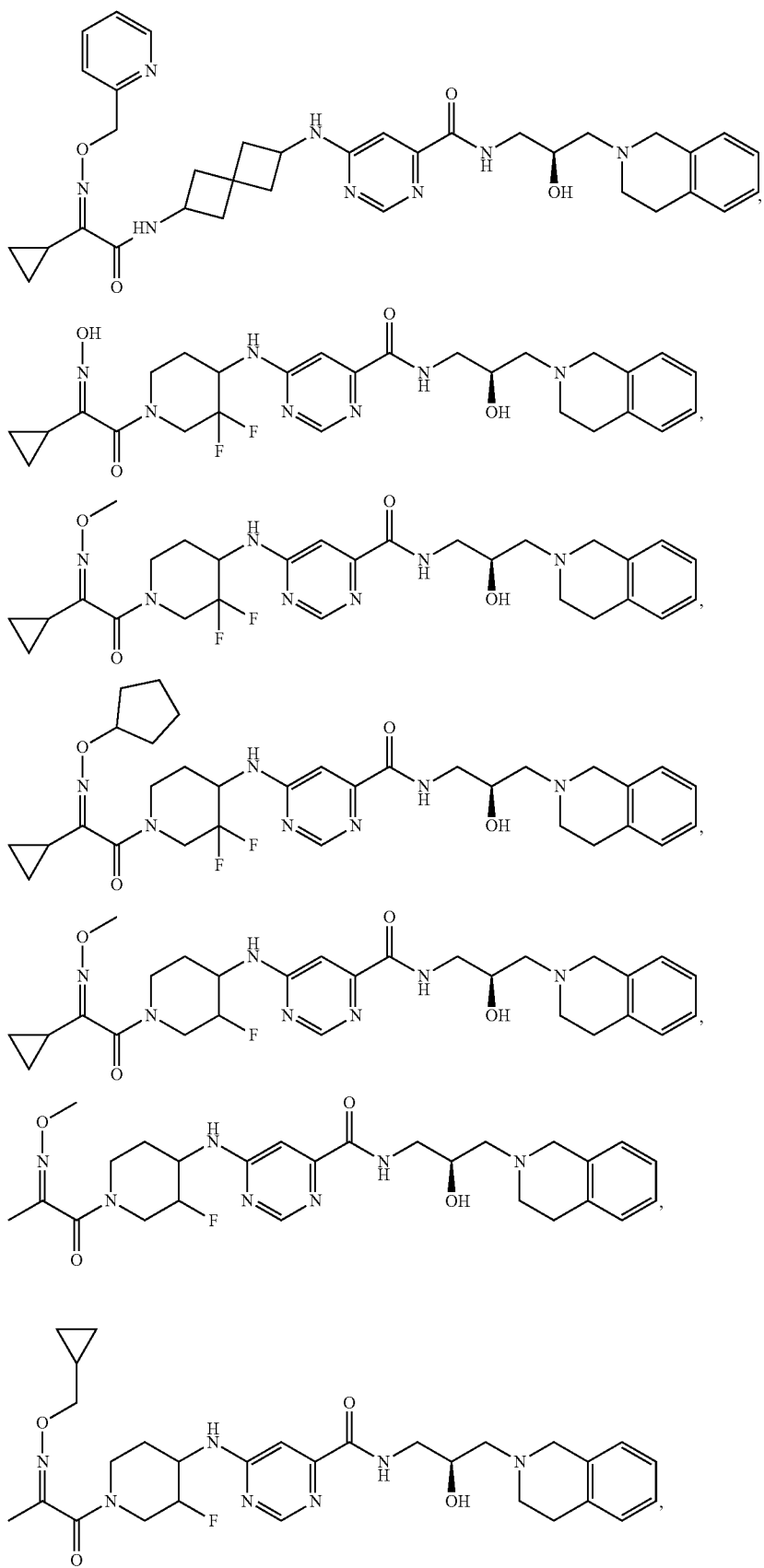

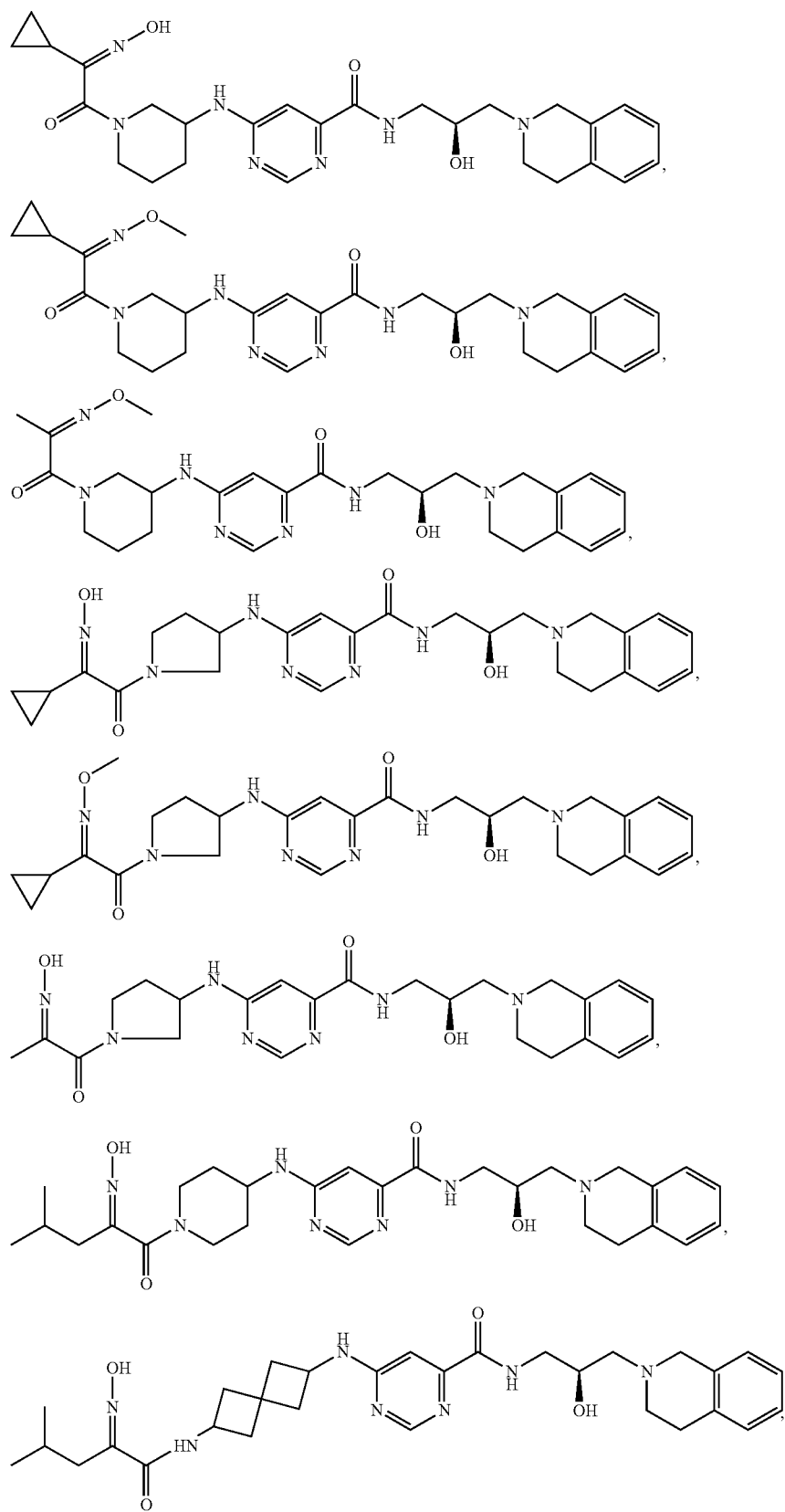

-continued

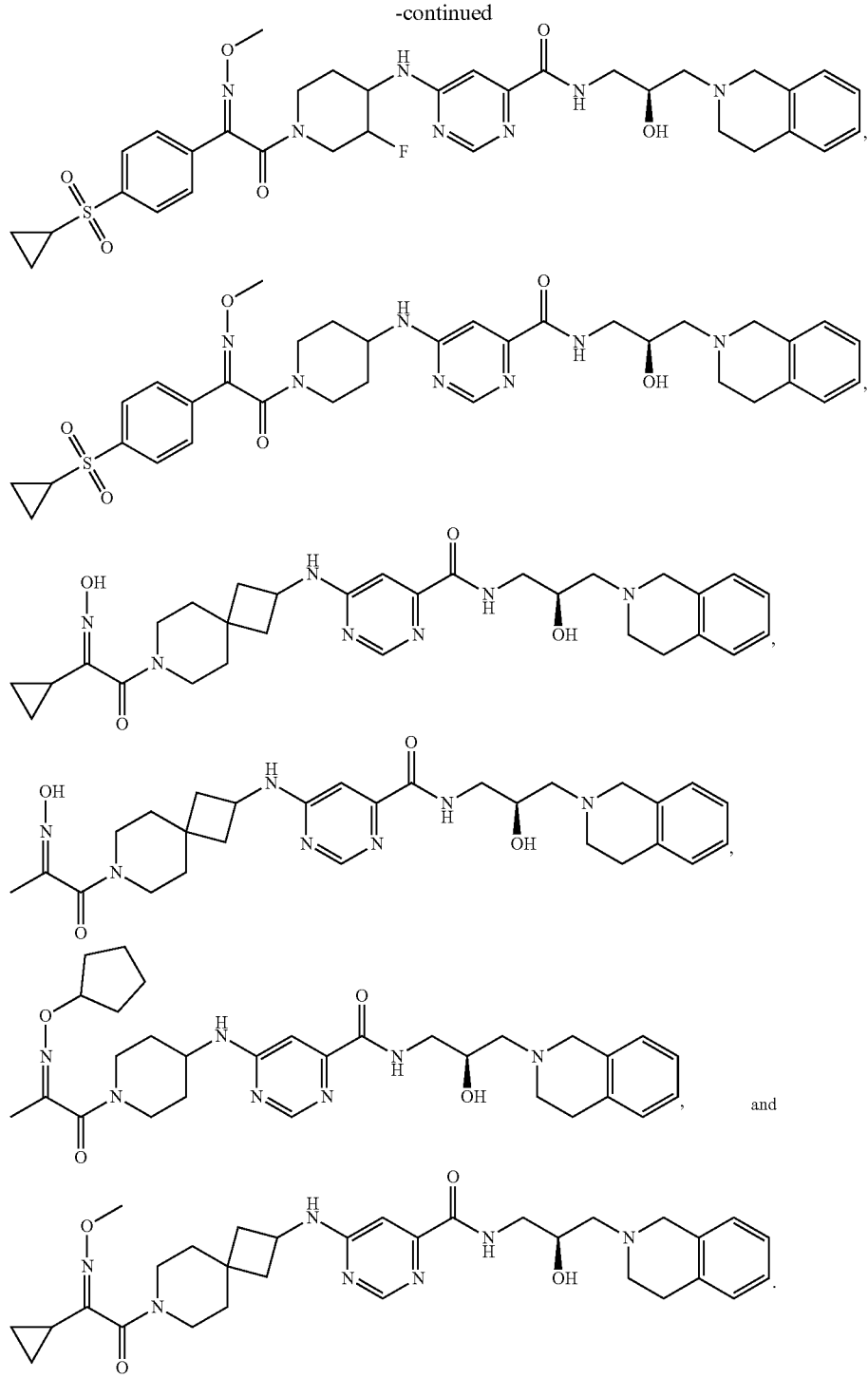

14. A pharmaceutical composition comprising the compound or the pharmaceutically acceptable salt, tautomer, geometric isomer, optical isomer, solvate or isotopic derivative thereof according to claim 1.

15. A pharmaceutical composition comprising the compound or the pharmaceutically acceptable salt, tautomer, geometric isomer, optical isomer, solvate or isotopic derivative thereof according to claim 13.

16. A method for treating a disease that is at least partially mediated by PRMT5 or a cell proliferation disease, comprising: administering to a subject in need thereof a therapeutically effective amount of the compound or the pharmaceutically acceptable salt, tautomer, geometric isomer, optical isomer, solvate or isotopic derivative thereof according to claim 1, wherein the disease that is at least partially mediated by PRMT5 or the cell proliferation disease is a tumor, and the tumor is a hematological tumor or a solid tumor.

17. A method for treating a disease that is at least partially mediated by PRMT5 or a cell proliferation disease, comprising: administering to a subject in need thereof a therapeutically effective amount of the compound or the pharmaceutically acceptable salt, tautomer, geometric isomer, optical isomer, solvate or isotopic derivative thereof according to claim 16, wherein the disease that is at least partially mediated by PRMT5 or the cell proliferation disease is a tumor, and the tumor is a hematological tumor or a solid tumor.

18. The method according to claim 16, the tumor is selected from the group consisting of lung cancer, bone cancer, stomach cancer, pancreatic cancer, adenoid cystic carcinoma, skin cancer, head and neck cancer, uterine cancer, ovarian cancer, testicular cancer, fallopian tube cancer, endometrial carcinoma, cervical cancer, vaginal cancer, brain cancer, pituitary adenoma, melanoma, acute myeloid leukemia, epidermoid carcinoma, and chronic and acute leukemia.

19. The method according to claim 17, the tumor is selected from the group consisting of lung cancer, bone cancer, stomach cancer, pancreatic cancer, adenoid cystic carcinoma, skin cancer, head and neck cancer, uterine cancer, ovarian cancer, testicular cancer, fallopian tube cancer, endometrial carcinoma, cervical cancer, vaginal cancer, brain cancer, pituitary adenoma, melanoma, acute myeloid leukemia, epidermoid carcinoma, and chronic and acute leukemia.

20. The method according to claim 17, the tumor is selected from the group consisting of a hematological tumor, stomach cancer, pancreatic cancer, adenoid cystic carcinoma, and melanoma.

\* \* \* \* \*